(12) United States Patent
Hudyma et al.

(10) Patent No.: US 9,778,444 B1
(45) Date of Patent: *Oct. 3, 2017

(54) OPTICAL ASSEMBLY FOR A WIDE FIELD OF VIEW POINT ACTION CAMERA WITH LOW ASTIGMATISM

(71) Applicant: Navitar Industries, LLC, Rochester, NY (US)

(72) Inventors: Russell Hudyma, San Ramon, CA (US); Michael Thomas, Woburn, MA (US)

(73) Assignee: Navitar Industries, LLC, Rochester, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/099,947

(22) Filed: Apr. 15, 2016

Related U.S. Application Data

(63) Continuation of application No. 14/215,049, filed on Mar. 16, 2014, now Pat. No. 9,316,820.

(51) Int. Cl.
*G02B 13/18* (2006.01)
*G02B 13/00* (2006.01)
*G02B 13/06* (2006.01)
*G02B 27/00* (2006.01)
*H04N 5/225* (2006.01)

(52) U.S. Cl.
CPC ......... *G02B 13/18* (2013.01); *G02B 13/0045* (2013.01); *G02B 13/06* (2013.01); *G02B 27/0025* (2013.01); *H04N 5/2254* (2013.01)

(58) Field of Classification Search
CPC .. G02B 13/18; G02B 13/002; G02B 13/0025; G02B 13/003; G02B 13/0035; G02B 13/004; G02B 13/0045
USPC .................................................. 359/708–719
See application file for complete search history.

(56) References Cited

U.S. PATENT DOCUMENTS

| | | |
|---|---|---|
| 3,931,629 A | 1/1976 | Himmelsbach |
| 4,008,951 A | 2/1977 | Himmelsbach |
| 4,009,946 A | 3/1977 | Geyer et al. |
| 4,015,896 A | 4/1977 | Sonnet |
| 4,036,571 A | 7/1977 | Geyer et al. |

(Continued)

FOREIGN PATENT DOCUMENTS

| | | |
|---|---|---|
| DE | 10 2010 020 243 B4 | 3/2012 |
| EP | 1393133 B1 | 10/2005 |

(Continued)

OTHER PUBLICATIONS

Yen, Hung-Ju and Liou, Guey-Sheng: "A facile approach towards optically isotropic, colorless, and thermoplastic polyimidothioethers with high refractive index." J. Mater. Chem., The Royal Society of Chemistry, 2010, vol. 20, Issue 20, pp. 4080-4084. DOI:10.1039/C000087F.

(Continued)

*Primary Examiner* — Darryl J Collins
(74) *Attorney, Agent, or Firm* — SF Bay Area Patents, LLC; Andrew V. Smith

(57) ABSTRACT

An optical assembly for a point action camera with a wide field of view includes multiple lens elements configured to provide a field of view in excess of 150 degrees. One or more lens elements has an aspheric surface. The optical assembly exhibits a low longitudinal astigmatism of approximately 0.3 mm or less.

52 Claims, 21 Drawing Sheets

(56) References Cited

U.S. PATENT DOCUMENTS

| | | |
|---|---|---|
| 4,054,372 A | 10/1977 | Schroeder |
| 4,079,401 A | 3/1978 | Baab et al. |
| 4,081,811 A | 3/1978 | Baab et al. |
| 4,101,202 A | 7/1978 | Tesch |
| 4,107,714 A | 8/1978 | Raab |
| 4,110,769 A | 8/1978 | Schutz et al. |
| 4,119,294 A | 10/1978 | Schnorrenberg |
| 4,161,756 A | 7/1979 | Thomas |
| 4,168,884 A | 9/1979 | Tesch |
| 4,182,565 A | 1/1980 | Bauer |
| 4,196,970 A | 4/1980 | Macher et al. |
| 4,200,377 A | 4/1980 | Holderbaum |
| 4,229,094 A | 10/1980 | Baab et al. |
| 4,239,339 A | 12/1980 | Wagner |
| 4,273,415 A | 6/1981 | Sonnet |
| 4,353,634 A | 10/1982 | Himmelsbach |
| 4,384,769 A | 5/1983 | Brei et al. |
| 4,645,314 A | 2/1987 | Schroder |
| 4,695,136 A | 9/1987 | Schitthof |
| 4,756,601 A | 7/1988 | Schroder |
| 4,773,745 A | 9/1988 | Schitthof |
| 5,251,073 A | 10/1993 | Schauss |
| 5,339,193 A | 8/1994 | Korpert et al. |
| 5,430,564 A | 7/1995 | Harada et al. |
| 5,453,785 A | 9/1995 | Lenhardt et al. |
| 5,692,820 A | 12/1997 | Gale et al. |
| 5,708,532 A | 1/1998 | Wartmann |
| 5,745,285 A | 4/1998 | Harder et al. |
| 5,870,234 A | 2/1999 | Ebbesmeier nee Schitthof |
| 5,882,221 A | 3/1999 | Nguyen et al. |
| 5,940,222 A | 8/1999 | Sinclai et al. |
| 5,973,826 A | 10/1999 | Chapman et al. |
| 6,005,720 A | 12/1999 | Watters et al. |
| 6,028,720 A | 2/2000 | Wartmann et al. |
| 6,033,079 A | 3/2000 | Hudyma |
| 6,072,852 A | 6/2000 | Hudyma |
| 6,147,818 A | 11/2000 | Hale et al. |
| 6,183,095 B1 | 2/2001 | Hudyma |
| 6,188,513 B1 | 2/2001 | Hudyma et al. |
| 6,204,975 B1 | 3/2001 | Watters et al. |
| 6,226,346 B1 | 5/2001 | Hudyma |
| 6,262,836 B1 | 7/2001 | Hudyma et al. |
| 6,282,033 B1 | 8/2001 | Ning |
| 6,310,731 B1 | 10/2001 | Wartmann et al. |
| 6,318,869 B1 | 11/2001 | Hudyma |
| 6,339,509 B1 | 1/2002 | Ohtake |
| 6,426,506 B1 | 7/2002 | Hudyma |
| 6,441,971 B2 | 8/2002 | Ning |
| 6,554,330 B2 | 4/2003 | Wen-Bin et al. |
| 6,583,444 B2 | 6/2003 | Fjelstad |
| 6,636,350 B2 | 10/2003 | Shafer et al. |
| 6,836,382 B2 | 12/2004 | Ning |
| 6,844,991 B2 | 1/2005 | Mizuguchi |
| 6,864,861 B2 | 3/2005 | Schehrer et al. |
| 6,867,889 B1 | 3/2005 | Amadon et al. |
| 6,888,168 B2 | 5/2005 | Fjelstad |
| 6,906,866 B2 | 6/2005 | Hudyma et al. |
| 6,927,901 B2 | 8/2005 | Mann et al. |
| RE38,799 E | 9/2005 | Ning |
| 6,985,210 B2 | 1/2006 | Hudyma et al. |
| 6,989,937 B2 | 1/2006 | Schauss |
| 7,009,140 B2 | 3/2006 | Partio et al. |
| 7,023,628 B1 | 4/2006 | Ning |
| 7,057,830 B2 | 6/2006 | Ebbesmeier |
| 7,061,959 B2 | 6/2006 | Partlo et al. |
| 7,085,075 B2 | 8/2006 | Mann et al. |
| 7,095,054 B2 | 8/2006 | Fjelstad |
| 7,151,592 B2 | 12/2006 | Hudyma et al. |
| 7,173,774 B2 | 2/2007 | Ning |
| 7,190,527 B2 | 3/2007 | Rostalski et al. |
| 7,190,530 B2 | 3/2007 | Mann et al. |
| 7,199,122 B2 | 4/2007 | Ruggeri et al. |
| 7,199,922 B2 | 4/2007 | Mann et al. |
| 7,218,445 B2 | 5/2007 | Shafer et al. |
| 7,224,056 B2 | 5/2007 | Burtzlaff et al. |
| 7,237,915 B2 | 7/2007 | Hudyma |
| 7,237,935 B2 | 7/2007 | Ito et al. |
| 7,244,056 B2 | 7/2007 | Koike et al. |
| 7,345,277 B2 | 3/2008 | Zhang |
| 7,355,678 B2 | 4/2008 | Hudyma et al. |
| 7,368,695 B2 | 5/2008 | Kang et al. |
| 7,375,798 B2 | 5/2008 | Hudyma et al. |
| 7,382,540 B2 | 6/2008 | Rostalski et al. |
| 7,443,597 B2 | 10/2008 | Humpston |
| 7,449,779 B2 | 11/2008 | Honer et al. |
| 7,508,581 B2 | 3/2009 | Hudyma |
| 7,529,040 B2 | 5/2009 | Bretthauer |
| 7,545,572 B2 | 6/2009 | Bretthauer et al. |
| 7,566,853 B2 | 7/2009 | Tuckerman et al. |
| 7,569,424 B2 | 8/2009 | Nystrom et al. |
| 7,593,636 B2 | 9/2009 | Nystrom et al. |
| 7,675,694 B2 | 3/2010 | Kim et al. |
| 7,683,468 B2 | 3/2010 | Haba et al. |
| 7,747,155 B1 | 6/2010 | Gutierrez |
| 7,768,574 B2 | 8/2010 | Humpston |
| 7,791,825 B2 | 9/2010 | Hackemer |
| 7,807,508 B2 | 10/2010 | Oganesian et al. |
| 7,839,532 B2 | 11/2010 | Brawn et al. |
| 7,858,445 B2 | 12/2010 | Honer et al. |
| 7,859,748 B2 | 12/2010 | Shafer et al. |
| 7,864,452 B2 | 1/2011 | Ning |
| 7,869,141 B2 | 1/2011 | Ning |
| RE42,118 E | 2/2011 | Hudyma et al. |
| 7,884,303 B2 | 2/2011 | Partlo et al. |
| 7,885,008 B2 | 2/2011 | Schauss |
| 7,920,163 B1 | 4/2011 | Kossin |
| 7,927,070 B2 | 4/2011 | Godsk et al. |
| 7,929,221 B2 | 4/2011 | Ning |
| 7,935,568 B2 | 5/2011 | Oganesian et al. |
| 7,936,062 B2 | 5/2011 | Humpston et al. |
| 8,004,780 B2 | 8/2011 | Gutierrez et al. |
| 8,005,268 B2 | 8/2011 | Steinberg et al. |
| 8,014,662 B1 | 9/2011 | Gutierrez et al. |
| 8,089,698 B1 | 1/2012 | Tang et al. |
| 8,090,252 B1 | 1/2012 | Tang et al. |
| 8,119,516 B2 | 2/2012 | Endo |
| 8,135,184 B2 | 3/2012 | Steinberg et al. |
| 8,184,967 B2 | 5/2012 | Tang et al. |
| 8,189,276 B1 | 5/2012 | Hsu et al. |
| 8,199,222 B2 | 6/2012 | Drimbarean et al. |
| 8,212,882 B2 | 7/2012 | Florea et al. |
| 8,264,576 B2 | 9/2012 | Susanu et al. |
| 8,330,831 B2 | 12/2012 | Steinberg et al. |
| 8,351,726 B2 | 1/2013 | Albu et al. |
| 8,358,925 B2 | 1/2013 | Gutierrez et al. |
| 8,362,391 B2 | 1/2013 | Partlo et al. |
| 8,363,085 B2 | 1/2013 | Michrowski et al. |
| 8,417,055 B2 | 4/2013 | Albu et al. |
| 8,493,459 B2 | 7/2013 | Albu |
| 8,493,460 B2 | 7/2013 | Albu |
| 8,508,652 B2 | 8/2013 | Albu et al. |
| 8,509,496 B2 | 8/2013 | Steinberg et al. |
| 8,521,017 B2 | 8/2013 | Calvet et al. |
| 8,547,423 B2 | 10/2013 | Ning |
| 8,587,666 B2 | 11/2013 | Albu et al. |
| 8,593,542 B2 | 11/2013 | Steinberg et al. |
| 8,604,663 B2 | 12/2013 | Gutierrez et al. |
| 8,637,961 B2 | 1/2014 | Gutierrez et al. |
| 8,648,959 B2 | 2/2014 | Capata et al. |
| 8,649,627 B2 | 2/2014 | Albu et al. |
| 8,649,628 B2 | 2/2014 | Albu et al. |
| 8,873,167 B2 | 10/2014 | Ning |
| 9,091,843 B1 | 7/2015 | Hudyma et al. |
| 9,316,808 B1 | 4/2016 | Hudyma et al. |
| 9,316,820 B1 | 4/2016 | Hudyma et al. |
| 9,494,772 B1 | 11/2016 | Hudyma et al. |
| 2003/0071929 A1 | 4/2003 | Moskovich et al. |
| 2004/0095503 A1 | 5/2004 | Iwasawa |
| 2005/0067688 A1 | 3/2005 | Humpston |
| 2005/0082653 A1 | 4/2005 | McWilliams et al. |
| 2005/0082654 A1 | 4/2005 | Humpston et al. |
| 2005/0085016 A1 | 4/2005 | McWilliams et al. |
| 2005/0087861 A1 | 4/2005 | Burtzlaff et al. |
| 2005/0095835 A1 | 5/2005 | Humpston et al. |

(56) References Cited

U.S. PATENT DOCUMENTS

| | | |
|---|---|---|
| 2005/0117225 A1 | 6/2005 | Ebbesmeier |
| 2005/0275955 A1 | 12/2005 | Sekine |
| 2006/0262416 A1 | 11/2006 | Lee et al. |
| 2007/0096295 A1 | 5/2007 | Burtzlaff et al. |
| 2007/0096311 A1 | 5/2007 | Humpston et al. |
| 2007/0096312 A1 | 5/2007 | Humpston et al. |
| 2007/0138644 A1 | 6/2007 | McWilliams et al. |
| 2007/0145564 A1 | 6/2007 | Honer |
| 2007/0190691 A1 | 8/2007 | Humpston et al. |
| 2007/0190747 A1 | 8/2007 | Humpston et al. |
| 2008/0029879 A1 | 2/2008 | Tuckerman et al. |
| 2008/0074761 A1 | 3/2008 | Yamakawa et al. |
| 2008/0099900 A1 | 5/2008 | Oganesian et al. |
| 2008/0099907 A1 | 5/2008 | Oganesian et al. |
| 2008/0296717 A1 | 12/2008 | Beroz et al. |
| 2009/0023249 A1 | 1/2009 | Honer et al. |
| 2009/0059393 A1 | 3/2009 | Obama |
| 2009/0135499 A1 | 5/2009 | Hackemer |
| 2009/0212381 A1 | 8/2009 | Crisp et al. |
| 2009/0219631 A1 | 9/2009 | Ning |
| 2009/0244724 A1 | 10/2009 | Shibata |
| 2009/0251801 A1 | 10/2009 | Jung et al. |
| 2009/0303608 A1 | 12/2009 | Schauss |
| 2010/0020420 A1 | 1/2010 | Heu |
| 2010/0033848 A1 | 2/2010 | Hatada |
| 2010/0053407 A1 | 3/2010 | Crisp et al. |
| 2010/0165478 A1 | 7/2010 | Ohno |
| 2010/0277816 A1 | 11/2010 | Kweon et al. |
| 2011/0069160 A1 | 3/2011 | Ning |
| 2011/0216156 A1 | 9/2011 | Bigioi et al. |
| 2011/0216157 A1 | 9/2011 | Bigioi et al. |
| 2011/0255182 A1 | 10/2011 | Calvet et al. |
| 2011/0274423 A1 | 11/2011 | Gutierrez |
| 2011/0316969 A1 | 12/2011 | Hsieh et al. |
| 2011/0317013 A1 | 12/2011 | Gutierrez et al. |
| 2012/0019613 A1 | 1/2012 | Murray et al. |
| 2012/0033228 A1 | 2/2012 | Tschudi et al. |
| 2012/0033300 A1 | 2/2012 | Nakahara |
| 2012/0063761 A1 | 3/2012 | Tang et al. |
| 2012/0120283 A1 | 5/2012 | Capata et al. |
| 2012/0121243 A1 | 5/2012 | Calvet et al. |
| 2012/0206618 A1 | 8/2012 | Albu et al. |
| 2012/0207347 A1 | 8/2012 | Albu et al. |
| 2012/0307165 A1 | 12/2012 | Wang |
| 2012/0307358 A1 | 12/2012 | Baum et al. |
| 2012/0321293 A1 | 12/2012 | Schauss et al. |
| 2012/0327292 A1 | 12/2012 | Wang |
| 2013/0070126 A1 | 3/2013 | Albu |
| 2013/0075237 A1 | 3/2013 | Gutierrez |
| 2013/0076919 A1 | 3/2013 | Gutierrez et al. |
| 2013/0077945 A1 | 3/2013 | Liu et al. |
| 2013/0107108 A1 | 5/2013 | Schauss et al. |
| 2013/0107218 A1 | 5/2013 | Ebbesmeier et al. |
| 2013/0107376 A1 | 5/2013 | Tsai et al. |
| 2013/0120859 A1 | 5/2013 | Tsai et al. |
| 2013/0155399 A9 | 6/2013 | Hwang et al. |
| 2013/0188265 A1 | 7/2013 | Ebbesmeier et al. |
| 2013/0201392 A1 | 8/2013 | Gutierrez |
| 2013/0208353 A1 | 8/2013 | Huddleston |
| 2013/0242080 A1 | 9/2013 | Kossin |
| 2013/0258140 A1 | 10/2013 | Lipson et al. |
| 2013/0258490 A1 | 10/2013 | Ishihara |
| 2013/0270419 A1 | 10/2013 | Singh et al. |
| 2013/0329121 A1 | 12/2013 | Ono |
| 2013/0335831 A1 | 12/2013 | Ono |
| 2014/0028887 A1 | 1/2014 | Azuma |
| 2014/0043525 A1 | 2/2014 | Azuma et al. |
| 2014/0071331 A1 | 3/2014 | Katou |
| 2014/0092271 A1 | 4/2014 | Katou |
| 2015/0062720 A1* | 3/2015 | Lai .................. G02B 13/04 359/713 |
| 2015/0301310 A1 | 10/2015 | Chen et al. |

FOREIGN PATENT DOCUMENTS

| | | |
|---|---|---|
| EP | 2519852 B1 | 4/2013 |
| GB | 2330919 A | 5/1999 |
| JP | 2009533710 A | 9/2009 |
| WO | 99/34246 A1 | 7/1999 |
| WO | 99/42902 A2 | 8/1999 |
| WO | 99/42902 A3 | 10/1999 |
| WO | 00/37991 A1 | 6/2000 |
| WO | 00/38017 A1 | 6/2000 |
| WO | 01/51979 A2 | 7/2001 |
| WO | 02/44786 A2 | 6/2002 |
| WO | 02/056114 A2 | 7/2002 |
| WO | 02/044786 A3 | 8/2002 |
| WO | 03/075049 A2 | 9/2003 |
| WO | 03/075096 A2 | 9/2003 |
| WO | 03/075096 A3 | 11/2003 |
| WO | 02/056114 A3 | 12/2003 |
| WO | 2004/010200 A1 | 1/2004 |
| WO | 03/075049 A3 | 4/2004 |
| WO | 2005/015283 A1 | 2/2005 |
| WO | 2005/040928 A1 | 5/2005 |
| WO | 2005/054949 A2 | 6/2005 |
| WO | 2005/054949 A3 | 12/2005 |
| WO | 2011/141280 A1 | 11/2011 |

OTHER PUBLICATIONS

Naoaki Suzuki, Yasuo Tomita, Kentaroh Ohmori, Motohiko Hidaka and Katsumi Chikama, "Highly transparent $ZrO_2$ nanoparticle-dispersed acrylate photopolymers for volume holographic recording," Optics Express, Optical Society of America, Dec. 25, 2006, vol. 14, Issue 26, pp. 12712-12719. DOI:10.1364/OE14.012712.

Akhmad Herman Yuwono, Binghai Liu, Junmin Xue, John Wang, Hendry Izaac Elim, Wei Ji, Ying Li and Timothy John White, "Controlling the crystallinity and nonlinear optical properties of transparent $TiO_2$—PMMA nanohybrids". Journal of Materials Chemistry, The Royal Society of Chemistry, Aug. 20, 2004, vol. 14, Issue 20, pp. 2978-2987. DOI:10.1039%2Fb403530e.

Althues, H. and Henle, J. and Kaskel, S., "Functional inorganic nanofillers for transparent polymers", Chem. Soc. Rev., The Royal Society of Chemistry, 2007, vol. 36, Issue 9, pp. 1454-1465. DOI:10.1039/B608177K.

Non-Final Rejection, dated Mar. 27, 2015, for U.S. Appl. No. 14/215,056, filed Mar. 16, 2014.
Notice of Allowance, dated Jun. 8, 2015, for U.S. Appl. No. 14/215,056, filed Mar. 16, 2014.
Non-Final Rejection, dated Aug. 7, 2015, for U.S. Appl. No. 14/215,049, filed Mar. 16, 2014.
Notice of Allowance, dated Dec. 9, 2015, for U.S. Appl. No. 14/215,049, filed Mar. 16, 2014.
Non-Final Rejection, dated Dec. 16, 2015, for U.S. Appl. No. 14/215,041, filed Mar. 16, 2014.
Notice of Allowance, dated Sep. 29, 2916, for U.S. Appl. No. 14/215,041, filed Mar. 16, 2014.
Non-Final Rejection, dated Aug. 12, 2015, for U.S. Appl. No. 14/215,058, filed Mar. 16, 2014.
Notice of Allowance, dated Dec. 28, 2015, for U.S. Appl. No. 14/215,058, filed Mar. 16, 2014.
U.S. Appl. No. 14/932,593, filed Nov. 4, 2015.
U.S. Appl. No. 14/932,663, filed Nov. 4, 2015.
U.S. Appl. No. 14/932,717, filed Nov. 4, 2015.
U.S. Appl. No. 14/932,748, filed Nov. 4, 2015.
U.S. Appl. No. 15/095,161, filed Apr. 11, 2016.
U.S. Appl. No. 15/131,007, filed Apr. 17, 2016.
U.S. Appl. No. 15/340,960, filed Nov. 1, 2016.
Non-Final Rejection, dated Sep. 14, 2016, for U.S. Appl. No. 14/810,377, filed Jul. 27, 2015.
Notice of Allowance, dated Jan. 23, 2017, for U.S. Appl. No. 14/810,377, filed Jul. 27, 2015.
Non-Final Rejection, dated Jan. 30, 2017, for U.S. Appl. No. 15/131,007, filed Apr. 17, 2016.
U.S. Appl. No. 14/810,377, filed Jul. 27, 2015.
U.S. Appl. No. 15/429,150, filed Feb. 9, 2017.

* cited by examiner

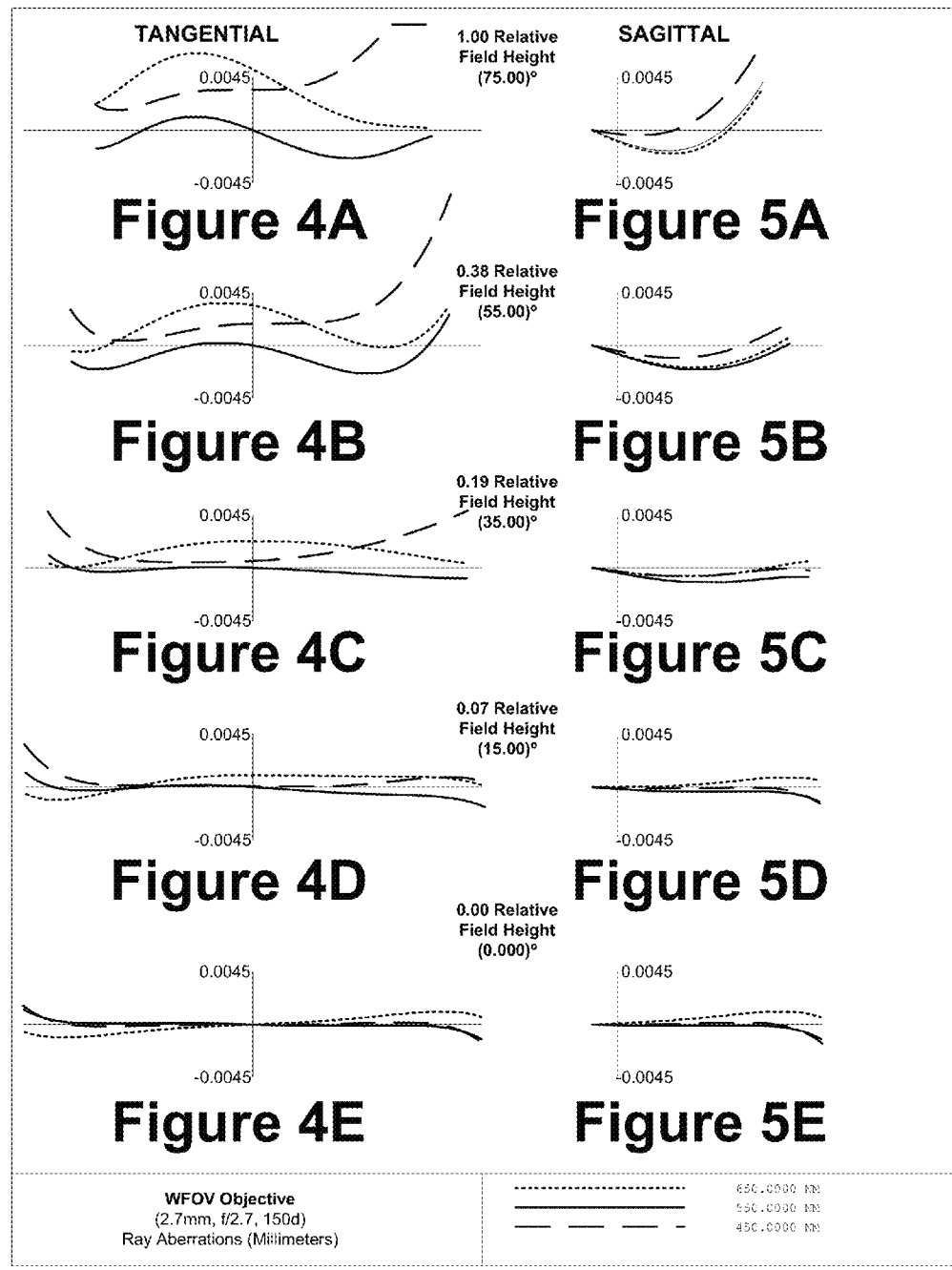

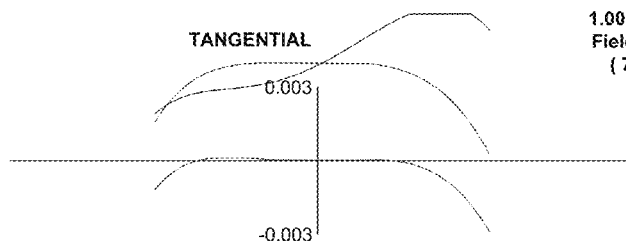
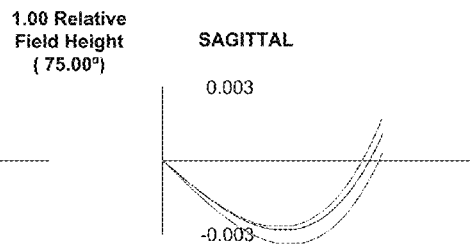
Figure 11A     Figure 12A
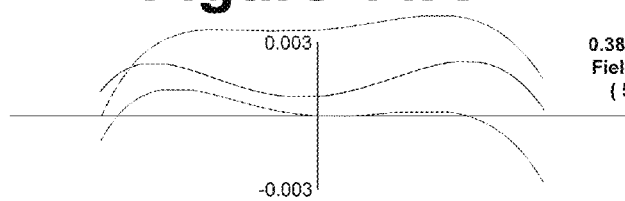
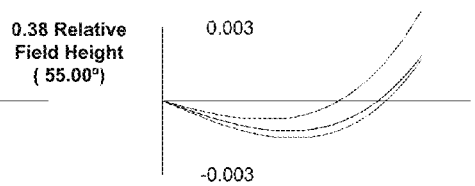
Figure 11B     Figure 12B
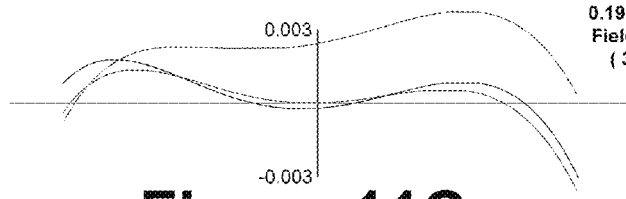
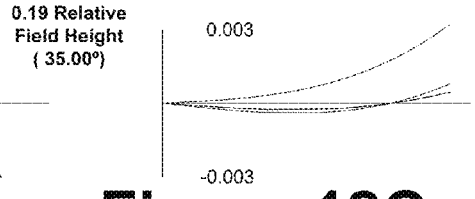
Figure 11C     Figure 12C
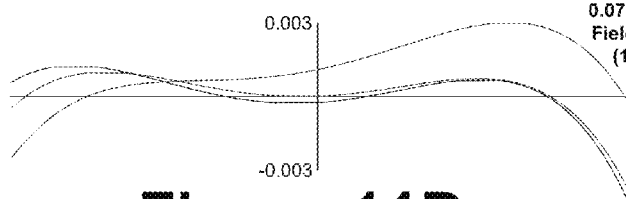
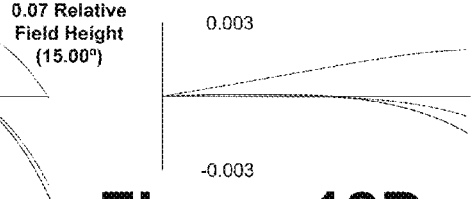
Figure 11D     Figure 12D
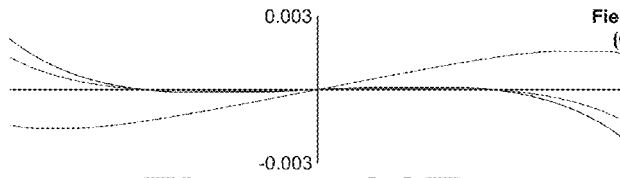
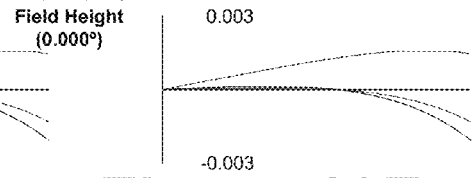
Figure 11E     Figure 12E
WFOV Objective
(2.7mm, f/2.7, 150d)
Ray Aberrations (Millimeters)
650.0000 NM
550.0000 NM
450.0000 NM There is a significant advantage to the location of doublet E5/E6 between E4 & E7. Specifically, this location facilitates the correction of oblique aberrations. In this embodiment, the E7 is a plano convex asphere wherein S1 is aspheric and S2 is plano.

There is a significant advantage to the location of doublet E5/E6 between E4 & E7. Specifically, this location facilitates the correction of oblique aberrations. In this embodiment, the E7 is a convex biaspheric lens.

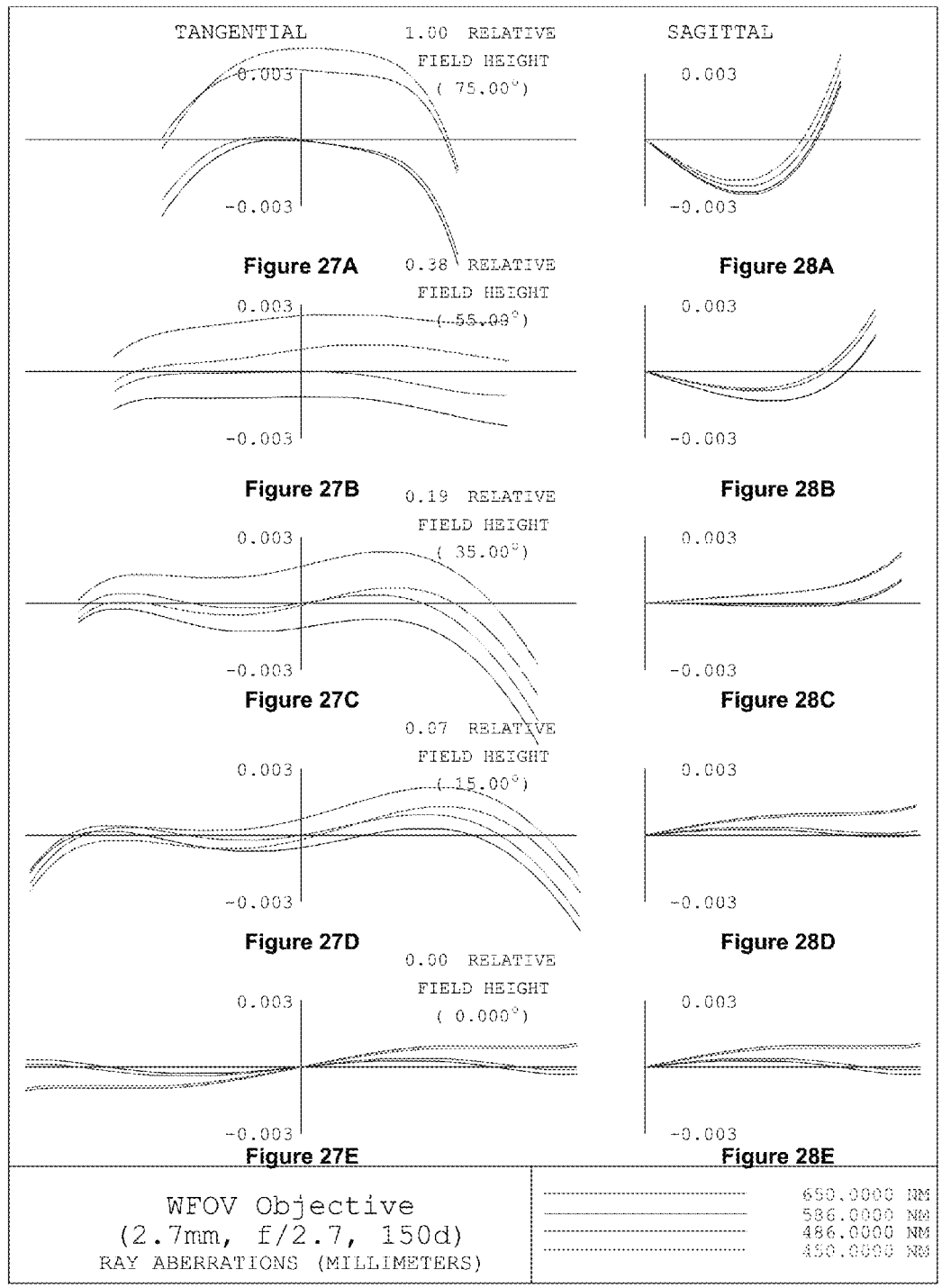

OPTICAL ASSEMBLY FOR A WIDE FIELD OF VIEW POINT ACTION CAMERA WITH LOW ASTIGMATISM

RELATED APPLICATIONS

This application is a Continuation of U.S. patent application Ser. No. 14/215,049, filed on Mar. 16, 2014, now U.S. Pat. No. 9,316,820; which is one of four contemporaneously-filed applications by the same Applicant and Inventors that are entitled: OPTICAL ASSEMBLY FOR A WIDE FIELD OF VIEW POINT ACTION CAMERA WITH LOW FIELD CURVATURE, application Ser. No. 14/215,041, now U.S. Pat. No. 9,494,772; OPTICAL ASSEMBLY FOR A WIDE FIELD OF VIEW POINT ACTION CAMERA WITH LOW ASTIGMATISM, application Ser. No. 14/215,049, now U.S. Pat. No. 9,316,820; OPTICAL ASSEMBLY FOR A WIDE FIELD OF VIEW POINT ACTION CAMERA WITH LOW TRACK LENGTH TO FOCAL LENGTH RATIO, application Ser. No. 14/215,056, now U.S. Pat. No. 9,091,843; and OPTICAL ASSEMBLY FOR A WIDE FIELD OF VIEW POINT ACTION CAMERA WITH A LOW SAG ASPHERIC LENS ELEMENT, application Ser. No. 14/215,058, now U.S. Pat. No. 9,316,808; which are each hereby incorporated by reference.

BACKGROUND

Point Action cameras, as they are referred to herein, go by many other names, including point of view cameras (see, e.g., pointofviewcameras.com), helmet cameras, action cams or action cameras, point of view shooter cams, video action cameras, and extreme sports cameras among others. Brand names include GoPro. Conventional point action cameras typically have significant distortion, particularly at the outer several degrees of the field of view. In addition, astigmatism errors in conventional point action cameras can negatively impact the appearance of the video images that it captures. It is desired to have a point action camera that is capable of capturing a wide field of view, or a field of view that is greater than 90 degrees in either or both of the horizontal (x) and/or vertical (y) dimensions (or an arbitrary axis normal to the depth (z) dimension), and perhaps 135-150 degrees or more in the horizontal (x) dimension and/or perhaps 110-120 degrees or more in the vertical (y) dimension, and that is configured with built-in distortion and astigmatism correction.

Distortion in wide field of view cameras has been reduced with image processing software (see, e.g., U.S. Pat. Nos. 8,493,459 and 8,493,460, and US published patent applications nos. US20110216156 and US20110216157). It is desired however to alternatively provide a point action camera, wherein the distortion that is typically inherent in wide field of view systems such as conventional point action cameras is compensated by an effective and efficient optical design.

Alex Ning describes a six lens design in U.S. Pat. No. 7,023,628 that has a ratio of total track length (TTL) to effective focal length (EFL), or TTL/EFL, that has a maximum value of 15 over which Ning states that the design would not have been considered compact. The Ning six lens design also has a minimum value of 8 under which Ning states that the design would not achieve the required fish eye field of view. U.S. Pat. No. 7,929,221 describes multiple optical assemblies that each include three aspheric surfaces on two lens elements and that each have a TTL/EFL ratio between 15 and 25. In an unrelated technical field, U.S. Pat. No. 7,675,694 nonetheless describes multiple optical assemblies that each include six aspheric surfaces on three lens elements.

It is recognized by the present inventors that it would be advantageous to have a design with a lower TTL/EFL ratio, which takes into account the desire for compactness in physical size as well as the desire to have point action video with a wide field of view without intolerable amounts of distortion and astigmatism errors. It is desired therefore to have an optical system for a point action camera that has a low TTL/EFL ratio and that also achieves a desired wide field of view with tolerable, minimal, insubstantial, insignificant or drastically reduced distortion and astigmatism characteristics.

BRIEF DESCRIPTION OF THE DRAWINGS

FIGS. 4A-4E and 5A-5E respectively show plots of tangential and sagittal ray aberrations for the wide field of view objective assembly illustrated in FIG. 1.

FIGS. 11A-11E and 12A-12E respectively show plots of tangential and sagittal ray aberrations for the wide field of view objective assembly illustrated in FIG. 8.

FIGS. 27A-27E and 28A-28E respectively show plots of tangential and sagittal ray aberrations for the wide field of view objective assembly illustrated in FIG. 22.

BRIEF DESCRIPTION OF THE TABLES

Figure 1:
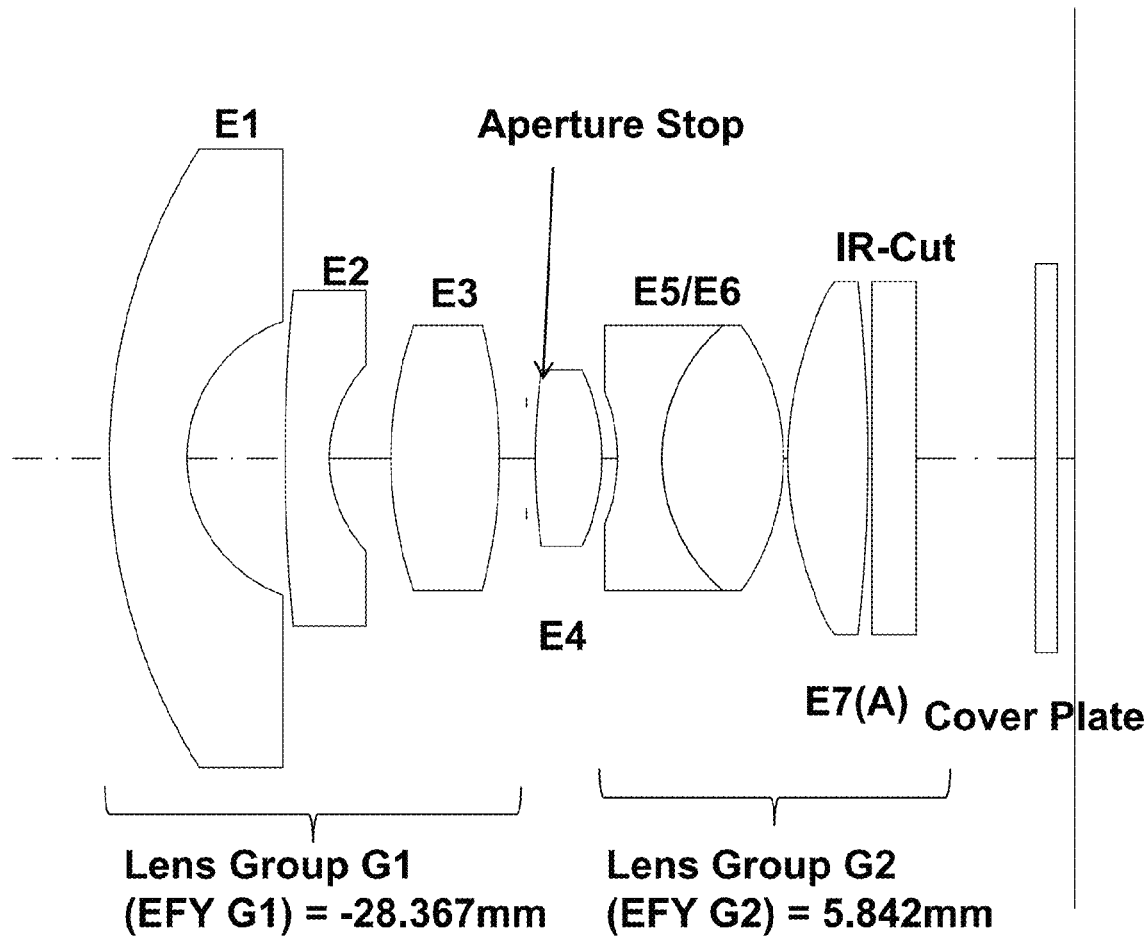
FIG. 1 schematically illustrates an optical assembly for a point action camera in accordance with certain embodiments.

Table 1 includes an Optical Design Prescription in accordance with a first example embodiment.

It is here noted that the Glass code=xxxxxx.yyyyyy describes the refractive index (xxxxxx) and dispersion (yyyyyy). For example: 516800.641672 means that the refractive index nd=1.517 and the dispersion vd=64.2, each for the "d-line", where the "d-line"=587.5618 d Yellow helium line He. This formula applies also to Tables 4, 7 and 10.

Table 2 includes Aspheric Sag Data Relative to Best Fit Sphere (SAG<20 um) in accordance with the first example embodiment.

Table 3 includes quantitative data for a Design of an aspheric element E7 that enables multiple order astigmatism correction in accordance with the first example embodiment.

Table 4 includes an Optical Design Prescription in accordance with a second example embodiment.

Table 5 includes Aspheric Sag Data Relative to Best Fit Sphere (SAG<17 um) in accordance with the second example embodiment.

Table 6 includes quantitative data for a Design of an aspheric element E7 that enables multiple order astigmatism correction in accordance with the second example embodiment.

Table 7 includes an Optical Design Prescription in accordance with a third example embodiment.

Table 8 includes Aspheric Sag Data Relative to Best Fit Sphere (SAG<17 um) in accordance with the third example embodiment. The best fit sphere bfs in this example is about 9.3 mm (bfs=9.287 mm)

Table 9 includes quantitative data for a Design of an aspheric element E7 that enables multiple order astigmatism correction in accordance with the third example embodiment.

Table 10 includes an Optical Design Prescription in accordance with a fourth example embodiment.

Table 11 includes Aspheric Sag data for a first of two aspheric lens surfaces (A1) of a single aspheric lens element of a wide field of view optical assembly for a point action camera in accordance with the fourth example embodiment. In this example, the Data is Relative to a Best Fit Sphere of about 9.15 mm (Rbfs=9.153 mm).

Table 12 includes Aspheric Sag data for a second of two aspheric lens surfaces (A2) of the single aspheric lens element of the fourth example embodiment. In this example, the Data is Relative to Best Fit Sphere of about −37.5 mm (Rbfs=−37.5 mm). The minus sign is indicative of a convex image facing surface of the single aspheric lens element of the optical assembly in accordance with the fourth example embodiment.

Table 13 includes quantitative asphere analysis data for the object facing surface A1 of a single aspheric lens element E7(A)(A) that enables multiple order astigmatism correction in accordance with the fourth example embodiment.

Table 14 includes quantitative asphere analysis data for the image facing surface A2 of a single aspheric lens element E7(A)(A) that enables multiple order astigmatism correction in accordance with the fourth example embodiment.

TABLE 1

| RDY | THI | RMD | GLA |
|---|---|---|---|
| >OBJ: INFINITY | 2500.000000 | | |
| 1: 13.10000 | 1.750000 | | 800999.349787 |
| 2: 3.30000 | 2.219000 | | |
| 3: 40.00000 | 1.000000 | | 496998.815947 |
| 4: 3.10000 | 1.390000 | | |
| 5: 9.00000 | 2.450000 | | 846670.237912 |
| 6: −11.63500 | 0.606000 | | |
| STO: INFINITY | 0.200000 | | |
| 8: 14.35000 | 1.500000 | | 883003.408069 |
| 9: −4.75000 | 0.359000 | | |
| 10: −4.03500 | 1.000000 | | 846670.237912 |
| 11: 3.95000 | 2.745000 | | 618000.633335 |
| 12: −5.22500 | 0.100000 | | |
| 13: 8.33000 | 1.800000 | | 516800.641673 |

SLB: "A1"
ASP:
A: −.902607E−03 B: −.512165E−04 C: 0.149690E−04
D: −.154499E−05 E: 0.561297E−07

| 14: | −37.50000 | 0.100000 | |
| 15: | INFINITY | 1.000000 | 516800.641673 |
| 16: | INFINITY | 2.681803 | |
| 17: | INFINITY | 0.500000 | 516800.641673 |
| 18: | INFINITY | 0.400000 | |
| IMG: | INFINITY | 0.000000 | |

SPECIFICATION DATA

| FNO | 2.70000 | | | | |
|---|---|---|---|---|---|
| DIM | MM | | | | |
| WL | 650.00 | 586.00 | 486.00 | 450.00 | |
| WTW | 1 | 1 | 1 | 1 | |
| XAN | 0.00000 | 0.00000 | 0.00000 | 0.00000 | 0.00000 |
| YAN | 0.00000 | 15.00000 | 35.00000 | 55.00000 | 75.00000 |

TABLE 2

ASPHERIC EQUATION $$Z = \frac{(CURV)Y^2}{1 + (1 - (1+K)(CURV)^2Y^2)^{1/2}(CURV)^2Y^2)^{1/2}} + (A)Y^4 + (B)Y^6 + (C)Y^8 + (D)Y^{10} + (E)Y^{12}$$

WHERE THE ASPHERIC COEFFICIENTS ARE AS FOLLOWS:
A  −.902607E−03
B  −.512165E−04
C  0.149690E−04
D  −.154499E−05
E  0.561297E−07

| Y | ASPH SAG (Z) | SPHERE SAG | SAG DIFFERENCE |
|---|---|---|---|
| 0.000000 | 0.000000 | 0.000000 | 0.000000 |
| 0.132000 | 0.001192 | 0.001046 | −0.000146 |
| 0.264000 | 0.004764 | 0.004184 | −0.000580 |
| 0.396000 | 0.010711 | 0.009418 | −0.001293 |
| 0.528000 | 0.019021 | 0.016750 | −0.002271 |
| 0.660000 | 0.029679 | 0.026187 | −0.003492 |
| 0.792000 | 0.042663 | 0.037736 | −0.004927 |
| 0.924000 | 0.057947 | 0.051405 | −0.006541 |
| 1.056000 | 0.075499 | 0.067205 | −0.008294 |
| 1.188000 | 0.095284 | 0.085149 | −0.010135 |
| 1.320000 | 0.117262 | 0.105250 | −0.012013 |
| 1.452000 | 0.141393 | 0.127524 | −0.013869 |
| 1.584000 | 0.167632 | 0.151988 | −0.015644 |
| 1.716000 | 0.195939 | 0.178664 | −0.017275 |
| 1.848000 | 0.226272 | 0.207572 | −0.018700 |
| 1.980000 | 0.258593 | 0.238737 | −0.019856 |
| 2.112000 | 0.292861 | 0.272184 | −0.020677 |
| 2.244000 | 0.329035 | 0.307942 | −0.021094 |
| 2.376000 | 0.367070 | 0.346042 | −0.021028 |
| 2.508000 | 0.406911 | 0.386518 | −0.020393 |
| 2.640000 | 0.448494 | 0.429406 | −0.019087 |
| 2.772000 | 0.491752 | 0.474747 | −0.017005 |
| 2.904000 | 0.536630 | 0.522582 | −0.014048 |
| 3.036000 | 0.583117 | 0.572957 | −0.010159 |
| 3.168000 | 0.631312 | 0.625924 | −0.005389 |
| 3.300000 | 0.681534 | 0.681534 | 0.000000 |

TABLE 3

| Height (Y) | Aspheric Sag (μm) | Height (Y) | Aspheric Slope (μm/mm) |
|---|---|---|---|
| 0.000 | 0.000 | 0 | 0 |
| 0.132 | −0.146 | 0.132 | −1.106060606 |
| 0.264 | −0.580 | 0.264 | −3.287878788 |
| 0.396 | −1.293 | 0.396 | −5.401515152 |
| 0.528 | −2.271 | 0.528 | −7.409090909 |
| 0.660 | −3.492 | 0.66 | −9.25 |
| 0.792 | −4.927 | 0.792 | −10.87121212 |
| 0.924 | −6.541 | 0.924 | −12.22727273 |
| 1.056 | −8.294 | 1.056 | −13.28030303 |
| 1.188 | −10.135 | 1.188 | −13.9469697 |
| 1.320 | −12.013 | 1.32 | −14.22727273 |
| 1.452 | −13.869 | 1.452 | −14.06060606 |
| 1.584 | −15.644 | 1.584 | −13.4469697 |
| 1.716 | −17.275 | 1.716 | −12.35606061 |
| 1.848 | −18.700 | 1.848 | −10.79545455 |
| 1.980 | −19.856 | 1.98 | −8.757575758 |
| 2.112 | −20.677 | 2.112 | −6.21969697 |
| 2.244 | −21.094 | 2.244 | −3.159090909 |
| 2.376 | −21.028 | 2.376 | 0.5 |
| 2.508 | −20.393 | 2.508 | 4.810606061 |
| 2.640 | −19.087 | 2.64 | 9.893939394 |
| 2.772 | −17.005 | 2.772 | 15.77272727 |
| 2.904 | −14.048 | 2.904 | 22.40151515 |
| 3.036 | −10.159 | 3.036 | 29.46212121 |
| 3.168 | −5.389 | 3.168 | 36.13636364 |
| 3.300 | 0.000 | 3.3 | 40.82575758 |

TABLE 4

| | RDY | THI | GLA |
|---|---|---|---|
| OBJ: | INFINITY | 2500.000000 | |
| 1: | 10.25000 | 1.500000 | 729157.546800 |
| 2: | 3.15000 | 1.802000 | |
| 3: | 6.25000 | 1.000000 | 729157.546800 |
| 4: | 2.24000 | 1.029000 | |
| 5: | 11.23500 | 3.220000 | 808095.227608 |
| 6: | INFINITY | 0.250000 | |
| STO: | INFINITY | 0.257000 | |
| 8: | −102.50000 | 1.225000 | 729157.546800 |
| 9: | −4.20000 | 0.100000 | |
| 10: | 8.55000 | 1.710000 | 922860.188969 |
| 11: | 3.72500 | 2.200000 | 618000.633335 |
| 12: | −29.92000 | 0.806000 | |
| >13: | 8.00971 | 1.500000 | 496999.815459 |

SLB: "A1"
ASP:
A: −.170738E−02 B: 0.959932E−04 C: −.862671E−05
D: 0.442436E−06

| 14: | −100.00000 | 0.250000 | |
| 15: | INFINITY | 0.500000 | 516330.641420 |
| 16: | INFINITY | 2.050000 | |

TABLE 4-continued

| | | | |
|---|---|---|---|
| 17: | INFINITY | 0.500000 | 516330.641420 |
| 18: | INFINITY | 0.400000 | |
| 19: | INFINITY | 0.000000 | |
| IMG: | INFINITY | 0.000000 | |

SPECIFICATION DATA

| | | | | | |
|---|---|---|---|---|---|
| FNO | 2.70000 | | | | |
| DIM | MM | | | | |
| WL | 650.00 | 586.00 | 486.00 | 450.00 | |
| WTW | 1 | 1 | 1 | 1 | |
| XAN | 0.00000 | 0.00000 | 0.00000 | 0.00000 | 0.00000 |
| YAN | 0.00000 | 15.00000 | 35.00000 | 55.00000 | 75.00000 |
| VUY | 0.00000 | 0.00000 | 0.15000 | 0.25000 | 0.40000 |
| VLY | 0.00000 | 0.00000 | 0.15000 | 0.25000 | 0.40000 |

TABLE 5

ASPHERIC EQUATION $$Z = \frac{(CURV)Y^2}{1 + (1 - (1+K)(CURV)^2 Y^2)^{1/2}} + (A)Y^4 + (B)Y^6 + (C)Y^8 + (D)Y^{10}$$

RADIUS OF BEST SPHERE = 9.447
WHERE THE ASPHERIC COEFFICIENTS ARE AS FOLLOWS:
A   −0.170738E−02
B    0.959932E−04
C   −0.862671E−05
D    0.442436E−06

| Y | ASPH SAG | SPHERE SAG | SAG DIFFERENCE |
|---|---|---|---|
| 0.000000 | 0.000000 | 0.000000 | 0.000000 |
| 0.115000 | 0.000825 | 0.000700 | −0.000125 |
| 0.230000 | 0.003298 | 0.002800 | −0.000498 |
| 0.345000 | 0.007409 | 0.006302 | −0.001107 |
| 0.460000 | 0.013144 | 0.011207 | −0.001938 |
| 0.575000 | 0.020483 | 0.017516 | −0.002966 |
| 0.690000 | 0.029399 | 0.025233 | −0.004165 |
| 0.805000 | 0.039863 | 0.034362 | −0.005501 |
| 0.920000 | 0.051843 | 0.044906 | −0.006936 |
| 1.035000 | 0.065300 | 0.056871 | −0.008430 |
| 1.150000 | 0.080198 | 0.070261 | −0.009937 |
| 1.265000 | 0.096493 | 0.085082 | −0.011411 |
| 1.380000 | 0.114145 | 0.101343 | −0.012802 |
| 1.495000 | 0.133109 | 0.119049 | −0.014060 |
| 1.610000 | 0.153340 | 0.138210 | −0.015131 |
| 1.725000 | 0.174794 | 0.158834 | −0.015961 |
| 1.840000 | 0.197425 | 0.180931 | −0.016494 |
| 1.955000 | 0.221188 | 0.204512 | −0.016676 |
| 2.070000 | 0.246038 | 0.229588 | −0.016450 |
| 2.185000 | 0.271933 | 0.256171 | −0.015762 |
| 2.300000 | 0.298836 | 0.284274 | −0.014561 |
| 2.415000 | 0.326717 | 0.313913 | −0.012805 |
| 2.530000 | 0.355562 | 0.345100 | −0.010461 |
| 2.645000 | 0.385376 | 0.377853 | −0.007523 |
| 2.760000 | 0.416200 | 0.412189 | −0.004012 |
| 2.875000 | 0.448125 | 0.448125 | 0.000000 |

TABLE 6

| Height (Y) | Aspheric Sag (μm) | Height (Y) | Aspheric Slope (μm/mm) |
|---|---|---|---|
| 0.000 | 0.000 | 0.000 | 0.000 |
| 0.115 | −0.125 | 0.115 | −1.087 |
| 0.230 | −0.498 | 0.230 | −3.243 |
| 0.345 | −1.107 | 0.345 | −5.296 |
| 0.460 | −1.938 | 0.460 | −7.226 |
| 0.575 | −2.966 | 0.575 | −8.939 |
| 0.690 | −4.165 | 0.690 | −10.426 |
| 0.805 | −5.501 | 0.805 | −11.617 |
| 0.920 | −6.936 | 0.920 | −12.478 |
| 1.035 | −8.430 | 1.035 | −12.991 |
| 1.150 | −9.937 | 1.150 | −13.104 |
| 1.265 | −11.411 | 1.265 | −12.817 |
| 1.380 | −12.802 | 1.380 | −12.096 |
| 1.495 | −14.060 | 1.495 | −10.939 |
| 1.610 | −15.131 | 1.610 | −9.313 |
| 1.725 | −15.961 | 1.725 | −7.217 |
| 1.840 | −16.494 | 1.840 | −4.635 |
| 1.955 | −16.676 | 1.955 | −1.583 |
| 2.070 | −16.450 | 2.070 | 1.965 |
| 2.185 | −15.762 | 2.185 | 5.983 |
| 2.300 | −14.561 | 2.300 | 10.443 |
| 2.415 | −12.805 | 2.415 | 15.270 |
| 2.530 | −10.461 | 2.530 | 20.383 |
| 2.645 | −7.523 | 2.645 | 25.548 |
| 2.760 | −4.012 | 2.760 | 30.530 |
| 2.875 | 0.000 | 2.875 | 34.887 |

TABLE 7

| | RDY | THI | RMD | GLA |
|---|---|---|---|---|
| OBJ: | INFINITY | INFINITY | | |
| 1: | 9.83500 | 1.500000 | | 729157.546800 |
| 2: | 3.20000 | 1.915000 | | |
| 3: | 7.46000 | 1.000000 | | 618000.633335 |
| 4: | 2.22000 | 1.028000 | | |
| 5: | 13.51456 | 3.000000 | | 808095.227608 |
| 6: | −15.50477 | 0.211500 | | |
| >STO: | INFINITY | 0.285400 | | |
| 8: | −48.00000 | 1.160000 | | 882997.407651 |
| 9: | −5.00000 | 0.285400 | | |
| 10: | INFINITY | 1.000000 | | 808095.227608 |
| 11: | 3.70000 | 2.500000 | | 618000.633335 |
| 12: | −7.20000 | 0.250000 | | |
| 13: | 8.64801 | 1.500000 | | 487490.702363 |
| SLB: "A1" | | | | |
| ASP: | | | | |
| A: −.980930E−03  B: 0.996294E−04  C: −.898355E−05 | | | | |
| D: 0.464096E−06 | | | | |
| 14: | INFINITY | 0.616800 | | |
| 15: | INFINITY | 0.500000 | | 516330.641420 |
| 16: | INFINITY | 2.647000 | | |
| 17: | INFINITY | 0.500000 | | 516330.641420 |
| 18: | INFINITY | 0.400000 | | |
| IMG: | INFINITY | 0.000000 | | |

SPECIFICATION DATA

| | | | | | |
|---|---|---|---|---|---|
| FNO | 2.70000 | | | | |
| DIM | MM | | | | |
| WL | 650.00 | 600.00 | 550.00 | 500.00 | 450.00 |
| REF | 3 | | | | |
| WTW | 1 | 1 | 1 | 1 | 1 |
| XAN | 0.00000 | 0.00000 | 0.00000 | 0.00000 | 0.00000 |
| YAN | 0.00000 | 15.00000 | 35.00000 | 55.00000 | 75.00000 |
| WTF | 1.00000 | 2.00000 | 1.00000 | 1.00000 | 1.00000 |
| VUY | 0.00000 | 0.00000 | 0.15000 | 0.25000 | 0.40000 |
| VLY | 0.00000 | 0.00000 | 0.15000 | 0.25000 | 0.40000 |

TABLE 8

ASPHERIC EQUATION $$Z = \frac{(CURV)Y^2}{1 + (1 - (1+K)(CURV)^2 Y^2)^{1/2}} + (A)Y^4 + (B)Y^6 + (C)Y^8 + (D)Y^{10}$$

ASPHERIC CONSTANTS
A   −.980930E−03
B    0.996294E−04

TABLE 8-continued

C  −.898355E−05
D  0.464096E−06

| Y | ASPH SAG | SPHERE SAG | SAG DIFFERENCE |
|---|---|---|---|
| 0.000000 | 0.000000 | 0.000000 | 0.000000 |
| 0.115000 | 0.000764 | 0.000712 | −0.000052 |
| 0.230000 | 0.003056 | 0.002849 | −0.000208 |
| 0.345000 | 0.006871 | 0.006411 | −0.000460 |
| 0.460000 | 0.012200 | 0.011400 | −0.000800 |
| 0.575000 | 0.019033 | 0.017818 | −0.001215 |
| 0.690000 | 0.027358 | 0.025669 | −0.001690 |
| 0.805000 | 0.037162 | 0.034956 | −0.002206 |
| 0.920000 | 0.048429 | 0.045683 | −0.002746 |
| 1.035000 | 0.061144 | 0.057855 | −0.003289 |
| 1.150000 | 0.075293 | 0.071479 | −0.003814 |
| 1.265000 | 0.090862 | 0.086560 | −0.004302 |
| 1.380000 | 0.107840 | 0.103106 | −0.004734 |
| 1.495000 | 0.126216 | 0.121124 | −0.005092 |
| 1.610000 | 0.145982 | 0.140624 | −0.005357 |
| 1.725000 | 0.167131 | 0.161615 | −0.005516 |
| 1.840000 | 0.189660 | 0.184107 | −0.005554 |
| 1.955000 | 0.213570 | 0.208111 | −0.005459 |
| 2.070000 | 0.238863 | 0.233639 | −0.005224 |
| 2.185000 | 0.265549 | 0.260705 | −0.004844 |
| 2.300000 | 0.293645 | 0.289322 | −0.004323 |
| 2.415000 | 0.323180 | 0.319505 | −0.003675 |
| 2.530000 | 0.354201 | 0.351270 | −0.002931 |
| 2.645000 | 0.386778 | 0.384633 | −0.002145 |
| 2.760000 | 0.421023 | 0.419614 | −0.001409 |
| 2.875000 | 0.457098 | 0.456230 | −0.000867 |

TABLE 9

| Height (Y) | Aspheric Sag (μm) | Height (Y) | Aspheric Slope (μm/mm) |
|---|---|---|---|
| 0.000 | 0.000 | 0 | 0 |
| 0.115 | −0.052 | 0.115 | −0.452173913 |
| 0.230 | −0.208 | 0.23 | −1.356521739 |
| 0.345 | −0.460 | 0.345 | −2.191304348 |
| 0.460 | −0.800 | 0.46 | −2.956521739 |
| 0.575 | −1.215 | 0.575 | −3.608695652 |
| 0.690 | −1.690 | 0.69 | −4.130434783 |
| 0.805 | −2.206 | 0.805 | −4.486956522 |
| 0.920 | −2.746 | 0.92 | −4.695652174 |
| 1.035 | −3.289 | 1.035 | −4.72173913 |
| 1.150 | −3.814 | 1.15 | −4.565217391 |
| 1.265 | −4.302 | 1.265 | −4.243478261 |
| 1.380 | −4.734 | 1.38 | −3.756521739 |
| 1.495 | −5.092 | 1.495 | −3.113043478 |
| 1.610 | −5.357 | 1.61 | −2.304347826 |
| 1.725 | −5.516 | 1.725 | −1.382608696 |
| 1.840 | −5.554 | 1.84 | −0.330434783 |
| 1.955 | −5.459 | 1.955 | 0.826086957 |
| 2.070 | −5.224 | 2.07 | 2.043478261 |
| 2.185 | −4.844 | 2.185 | 3.304347826 |
| 2.300 | −4.323 | 2.3 | 4.530434783 |
| 2.415 | −3.675 | 2.415 | 5.634782609 |
| 2.530 | −2.931 | 2.53 | 6.469565217 |
| 2.645 | −2.145 | 2.645 | 6.834782609 |
| 2.760 | −1.409 | 2.76 | 6.4 |
| 2.875 | −0.867 | 2.875 | 4.713043478 |

TABLE 10

| >OBJ: | INFINITY | INFINITY | |
|---|---|---|---|
| 1: | 9.75000 | 1.600000 | |
| 2: | 3.05000 | 1.770000 | |
| 3: | 6.30000 | 1.100000 | 729157.546800 |
| 4: | 2.20000 | 0.968200 | |
| 5: | 16.28500 | 2.617000 | 922860.188969 |
| 6: | −15.33500 | 0.256000 | |
| STO: | INFINITY | 0.294000 | |
| 8: | −16.50000 | 1.250000 | 618000.633335 |
| 9: | −3.95000 | 0.100000 | |
| 10: | 50.00000 | 1.000000 | 922860.188969 |
| 11: | 6.00000 | 2.300000 | 618000.633335 |
| 12: | −7.46500 | 0.250000 | |
| 13: | 9.64694 | 1.583000 | 496999.815459 |
| SLB: "A1" | | | |
| ASP: | | | |
| A: 0.171027E−03 B: 0.780901E−04 C: −.170715E−05 | | | |
| D: −.594285E−06 | | | |
| 14: | −18.95073 | 0.250000 | |
| SLB: "A2" | | | |
| ASP: | | | |
| A: 0.141992E−02 B: −.879215E−05 C: 0.135290E−04 | | | |
| D: −.133102E−05 | | | |
| 15: | INFINITY | 0.500000 | 516330.641420 |
| SLB: "ircut" | | | |
| 16: | INFINITY | 3.736401 | |
| 17: | INFINITY | 0.500000 | 516330.641420 |
| 18: | INFINITY | 0.400000 | |
| IMG: | INFINITY | 0.000000 | |

| SPECIFICATION DATA | | | | | |
|---|---|---|---|---|---|
| FNO | 2.70000 | | | | |
| DIM | MM | | | | |
| WL | 650.00 | 600.00 | 550.00 | 500.00 | 450.00 |
| REF | 3 | | | | |
| WTW | 1 | 1 | 1 | 1 | 1 |
| XAN | 0.00000 | 0.00000 | 0.00000 | 0.00000 | 0.00000 |
| YAN | 0.00000 | 15.00000 | 35.00000 | 55.00000 | 75.00000 |
| WTF | 1.00000 | 2.00000 | 1.00000 | 1.00000 | 1.00000 |

TABLE 11

ASPHERIC EQUATION $$Z = \frac{(CURV)Y^2}{1 + (1 - (1+K)(CURV)^2 Y^2)^{1/2}} + (A)Y^4 + (B)Y^6 + (C)Y^8 + (D)Y^{10}$$

ASPHERIC CONSTANTS

A  0.171027E−03
B  0.780901E−04
C  −0.170715E−05
D  −0.594285E−06

| Y | ASPH SAG | SPHERE SAG | SAG DIFFERENCE |
|---|---|---|---|
| 0.000000 | 0.000000 | 0.000000 | −0.005251 |
| 0.115000 | 0.000686 | 0.000722 | −0.005214 |
| 0.230000 | 0.002743 | 0.002890 | −0.005103 |
| 0.345000 | 0.006174 | 0.006504 | −0.004920 |
| 0.460000 | 0.010982 | 0.011566 | −0.004666 |
| 0.575000 | 0.017173 | 0.018079 | −0.004345 |
| 0.690000 | 0.024755 | 0.026045 | −0.003960 |
| 0.805000 | 0.033738 | 0.035469 | −0.003520 |
| 0.920000 | 0.044138 | 0.046354 | −0.003034 |
| 1.035000 | 0.055971 | 0.058706 | −0.002516 |
| 1.150000 | 0.069262 | 0.072532 | −0.001981 |
| 1.265000 | 0.084040 | 0.087838 | −0.001453 |
| 1.380000 | 0.100337 | 0.104630 | −0.000958 |
| 1.495000 | 0.118196 | 0.122919 | −0.000527 |
| 1.610000 | 0.137660 | 0.142712 | −0.000198 |
| 1.725000 | 0.158779 | 0.164020 | −0.000009 |
| 1.840000 | 0.181603 | 0.186854 | 0.000000 |
| 1.955000 | 0.206181 | 0.211224 | −0.000207 |
| 2.070000 | 0.232553 | 0.237145 | −0.000658 |
| 2.185000 | 0.260740 | 0.264629 | −0.001362 |
| 2.300000 | 0.290739 | 0.293691 | −0.002299 |
| 2.415000 | 0.322498 | 0.324346 | −0.003403 |
| 2.530000 | 0.355903 | 0.356611 | −0.004542 |
| 2.645000 | 0.390747 | 0.390505 | −0.005493 |
| 2.760000 | 0.426698 | 0.426045 | −0.005904 |
| 2.875000 | 0.463253 | 0.463253 | −0.005251 |

TABLE 12

ASPHERIC EQUATION $$Z = \frac{(CURV)Y^2}{1+(1-(1+K)(CURV)^2Y^2)^{1/2}} + (A)Y^4 + (B)Y^6 + (C)Y^8 + (D)Y^{10}$$

ASPHERIC CONSTANTS
A   0.141992E−02
B  −0.879215E−05
C   0.135290E−04
D  −0.133102E−05

| Y | ASPH SAG | SPHERE SAG | SAG DIFFERENCE |
|---|---|---|---|
| 0.000000 | 0.000000 | 0.000000 | 0.000000 |
| 0.120000 | −0.000380 | −0.000192 | 0.000188 |
| 0.240000 | −0.001515 | −0.000768 | 0.000747 |
| 0.360000 | −0.003396 | −0.001728 | 0.001668 |
| 0.480000 | −0.006005 | −0.003072 | 0.002932 |
| 0.600000 | −0.009317 | −0.004800 | 0.004517 |
| 0.720000 | −0.013301 | −0.006913 | 0.006389 |
| 0.840000 | −0.017919 | −0.009409 | 0.008510 |
| 0.960000 | −0.023123 | −0.012290 | 0.010833 |
| 1.080000 | −0.028860 | −0.015555 | 0.013304 |
| 1.200000 | −0.035063 | −0.019205 | 0.015859 |
| 1.320000 | −0.041660 | −0.023239 | 0.018421 |
| 1.440000 | −0.048563 | −0.027658 | 0.020905 |
| 1.560000 | −0.055674 | −0.032462 | 0.023212 |
| 1.680000 | −0.062880 | −0.037651 | 0.025230 |
| 1.800000 | −0.070056 | −0.043225 | 0.026831 |
| 1.920000 | −0.077066 | −0.049184 | 0.027882 |
| 2.040000 | −0.083766 | −0.055529 | 0.028237 |
| 2.160000 | −0.090017 | −0.062259 | 0.027758 |
| 2.280000 | −0.095693 | −0.069376 | 0.026317 |
| 2.400000 | −0.100705 | −0.076878 | 0.023827 |
| 2.520000 | −0.105031 | −0.084767 | 0.020264 |
| 2.640000 | −0.108758 | −0.093043 | 0.015715 |
| 2.760000 | −0.112139 | −0.101705 | 0.010433 |
| 2.880000 | −0.115670 | −0.110755 | 0.004915 |
| 3.000000 | −0.120192 | −0.120192 | 0.000000 |

TABLE 13

| Height (Y) | Aspheric Sag (μm) | Height (Y) | Aspheric Slope (μm/mm) |
|---|---|---|---|
| 0.000 | −5.251 | 0 | 0.000 |
| 0.115 | −5.214 | 0.115 | 0.322 |
| 0.230 | −5.103 | 0.23 | 0.965 |
| 0.345 | −4.920 | 0.345 | 1.591 |
| 0.460 | −4.666 | 0.46 | 2.209 |
| 0.575 | −4.345 | 0.575 | 2.791 |
| 0.690 | −3.960 | 0.69 | 3.348 |
| 0.805 | −3.520 | 0.805 | 3.826 |
| 0.920 | −3.034 | 0.92 | 4.226 |
| 1.035 | −2.516 | 1.035 | 4.504 |
| 1.150 | −1.981 | 1.15 | 4.652 |
| 1.265 | −1.453 | 1.265 | 4.591 |
| 1.380 | −0.958 | 1.38 | 4.304 |
| 1.495 | −0.527 | 1.495 | 3.748 |
| 1.610 | −0.198 | 1.61 | 2.861 |
| 1.725 | −0.009 | 1.725 | 1.643 |
| 1.840 | 0.000 | 1.84 | 0.078 |
| 1.955 | −0.207 | 1.955 | −1.800 |
| 2.070 | −0.658 | 2.07 | −3.922 |
| 2.185 | −1.362 | 2.185 | −6.122 |
| 2.300 | −2.299 | 2.3 | −8.148 |
| 2.415 | −3.403 | 2.415 | −9.600 |
| 2.530 | −4.542 | 2.53 | −9.904 |
| 2.645 | −5.493 | 2.645 | −8.270 |
| 2.760 | −5.904 | 2.76 | −3.574 |
| 2.875 | −5.251 | 2.875 | 5.678 |

TABLE 14

| Height (Y) | Aspheric Sag (μm) | Height (Y) | Aspheric Slope (μm/mm) |
|---|---|---|---|
| 0.000 | 0 | 0 | 0.000 |
| 0.120 | 0.188 | 0.12 | 1.567 |
| 0.240 | 0.747 | 0.24 | 4.658 |
| 0.360 | 1.668 | 0.36 | 7.675 |
| 0.480 | 2.932 | 0.48 | 10.533 |
| 0.600 | 4.517 | 0.6 | 13.208 |
| 0.720 | 6.389 | 0.72 | 15.600 |
| 0.840 | 8.51 | 0.84 | 17.675 |
| 0.960 | 10.833 | 0.96 | 19.358 |
| 1.080 | 13.304 | 1.08 | 20.592 |
| 1.200 | 15.859 | 1.2 | 21.292 |
| 1.320 | 18.421 | 1.32 | 21.350 |
| 1.440 | 20.905 | 1.44 | 20.700 |
| 1.560 | 23.212 | 1.56 | 19.225 |
| 1.680 | 25.23 | 1.68 | 16.817 |
| 1.800 | 26.831 | 1.8 | 13.342 |
| 1.920 | 27.882 | 1.92 | 8.758 |
| 2.040 | 28.237 | 2.04 | 2.958 |
| 2.160 | 27.758 | 2.16 | −3.992 |
| 2.280 | 26.317 | 2.28 | −12.008 |
| 2.400 | 23.827 | 2.4 | −20.750 |
| 2.520 | 20.264 | 2.52 | −29.692 |
| 2.640 | 15.715 | 2.64 | −37.908 |
| 2.760 | 10.433 | 2.76 | −44.017 |
| 2.880 | 4.915 | 2.88 | −45.983 |
| 3.000 | 0 | 3 | −40.958 |

DETAILED DESCRIPTIONS OF THE EMBODIMENTS

An optical assembly for a point action camera having a wide field of view includes multiple lens elements including an aspheric surface. The optical assembly is configured to provide a wide field of view, which is in certain embodiments in excess of 150 degrees. The optical assembly includes an inward field curvature of less than approximately 75 microns. In certain embodiments, the inward field curvature is less than approximately 60 microns. In other embodiments, the inward field curvature is less than approximately 50 microns or less.

Another optical assembly for a point action camera having a wide field of view, comprising multiple lens elements, including an aspheric surface, configured to provide a field of view in excess of 150 degrees that comprises a longitudinal astigmatism of 0.7 mm or less.

Another optical assembly for a point action camera having a wide field of view, comprising multiple lens elements, including an aspheric surface, configured to provide a field of view in excess of 150 degrees that comprises a ratio of total track length to effective focal length that is less than 8.

Another optical assembly for a point action camera having a wide field of view, comprising multiple lens elements, including an aspheric surface with an approximately 30 microns or less sag and an approximately 25 microns/millimeter aspheric sag slope, configured to provide a field of view in excess of 150 degrees.

In certain embodiments, the longitudinal astigmatism comprises approximately 0.6 mm or less, or in other embodiments, approximately 0.5 mm or less, or approximately 0.3 mm or less, or approximately 0.2 mm or less, or approximately 0.1 mm or less in certain embodiments.

From object end to image end, an optical assembly in accordance with certain embodiments includes a first optical group and a second optical group, wherein the first optical group is configured to collect light at a wide field of view and a second optical group is configured to correct distortion or astigmatism error or both. An aperture stop may be disposed between said first and second optical groups.

The second optical group may be configured to correct astigmatism error. The second optical group may include multiple lens elements including an ultimate or penultimate lens element that is configured with an aspheric departure to correct astigmatism error. In certain embodiments, the ultimate lens element of the optical lens assembly includes an aspheric departure. In certain embodiments, an object facing surface of the ultimate lens element has an aspheric departure. The optical assembly may include seven lens elements.

A second optical group (from object to image) may include four lens elements. The second optical group may include, from object side to image side, a first singlet, a doublet and a second singlet. The first singlet may include a biconvex or plano-convex or quasi-plano-convex lens. The second singlet may include a biconvex, or convexo-plano or convexo-quasi-plano lens.

The first optical group may include two or more convexo-concave or meniscus lenses. The first optical group may include a biconvex lens. The doublet may include in certain embodiments, from object side to image side, a biconcave lens and a biconvex lens.

A third optical group may be disposed between the first and second optical groups. The third optical group may include a biconvex lens.

The lateral chromatic aberration (LCA) of an optical assembly in accordance with certain embodiments may be less than approximately three pixels. The LCA in certain embodiments may be less than approximately two pixels. The LCA in certain embodiments may be less than approximately five microns or less than approximately three microns.

An optical assembly in accordance with certain embodiments may include a single aspheric lens element, which may be the only aspheric lens element within the optical assembly. In these embodiments, lens elements other than the single aspheric lens element have spherical or planar lens surfaces, or both, each without significant aspheric departures.

An optical assembly in accordance with certain embodiments may include a single aspheric lens surface, which may be the only aspheric lens surface within the optical assembly. In these embodiments, lens surfaces other than the single aspheric lens surface have spherical or planar lens surfaces, or both, each without significant aspheric departures.

Another optical assembly in accordance with certain embodiments includes only one aspheric lens element. Subsets of these embodiments include lens elements that have two aspheric surfaces, i.e., both the object facing surface and the image facing surface of a same aspheric lens element are configured with aspheric departure. Other subsets of these embodiments include lens elements that have only a single aspheric lens surface, i.e., either the object facing surface or the image facing surface is aspheric, while the other surface does not have significant aspheric departure or to tolerance one of the lens surfaces is spherical.

Another optical assembly in accordance with certain embodiments includes only one aspheric lens surface. This optical assembly includes a single aspheric lens surface configured to correct astigmatism.

A digital point action camera is provided that includes any of the optical assemblies described herein, along with an image sensor disposed approximately at a focal plane of the optical assembly. A digital camera housing includes electronics and a user interface, and contains and durably affixes the optical assembly and the image sensor in optically effective relative disposition. The housing may be waterproof and may include shock absorbing material to withstand shocks such as may be caused by collisions or sudden acceleration or high speed or high frequency jitter.

An aspheric lens element is provided for an optical assembly of a wide field of view point action camera in accordance with any of the embodiments of optical assemblies or point action cameras described herein. In certain embodiments, one or both surfaces has an approximately 30 microns or less sag and an approximately 25 microns/millimeter or less aspheric sag slope. In a specific embodiment, only a single lens surface has aspheric departure. In another embodiment, both the image facing surface and the object facing surface of the same lens element include aspheric departures.

In addition, combinations of features described herein, above and/or below, with regard to different embodiments form additional embodiments of optical assemblies, point action cameras and aspheric lens elements.

Several example embodiments are described below and are illustrated in the accompanying drawings. In certain embodiments, a seventh lens element, from object to image, is the only lens element of the optical assembly that includes one or two surfaces aspheric surfaces. In certain embodiments, the object facing surface of the seventh lens element or the thirteenth surface of the optical assembly has an aspheric departure, while the image facing surface of the seventh lens element or the fourteenth surface of the optical assembly may have an aspheric surface also, or a spherical surface that may be slightly curved or quasi-planar, or may have a significant spherical curvature, or may be approximately planar. Alternatively, the fourteenth surface may be the only surface of the optical assembly that has an aspheric departure, while the thirteenth surface has a planar, quasi-planar or convex spherical curvature. The single lens element of the optical assembly that has aspheric departure may be the fifth or sixth lens element rather than the seventh, or may be instead the first or the second lens element. In these alternative embodiments, one or both surfaces of the single aspheric lens element may have aspheric departure, and in those embodiments wherein only a single lens surface has aspheric departure, the other surface of the aspheric lens element may be planar, or may be quasi-planar or slightly spherically curved, or may be significantly spherical.

First Example Embodiment

Referring to the example illustrated schematically in FIG. 1, and in the plots shown in FIGS. 2-7, and quantitatively at Tables 1-3, an optical assembly in accordance with certain embodiments may include a first lens group G1 and a second lens group G2. The first lens group G1 is disposed nearer to the object or scene that is being imaged than the second lens group G2. The second lens group G2 is disposed between the first lens group G1 and the image plane. Together, the first and second optical groups G1 and G2 cover a wide field of view, i.e., greater than 120 degrees, or in certain embodiment greater than 135 degrees and in others greater than 150 degrees and even in certain embodiments significantly close to 180 degrees. Alternatively, there may be three, or more, lens groups instead of two, or the entire optical assembly may form a single lens group.

Generally speaking, the lens group G1 is configured to collect wide field rays, whereas the lens group G2 is configured to correct aberrations, and particularly distortion and astigmatism. However, the configuration can include contributions within the second lens group G2 to the collection of wide field rays and/or contributions within the first lens group G1 to the correction of aberrations such as distortion and astigmatism. For example, one or more lens elements of the group G2 may have a reduced diameter or a material or shape characteristic tending to facilitate collection of wide angle rays and/or a surface of a lens element of group G1 may have aspheric departure configured to assist in the correction of aberrations.

In the embodiment illustrated schematically at FIG. 1, the first lens group G1 includes three lenses from furthest to closest to the image plane, namely lens E1, lens E2 and lens E3.

Lens E1 comprises a convex-concave lens, or meniscus, in the example embodiment of FIG. 1. This means that the object facing surface of lens E1, which is the first surface of the optical assembly of the example embodiment of FIG. 1, has a convex shape tending to converge incident light, while the image facing surface of lens E1, which is the second surface of the optical assembly of FIG. 1, has a concave shape tending to diverge incident light. The lens E1 has a nominal overall optical power. This lens E1 may have an extended radius outside of an active radius which assists and facilitates a wide field of view feature of the optical assembly of FIG. 1. The physical dimensional characteristics of the lenses of the optical assemblies of the embodiments described herein generally permit configuring the wide field of view optical assembly within a lens barrel of a point action camera and/or within a compact or miniature point action camera.

The lens E1 may be fixed, i.e., relative to the image plane and other fixed elements of the system. Alternatively, the lens E1 may be movable to permit focusing by automatic or manual actuation using, e.g., a voice coil motor, piezo, or MEMS coupled to the lens E1. In this alternative embodiment, a feedback based on analysis of image data received at the image sensor by a processor, an image processor or an image signal processor (ISP). Another optical group may include one or more movable lenses, mirrors or other optics. In this context, a zoom feature may also be provided optically and/or electronically. Thus, embodiments of point action cameras described herein include fixed focus, autofocus and autofocus zoom point action cameras. In certain embodiments, the lens E1 has an index of refraction at the sodium d line (i.e., 587.5618 nm) at around 1.8, or $n(\lambda_d) \approx 1.8$. The dispersion may be around 35. In certain embodiments, the lens E1 may be obtained from the CDGM glass company of type HZLAF66. The lens E1 has little overall optical power, as mentioned, and serves primarily as a collecting lens that facilitates the wide field of view of the optical assembly.

Lens E1 has a larger diameter in order to collect rays at outer edges of a wide field of view and reduces the field angle for the subsequent lenses of the optical assembly. Lens group G1, and particularly lenses E1 and E2, generally serves to reduce the ray angle for the group G2 lens elements. Lens group G2 generally serves to correct distortion and astigmatism errors. The overall optical design of the second lens group generally serves to correct distortion, while the aspheric thirteenth surface of the optical assembly of FIG. 1 generally serves to correct astigmatism.

The lens element E2 of the lens group G1 has a convexoconcave or plano-concave or quasi-plano-concave structure in the example of FIG. 1. In other words the object facing surface of the lens E2, which is the third surface of the optical assembly of FIG. 1, has a slightly or nominally convex or planar surface shape, while the image facing surface of the lens E2, or the fourth surface of the optical assembly of FIG. 1, has a concave shape tending to diverge incident light rays. In certain embodiments, the lens element E2 may be obtained from the CDGM glass company of type HFK61. The lens E2 has a negative overall focal length and serves as a diverging optical element. In certain embodiments, the lens E2 has an index of refraction at the sodium d line (i.e., 587.5618 nm) at around 1.5, or $n(\lambda_d) \approx 1.5$. The dispersion may be around 82. In certain embodiments, the lens element E2 may be obtained from the CDGM glass company of type HZF52A.

The lens element E3 comprises a functionally converging optical element and has a biconvex structure in the illustrative example of FIG. 1. Both the object facing and image facing surfaces of the lens element E3, which are the fifth and sixth surfaces of the optical assembly that is illustrated schematically in the example embodiment of FIG. 1, are convex and tend to converge incident light. The lens element E3 has a strongest positive optical power among the elements of group 1. In certain embodiments, the lens E3 has an index of refraction at the sodium d line (i.e., 587.5618 nm) at around 1.85, or $n(\lambda_d) \approx 0.8$. The dispersion may be around 24. In certain embodiments, the lens element E3 may be obtained from the CDGM glass company of type HZF52A.

The lens group G1 has an overall negative focal length, e.g., in one embodiment EFL (G1)≈−28.4 mm, and serves to collect and converge incoming light from an object, group of objects or a foreground, background or overall scene, including a wide field of view greater than 90 degrees in the horizontal and/or vertical dimensions, and typically 135-150 degrees or more in the horizontal and/or 110-120 degrees or more in the vertical. The first two lens elements E1 and E2 have a combined focal length in one example of around −2.6 mm, while the lens element E3 has a focal length of around +6.3 mm. The rays received from the optical group G1 are not greatly further optically reduced by optical group G2, which has a positive focal length, e.g., in one embodiment EFL (G2)≈5.8 mm. Optical group G2 serves to correct distortion and astigmatism before images are captured by an image sensor of a point action camera for viewing on a display, and/or for recording or storage or for data analysis, monitoring, security or surveillance and/or for transmission and/or image processing.

The lens group G1 may include two lenses or four lenses, or even one lens or five or more lenses. An aperture stop is disposed between the lens element E3 and the lens element E4 in the example of FIG. 1. Alternatively, an aperture stop is disposed between the lens groups G1 and G2, whatever number of optical elements each may comprise. An aperture stop may be located differently and there may be one or more additional apertures within the optical assembly.

The optical group G2 in the example of FIG. 1 includes three or four lens elements, depending on whether one considers a lens doublet to comprise a single lens element or two lens elements. The lens group G2 in the example of FIG. 1 includes lens E4, lens doublet E5/E6 and lens E7.

Lens E4 may have a biconvex, plano-convex or quasi-plano-convex shape. That is, the object facing surface of lens E4, which is the seventh surface of the optical assembly of FIG. 1, has a slightly or nominally convex or planar shape, while the image facing surface of the lens E4, which is the eighth surface of the optical assembly of FIG. 1, has a convex shape tending to converge incident light. The lens E4 is disposed in the example of FIG. 1 just on the image side of an aperture stop. The lens E4 has an overall positive focal length and is functionally convergent of incident light after that light has been collected by the lens group G1, has passed through the aperture and has become incident upon the object facing surface of lens E4, or surface 7 of the overall optical assembly of FIG. 1. In certain embodiments, the lens E4 has an index of refraction at the sodium d line (i.e., 587.5618 nm) at around 1.88, or $n(\lambda_d) \approx 0.9$. The dispersion may be around 41. In certain embodiments, the lens E4 may be obtained from the CDGM glass company as type HZLAF68B.

The lens E5 has a biconcave shape while the lens E6 has a biconvex shape. The ninth and tenth surfaces of the optical assembly of FIG. 1, or both of the two surfaces of lens E5, have a concave shape tending to diverge incident light rays, while the eleventh and twelfth surfaces of the optical assembly of FIG. 1, or both of the two surfaces of the lens E6, have a convex shape. The twelfth surface of the optical assembly may be strongly convex and tend to relatively strongly converge incident light.

The lenses E5 and E6 are coupled together to form a doublet. In certain embodiments, the image facing surface of lens E5 and the object facing surface of the lens E6 are in direct contact. An adhesive or other standard process of coupling constituent lenses of a doublet may be used, which process may depend upon the materials of the constituent lenses E5 and E6. In certain embodiments, the lens E5 has an index of refraction at the sodium d line (i.e., 587.5618 nm) at around 1.85, or $n(\lambda_d) \approx 1.8$. The dispersion of lens E5 may be around 24. In certain embodiments, the lens E6 has $n(\lambda_d) \approx 0.6$. In certain embodiments, the lens E6 has a dispersion around 63. In certain embodiments, the lens E5 may be obtained from the CDGM glass company of type HZF52A, while the lens E6 may be obtained from the OHARA corporation of type SPHM52. The doublet overall serves to configure the light rays before becoming incident upon the lens element E7(A).

Referring to FIG. 1, there a significant advantage to having an optical assembly in accordance with certain embodiments, wherein the E5/E6 doublet, which is shown disposed between the fourth singlet and the asphere in FIG. 1, is configured to correct oblique aberrations. Alternatively, the doublet may be disposed between lens E3 and lens E4.

The lens element E7(A) has a biconvex, or convexo-quasi-plano, or convexo-plano shape. The object facing surface of the lens E7(A), which is the thirteenth surface of the optical assembly of FIG. 1, has a strongly convex shape which relatively strongly converges incident light. The thirteenth surface of the optical assembly of FIG. 1 is also aspheric in this example embodiment. The image facing surface of the lens E7(A), which is the fourteenth surface of the optical assembly of FIG. 1, has a slightly or nominally convex or planar shape.

Between the fourteenth surface of the optical assembly of FIG. 1 and the image plane are an IR filter and a cover plate. The IR filter serves to cut out infrared light that can otherwise interfere with the function of a silicon-based image sensor to collect visible image data. The cover plate serves to protect the image sensor from incident dust, water, oxygen or other corrosive or artifact producing elements that may be present in the ambient space surrounding the point action camera. A separate baffle may be included to reduce the amount of stray light that may become otherwise incident upon the image sensor. Each of the seventh lens, the IR filter and the cover glass may comprise NBK7 Schott glass, such that each may have a refractive index around 1.5 and a dispersion around 64.

The aspheric departure of the thirteenth optical surface of the optical assembly in the example embodiment of FIG. 1 serves to advantageously significantly reduce astigmatism errors that would be otherwise inherent in a wide field of view system without an aspheric surface in accordance with embodiments described herein. Moreover, the advantageous design of the optical assembly of FIG. 1, and specifically of the second optical group G2, and more specifically of the lens element E7(A), and still more specifically of the object facing surface of the lens element E7(A) permits the optical assembly in this embodiment to have a more efficient manufacturability than conventional designs that contain multiple aspheric surfaces and/or multiple aspheric lens or other optical elements.

FIG. 1 has $H(\theta)/f^*\theta = 1.078$. In another similar embodiment $H(\theta)/f^*\theta = 1.174$. In other embodiments, $H(\theta)/f^*\theta$ is greater than 1.2, 1.3, 1.4 and even 1.5, and in other embodiments $H(\theta)/f^*\theta$ is approximately 1.

Table 1 generally discloses certain specifications of the example optical assembly that is represented schematically in side view in FIG. 1. Table 1 lists RDY, which is the radius of curvature of the optical surface. Table 1 lists THI which are the thicknesses of the lens elements and airspaces in sequential order. The row 1 thickness described the thickness of the first lens element in this embodiment. The row 2 thickness describes the thickness of the spacing between the first and second lens elements. The spacing may include air, or for example dry air or nitrogen gas or vacuum or a noble gas, or a liquid such as water. The row 3 describes the thickness of the second lens element. The row 4 describes the air spacing between the second and third lens elements in this example. The row 5 describes the thickness of the third lens element. The row 6 describes the thickness of the spacing between the third lens element and the aperture stop. The row STO describes the thickness of the air spacing between the aperture stop and the fourth lens element. The row 8 describes the thickness of the fourth lens element. The row 9 describes the air spacing between the fourth lens element and the fifth lens element. The row 10 describes the thickness of the fifth lens element. The row 11 describes the thickness of the sixth lens element. There is no air thickness between the fifth and sixth lens elements described in the Table 1, because the fifth and sixth lens elements form a doublet in this example, wherein the tenth and eleventh surfaces of the optical assembly are substantially in contact with each other. The row 12 describes the thickness of the spacing between the sixth lens and the seventh lens in this example. The row 13 describes the thickness of the seventh lens. The row 14 describes the spacing between the seventh lens and the IR cut filter. The row 15 describes the thickness of the IR cut filter. The row 16 describes the spacing thickness between the IR cut filter and the cover plate (e.g., glass or polymer) for the image sensor. The row 18 describes the spacing between the cover plate and the image sensor. The row IMG describes the image sensor plane.

Seven lens elements E1-E7(A) make up the example optical assembly that is illustrated schematically at FIG. 1, while a point action camera includes the IR cut filter, cover glass and an image sensor packaged within a housing along with the optical assembly. The first three lens elements E1-E3 form a first optical group G1 (or E1-E2 form G1 and E3 alone forms G2), while the final four lens elements E4-E7(A) form a second optical group G2 (or E4-E7(A) form a third optical group G3).

The radii of curvature are, in the single aspheric surface example, approximately, i.e., within manufacturing tolerances, the same everywhere along the optical surface for each of the first through twelfth and fourteenth surfaces of the optical assembly of FIG. 1. That is, the coefficients A thru E are each approximately zero for 13 out of 14 surfaces of the embodiment of FIG. 1 in the single aspheric surface example of a wide field of view optical assembly for a point action camera or compact camera, or miniature camera module or other camera or camera module including a single aspheric lens element, or only one aspheric lens element, and exhibiting advantageously low distortion and low astigmatism. The departures from spherical of the thirteenth surface are represented in Table 1 as nonzero coefficients A-E, which correspond mathematically to the coefficients indicated in the formula that is provided above the Table 2 in the illustration.

This formula with the non-zero coefficients A-E as indicated in Table 1 represent the aspheric curvature of the surface 13 of the example optical assembly that is illustrated schematically in FIG. 1.

The specification data of Table 1 represent the first order software inputs to complete the optical model. FNO is F number and is approximately 2.7 in this example. DIM is the dimension which is mm. WL are the wavelengths which are in nanometers, and are 650 nm (red), 586 nm (yellow), 486 nm (blue) and 450 nm (violet) in this example. WTF is the spectral wavelength weighting. XAN and YAN are the x and y field angles. VUY and VLY are the vignetting factors for each field. WID indicates that the example of FIG. 1 is for a wide field of view or WFOV.

Table 2 shows aspherical and spherical SAG data for the thirteenth surface of the optical assembly of FIG. 1. These data may fit to a formula for SAG for a spherical conic section, e.g., $z(r)=r^2/[R+(R^2-r^2)^{1/2}]$, wherein for a best sphere of radius 8.330, as in an example embodiment, and a curvature of best sphere, R, corresponding to 0.120047, the different actual radii of curvature, r, for a surface with aspheric departure produce SAG differences compared to values for a true spherical conic section. These aspherical SAGs for an example thirteenth surface are compared with would be true spherical SAGs in Table 2 for different distances Y from the vertex center at Y=0 to Y=3.3 (mm) in steps of 0.132 (mm).

Figure 2:
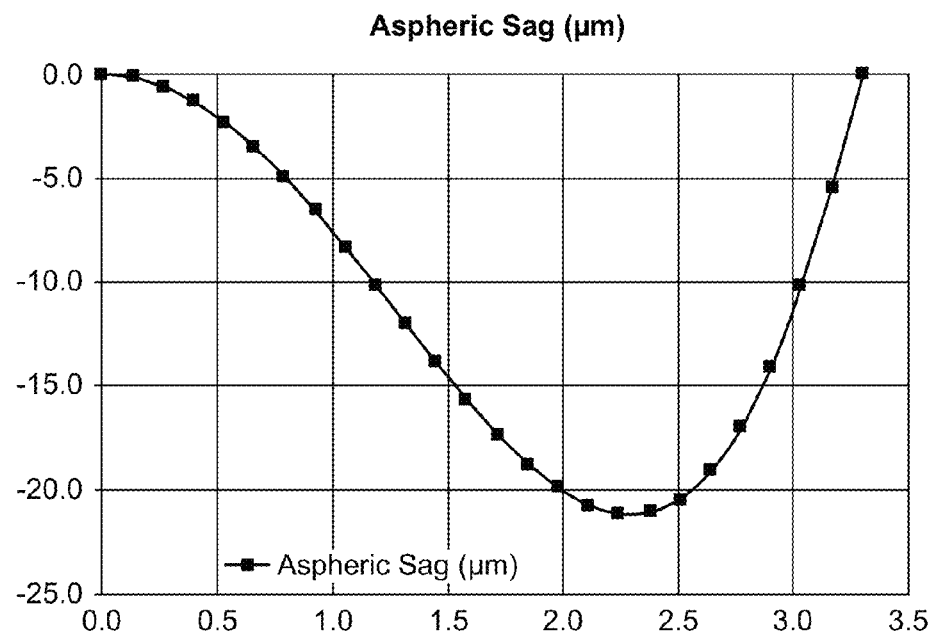
FIG. 2 is a plot of aspheric sag versus radial distance from the center of the asphere for the thirteenth surface from the object, or the object side surface of the seventh lens, in the example optical assembly illustrated schematically in FIG. 1.

The aspheric sags in Table 3 that are plotted in FIG. 2 are the aspheric sag difference numbers shown in Table 2, which are the differences from the best fit sphere sags of the aspheric surface 13. Table 3 also shows values of aspheric slope that are plotted in FIG. 3.

FIG. 2 is a plot of aspheric sag versus radial distance, or the data provided in the second column from the left in Table 3, for the $13^{th}$ optical surface from the object in the example optical assembly illustrated schematically in FIG. 1. The aspheric sag for the $13^{th}$ surface in this example has a sag minimum between approximately −20 μm and −25 μm between 2 mm and 2.5 mm from the center of the $13^{th}$ lens surface. The sag is approximately zero at the center and at the edge about 3 mm from the center. The sag plot has a width of approximately 1.5 mm at −13 μm. The sag has points of inflection between approximately 1 mm and 1.5 mm and 3 mm from the center of the $13^{th}$ lens surface.

Figure 3:
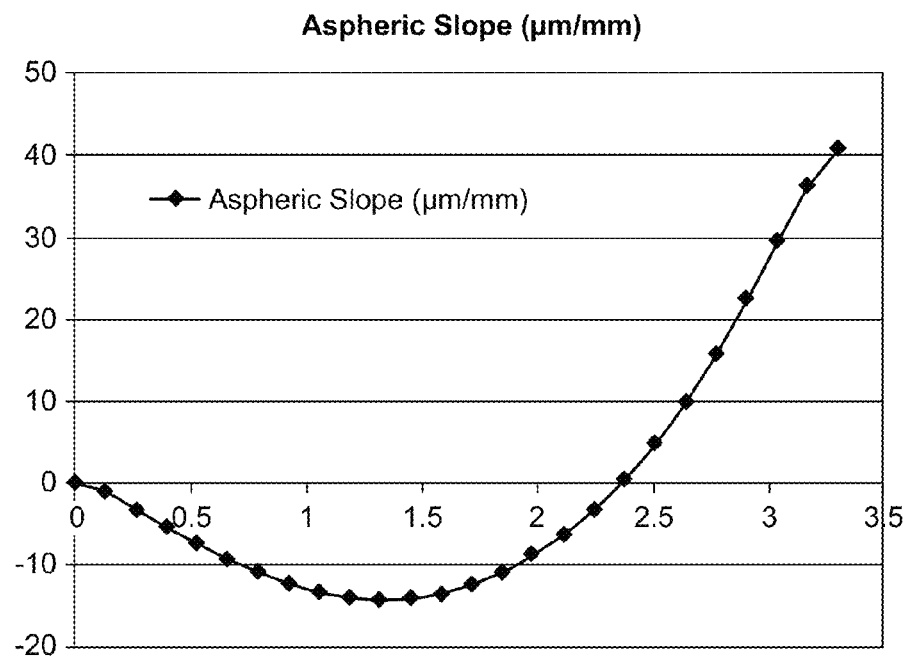
FIG. 3 is a plot of slope of aspheric sag versus radial distance from the center of the asphere for the thirteenth surface from the object, or the object side surface of the seventh lens, in the example optical assembly illustrated schematically in FIG. 1.

FIG. 3 is a plot of slope of aspheric sag versus radial distance, or the data provided in the fourth column from the left (or rightmost column) in Table 3, for the $13^{th}$ optical surface in the example optical assembly illustrated schematically in FIG. 1. The aspheric slope has a minimum between −10 μm/mm and −20 μm/mm between 1 mm and 1.5 mm from the center of the $13^{th}$ lens surface. The aspheric slope has a largest value at the outer edge of the $13^{th}$ lens surface of around 40 μm/mm. The aspheric slope has points of inflection between around 0.5 mm and 1 mm and between 2.5 mm and 3 mm from the center of the $13^{th}$ lens surface.

While the asphere may be disposed on other optical surfaces and/or on other lens elements in other embodiments, the 13th surface is selected in the embodiment illustrated by example in FIG. 1 at least in part due to the advantageous ratio of the chief ray and marginal ray heights at that location within the optical assembly. In certain embodiments, one or more of the $1^{st}$, $2^{nd}$, $3^{rd}$, $4^{th}$, $12^{th}$, $13^{th}$ and/or $14^{th}$ optical surface is/are selected to have aspheric departure over the $5^{th}$-$11^{th}$ surfaces in part due to the ratio of real chief and marginal ray heights, e.g., of about 2.8 or more, and because ratios nearer to one tend to provide reduced or even nominal aberrational correction, e.g., of astigmatism, when aspheric departure is accordingly provided in corresponding locations within the optical assemblies of such embodiments.

An image sensor, e.g., a charge coupled device (CCD) or a complementary metal oxide semiconductor (CMOS) device is disposed at the image plane in embodiments that include an assembled compact, miniature, point action or point of view camera. The optical assembly may be configured for later assembly with an image sensor. In this sense, the first and second optical groups may be manufactured or assembled separately and later combined, and in general, parts of the optical assembly or point action camera may be separately manufactured or assembled and it is possible in certain embodiments to replace, restore or realign optical group G1, optical group G2 and/or certain other groups of one or more of the lenses or other optical components of the optical assembly or point action camera.

FIGS. 4A-4E respectively show plots of tangential ray aberrations respectively at 75°, 55°, 35°, 15° and 0° for the wide field of view objective assembly illustrated in FIG. 1. FIGS. 4A-4E and 5A-5E show five pairs of graphs, where each pair illustrates the tangential and sagittal rays at one of these five field angles. The independent variable (horizontal axis) is the relative coordinate of a ray over the pupil diameter. The vertical axis has a maximum distance measure of +/− approximately three microns or a spread of six microns or less over a 150 degree field (which is clearly advantageous over a conventional system that may have, e.g., a 20 micron spread. The vertical axis therefore represents the transverse ray aberration (ray interception distance from the ideal focal point) of a ray passing through a specific relative pupil position. Graphs 4A-4E (tangential plane) and 5A-5E (sagittal plane) show the transverse ray aberrations for an on-axis ray bundle as the bundle is refracted through the lens elements of the optical assembly of FIG. 1.

In FIGS. 4E and 5E, the performance of the embodiment of FIG. 1 is illustrated for a ray bundle at zero degrees with the optical axis. Graphs 4D and 5D show the performance of the optical assembly of FIG. 1 for a ray bundle when the light source is moved providing an incident angle of 15 degrees with the optical axis. Graphs 4C and 5C show the performance of the optical assembly of FIG. 1 for a ray bundle when the light source is moved providing an incident angle of 35 degrees with the optical axis. Graphs 4B and 5B show the performance of the optical assembly of FIG. 1 for a ray bundle when the light source is moved providing an incident angle of 55 degrees with the optical axis. Graphs 4A and 5A show the performance of the optical assembly of FIG. 1 for a ray bundle when the light source is moved providing an incident angle of 75 degrees with the optical axis.

LCA is demonstrated in FIGS. 4A-4E as the separation of the three rays which correspond to four different colors or wavelengths, which are in this example 650 nm, 550 nm, 486 nm and 450 nm.

Figure 6:
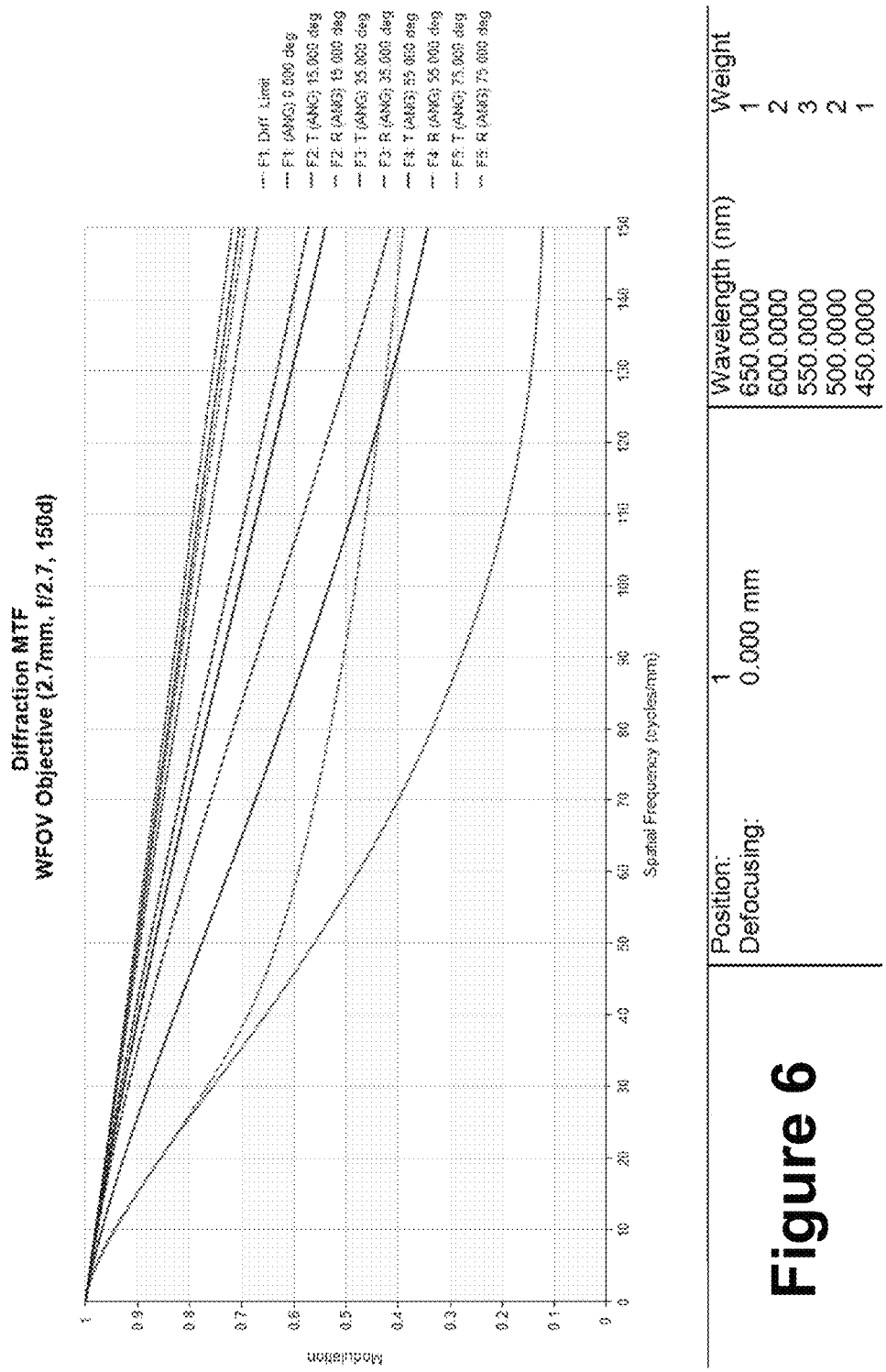
FIG. 6 illustrates diffraction modulation transfer function (MTF) plots of contrast vs. spatial frequency for tangential and sagittal rays impinging upon the optical assembly of FIG. 1 normal to the optical axis (F1), 15 degrees from normal to the optical axis (F2), 35 degrees from normal to the optical axis (F3), 55 degrees from normal to the optical axis (F4), and 75 degrees from normal to the optical axis (F5).

FIG. 6 illustrates the polychromatic diffraction modulation transfer function (MTF) plots of contrast vs. spatial frequency for pixels lying normal to the optical axis (F1), 15 degrees from normal to the optical axis (F2), 35 degrees from normal to the optical axis (F3), 55 degrees from normal to the optical axis (F4), and 75 degrees from normal to the optical axis (F5). Those pixels lying at 75 degrees from normal to the optical axis would be those at the edge of a point action camera assembly having a field of view of 150 degrees. A point action camera is provided herein having a wide field of view of 150 degrees or more. Advantageously high areas under these curves are noticeable in FIG. 6. In accordance with FIGS. 4A-4E, the plots of FIG. 6 demonstrate that the image quality of the embodiment of FIG. 1 is advantageous.

Figure 7:
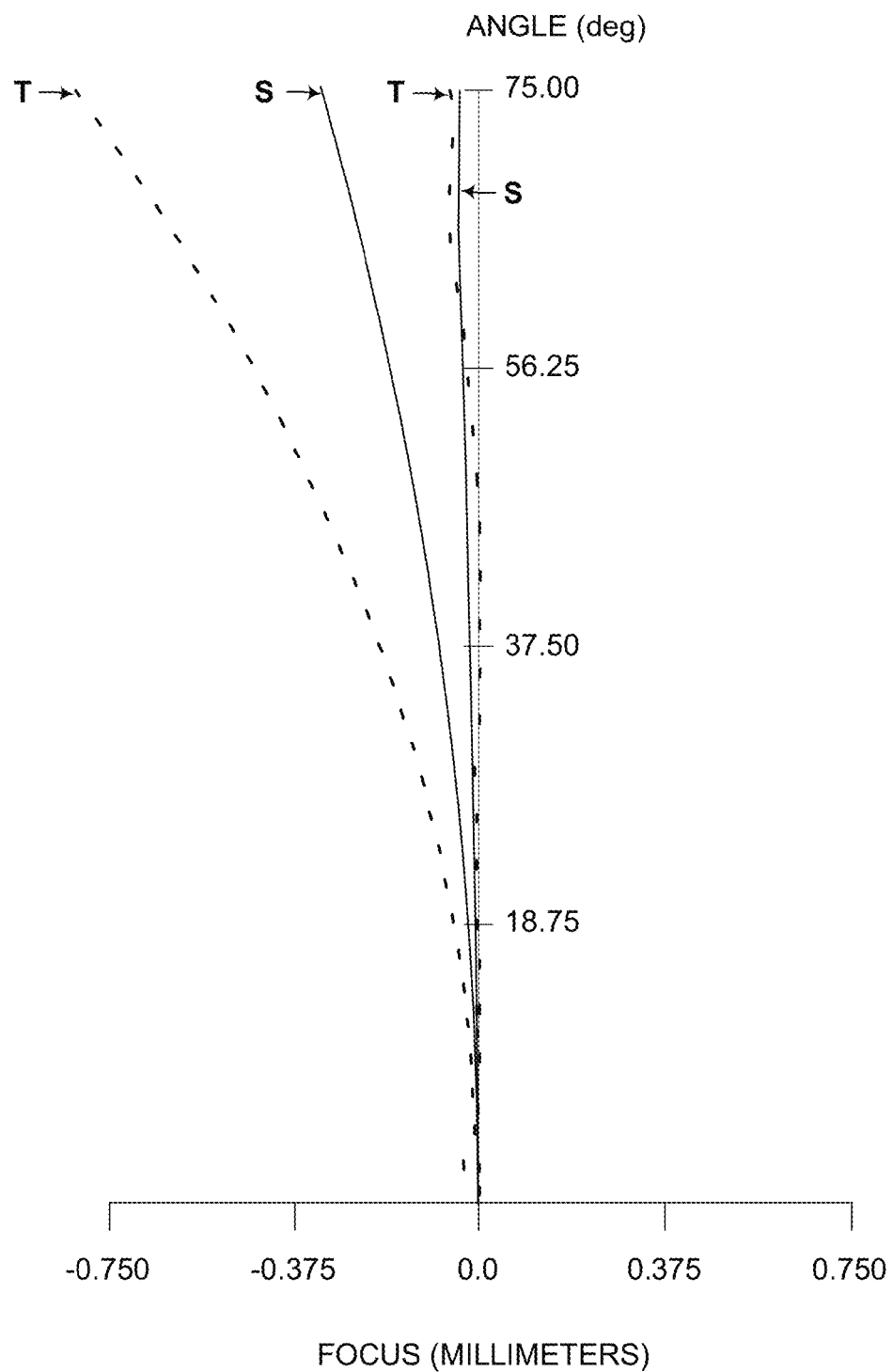
FIG. 7 shows astigmatic field curves for tangential fan (T) and sagittal fan (S) for the optical assembly illustrated schematically at FIG. 1 as well as the tangential fan (T') and sagittal fan (S') for a similar optical assembly except that the thirteenth optical surface has no aspheric departure.

FIG. 7 shows astigmatic field curves for tangential (e.g., vertical) fan (T) and sagittal (e.g., horizontal) fan (S) for the optical assembly illustrated schematically at FIG. 1 as well as the tangential fan (T') and sagittal fan (S') for a similar optical assembly except that the thirteenth optical surface has no aspheric departure. FIG. 7 shows that without the asphere, the longitudinal astigmatism (T'-S')~0.75 mm in this example. With an aspheric departure in accordance with certain embodiments, e.g., on the thirteenth surface, such as has been described and illustrated in the example of FIG. 1, the longitudinal astigmatism reduces to approximately zero. Moreover, the field curvature is approximately flat, e.g., <50 microns, across the sensor format.

An optical design in accordance with the first embodiment exhibits an advantageous ratio of total track length to effective focal length, or TTL/EFL<8. The specific example illustrated schematically in FIG. 1 has a calculated TTL to EFL ratio of 7.79 in air, i.e., in physical geometrical units for the track and focal lengths, i.e., where the unity index of refraction or n≈1 is used throughout in the calculation. This example ratio can also be calculated optically by taking into account the indices of refraction of the glasses, polymers and/or other solid, liquid and/or gaseous materials of the cover plate element. When the TTL/EFL ratio is calculated optically as an optical track length over an optical focal length that takes into account the index of refraction of the material that forms the cover glass element (otherwise sometimes deemed part of a separate image sensor component to be coupled to the optical assembly), then the ratio is calculated to be approximately 7.98, which is based on an optical track length of 21.8 mm and an optical focal length of 2.73 mm.

The optical assembly of the first example embodiments illustrated schematically in side view at FIG. 1 exhibits a ratio of TTL/EFL that is less than 8. The embodiment of FIG. 1 has a ratio of TTL/EFL that is less than 7.8 in air, and may be approximately 7.79 in air. The specific TTL/EFL ratio of 7.8 for the specific non-limiting example embodiment illustrated at FIG. 1 is based on total track lengths typically between 18 and 26 and on effective focal lengths typically between 2.5 and 3.0. In certain embodiments, a ratio of TTL to EFL of 7.79 is achieved with a total track length of 21.8 mm and an effective focal length of 2.7 mm. An effective focal length of the first group G1 that includes the first three lens elements E1, E2 and E3 may be between approximately −20 and −40, or between −24 and −34, or between −26 and −32, or approximately −28, or approximately −29 or −28.4. Among the lens elements of the first group G1, the first two lens elements E1 and E2 may have a combined focal length between −1 and −4, or between −1.5 and −3.5, or between −2 and −3, or around −2.6 or −2.7 or −2.65 mm, while the third element E3 may have a focal length between approximately +4 and +9, or between +5 and +8, or between +6 and +7, or around +6.5 or +6.3 or +6.34. The lens Group G2 including the lenses E4-E7(A) may have an effective focal length between +2 and +10, or between +3 and +9, or between +4 and +8, or between +5 and +7 or around +6 or around +5.8 or +5.84.

In this context, referring again to Table 1, which generally discloses certain specifications of the example optical assembly that is represented schematically in side view in FIG. 1, Table 1 lists radius of curvature (RDY) values for each of the fourteen optical surfaces, i.e., numbered 1-14 in the left hand column of Table 1, of the seven lens elements E1-E7(A) that make up the first and second optical groups G1, G2. Table 1 also lists thickness values (THI) for each of the lens elements and spacings between the lens elements, or of the distances between each adjacent optical surface in the optical assembly illustrated schematically in side view in FIG. 1. The optical assembly of FIG. 1 has a TTL/EFL ratio of about 7.79 in air, for a track length of approximately 21.8 mm and an effective focal length of approximately 2.7 mm. The effective focal length of the lens group G1 is −28.37 mm and that of the lens group G2 in this example is about 5.84 mm. The lens group G1 could be broken down into the first two lenses E1 and E2 which together have an effective (negative) focal length of about −2.65 mm, while the third lens E3 has an effective (positive) focal length of about 6.3 mm.

Second Example Embodiment

Figure 8:
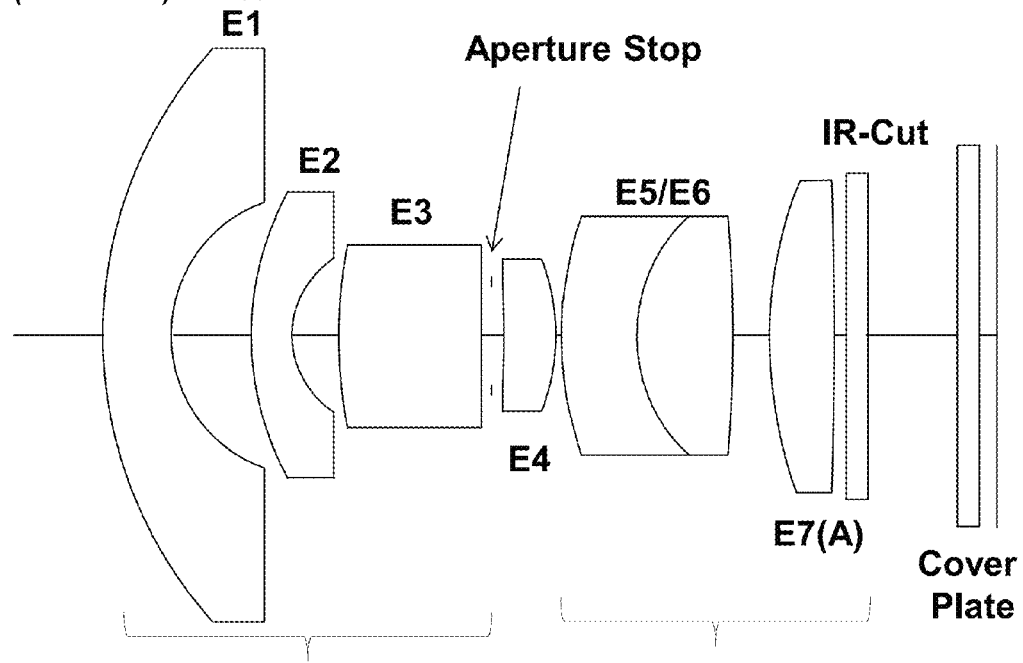
FIG. 8 schematically illustrates another optical assembly for a point action camera in accordance with certain embodiments.

FIGS. 8-14 and Tables 4-6 illustrate schematically and quantitatively a second example embodiment. In some respects, the second embodiment is the same as the first embodiment or similar enough that the description above is incorporated here and not repeated. As with the first embodiment, the optical assembly illustrated schematically at FIG. 8 includes six or seven lens elements, wherein a first lens group G1 and a second lens group G2 are separated by an aperture stop disposed between the third and fourth lens elements E3 and E4, respectively. Another aperture may be disposed between the second and third lens elements E2 and E3, respectively, in certain embodiments. The optical assembly of FIG. 8 is configured to cover a wide field of view, i.e., greater than 120 degrees, or in certain embodiments greater than 135 degrees and in others greater than 150 degrees and even in certain embodiments 180 degrees, or even greater than 180 degrees depending on the degree of convex curvature of the first lens surface.

Generally speaking, the lens group G1 is configured to collect wide field rays, whereas the lens group G2 is configured to correct aberrations, and particularly distortion and astigmatism. However, the configuration can include contributions within the second lens group G2 to the collection of wide field rays and/or contributions within the first lens group G1 to the correction of aberrations such as distortion and astigmatism. For example, one or more lens elements of the group G2 may have a reduced diameter or a material or shape characteristic tending to facilitate collection of wide angle rays and/or a surface of a lens element of group G1 may have aspheric departure configured to assist in the correction of aberrations such as distortion and astigmatism, and even higher order coma in certain embodiments. In certain embodiments, the combination of the lens groups G1 and G2 serve to provide wide field of view imaging with advantageously low distortion, while a single aspheric lens element serves to provide advantageously low astigmatism error characteristics for the optical assembly.

Lens E1 comprises a convex-concave lens, or meniscus, in the example embodiment of FIG. 8. This means that the object facing surface of lens E1, which is the first surface of the optical assembly of the example embodiment of FIG. 8, has a convex shape tending to converge incident light, while the image facing surface of lens E1, which is the second surface of the optical assembly of FIG. 8, has a concave shape tending to diverge incident light. The lens E1 has a nominal overall optical power. This lens E1 may have an extended radius outside of an active radius which assists and facilitates a wide field of view feature of the optical assembly of FIG. 8. The physical dimensional characteristics of the lenses of the optical assemblies of the embodiments described herein generally permit configuring the wide field of view optical assembly within a lens barrel of a point action camera and/or within a compact or miniature point action camera.

The lens E1 may be fixed, i.e., relative to the image plane and other fixed elements of the system. Alternatively, the lens E1 may be movable to permit focusing by automatic or manual actuation using, e.g., a voice coil motor, piezo, or MEMS coupled to the lens E1. In this alternative embodiment, a feedback based on analysis of image data received at the image sensor by a processor, an image processor or an image signal processor (ISP). Another optical group may include one or more movable lenses, mirrors or other optics. In this context, a zoom feature may also be provided optically and/or electronically. Thus, embodiments of point action cameras described herein include fixed focus, autofocus and autofocus zoom point action cameras. In certain embodiments, the lens E1 has an index of refraction at the sodium d line (i.e., 587.5618 nm) at around 1.8, or $n(\lambda d) \approx 1.7$ or 1.73. The dispersion may be around 55 The lens E1 has little overall optical power, as mentioned, and serves primarily as a collecting lens that facilitates the wide field of view of the optical assembly.

Lens E1 has a larger diameter in order to collect rays at outer edges of a wide field of view and reduces the field angle for the subsequent lenses of the optical assembly. Lens group G1, and particularly lens E1 and E2, generally serves to reduce the ray angle for the group G2 lens elements. Lens group G2 generally serves to correct distortion and astigmatism errors. The overall optical design of the second lens group generally serves to correct distortion, while the aspheric thirteenth surface of the optical assembly of FIG. 8 generally serves to correct astigmatism.

The lens element E2 of the lens group G1 has a convexo-concave or plano-concave or quasi-plano-concave structure in the example of FIG. 8. In other words the object facing surface of the lens E2, which is the third surface of the optical assembly of FIG. 8, has a slightly or nominally convex or planar surface shape, while the image facing surface of the lens E2, or the fourth surface of the optical assembly of FIG. 8, has a concave shape tending to diverge incident light rays The lens E2 has a negative overall focal length and serves as a diverging optical element. In certain embodiments, the lens E2 has an index of refraction at the sodium d line (i.e., 587.5618 nm) at around 1.7, or $n(\lambda d) \approx 0.73$. The dispersion may be around 55 The lens element E3 comprises a functionally converging optical element and has a convexo-planar, or convexo-quasi-planar, or alternatively biconvex structure in the illustrative example of FIG. 8. The object facing surface of the lens element E3, which is the fifth surface of the optical assembly that is illustrated schematically in the example embodiment of FIG. 8, is convex and tends to converge incident light. The image facing surface of the lens element E3, which is the sixth surface of the optical assembly of FIG. 8, is planar or quasi-planar or only slightly curved convex or concave. The lens element E3 has a strongest positive optical power among the elements of the first optical group G1. In certain embodiments, the lens E3 has an index of refraction at the sodium d line (i.e., 587.5618 nm) at around 1.81, or $n(\lambda d) \approx 1.8$. The dispersion may be around 23. In certain embodiments, the lens element E3 may be obtained from the CDGM glass company of type HZF52A.

The lens group G1 serves to collect and converge incoming light from an object, group of objects or a foreground, background or overall scene, including a wide field of view greater than 90 degrees in the horizontal and/or vertical dimensions, and typically 135-150 degrees or more in the horizontal and/or 110-120 degrees or more in the vertical. The rays received from the optical group G1 are not greatly further optically reduced by optical group G2, which serves to correct distortion and astigmatism before images are captured by an image sensor of a point action camera for viewing on a display, and/or for recording or storage or for data analysis, monitoring, security or surveillance and/or for transmission and/or image processing.

The lens group G1 may include two lenses or four lenses, or even one lens or five or more lenses. An aperture stop is disposed between the lens element E3 and the lens element E4 in the example of FIG. 8. Alternatively, an aperture stop is disposed between the lens groups G1 and G2, whatever number of optical elements each may comprise. An aperture stop may be located differently and there may be one or more additional apertures within the optical assembly.

The optical group G2 in the example of FIG. 8 includes three or four lens elements, depending on whether one considers a lens doublet to comprise a single lens element or two lens elements. The lens group G2 in the example of FIG. 8 includes lens E4, lens doublet E5/E6 and lens E7.

Lens E4 may have a biconvex, plano-convex or quasi-plano-convex shape. That is, the object facing surface of lens E4, which is the seventh surface of the optical assembly of FIG. 8, has a slightly or nominally convex or planar shape, while the image facing surface of the lens E4, which is the eighth surface of the optical assembly of FIG. 8, has a convex shape tending to converge incident light. The lens E4 is disposed in the example of FIG. 8 just on the image side of an aperture stop. The lens E4 has an overall positive focal length and is functionally convergent of incident light after that light has been collected by the lens group G1, has passed through the aperture and has become incident upon the object facing surface of lens E4, or surface 7 of the overall optical assembly of FIG. 8. In certain embodiments, the lens E4 has an index of refraction at the sodium d line (i.e., 587.5618 nm) at around 1.7, or $n(\lambda d) \approx 1.73$. The dispersion may be around 55. The lens E5 has a biconcave shape while the lens E6 has a biconvex shape. The ninth and tenth surfaces of the optical assembly of FIG. 8, or both of the two surfaces of lens E5, have a concave shape tending to diverge incident light rays, while the eleventh and twelfth surfaces of the optical assembly of FIG. 8, or both of the two surfaces of the lens E6, have a convex shape. The twelfth surface of the optical assembly may be strongly convex and tend to relatively strongly converge incident light.

The lenses E5 and E6 are coupled together to form a doublet. In certain embodiments, the image facing surface of lens E5 and the object facing surface of the lens E6 are in direct contact. An adhesive or other standard process of coupling constituent lenses of a doublet may be used, which process may depend upon the materials of the constituent lenses E5 and E6. In certain embodiments, the lens E5 has an index of refraction at the sodium d line (i.e., 587.5618 nm) at around 1.9, or $n(\lambda d) \approx 1.93$. The dispersion of lens E5 may be around 19. In certain embodiments, the lens E6 has $n(\lambda d) \approx 0.6$. In certain embodiments, the lens E6 has a dispersion around 63. In certain embodiments, the lens E5 may be obtained from the CDGM glass company of type HZF52A, while the lens E6 may be obtained from the OHARA corporation of type SPHM52. The doublet overall serves to configure the light rays before becoming incident upon the lens element E7(A).

Referring to FIG. 8, there a significant advantage to having an optical assembly in accordance with certain embodiments, wherein the E5/E6 doublet, which is shown disposed between the fourth singlet and the asphere in FIG. 8, is configured to correct oblique aberrations. Alternatively, the doublet may be disposed between lens E3 and lens E4.

The lens element E7(A) has a biconvex, or convexo-quasi-plano, or convexo-plano shape. The object facing surface of the lens E7(A), which is the thirteenth surface of the optical assembly of FIG. 8, has a strongly convex shape which relatively strongly converges incident light. The thirteenth surface of the optical assembly of FIG. 8 is also aspheric in this example embodiment. The image facing surface of the lens E7(A), which is the fourteenth surface of the optical assembly of FIG. 8, has a slightly or nominally convex or planar shape.

Between the fourteenth surface of the optical assembly of FIG. 8 and the image plane are an IR filter and a cover plate. The IR filter serves to cut out infrared light that can otherwise interfere with the function of a silicon-based image sensor to collect visible image data. The cover plate serves to protect the image sensor from incident dust, water, oxygen or other corrosive or artifact producing elements that may be present in the ambient space surrounding the point action camera. A separate baffle may be included to reduce the amount of stray light that may become otherwise incident upon the image sensor. Each of the seventh lens, the IR filter and the cover glass may comprise NBK7 Schott glass.

The aspheric departure of the thirteenth optical surface of the optical assembly in the example embodiment of FIG. 8 serves to advantageously significantly reduce astigmatism errors that would be otherwise inherent in a wide field of view system without an aspheric surface in accordance with embodiments described herein. Moreover, the advantageous design of the optical assembly of FIG. 8, and specifically of the second optical group G2, and more specifically of the lens element E7(A), and still more specifically of the object facing surface of the lens element E7(A) permits the optical assembly in this embodiment to have a more efficient manufacturability than conventional designs that contain multiple aspheric surfaces and/or multiple aspheric lens or other optical elements.

The optical assembly illustrated schematically at FIG. 8 has $H(\theta)/f^*\theta=1.078$. In another similar embodiment $H(\theta)/f^*\theta=1.174$. In other embodiments, $H(\theta)/f^*\theta$ is greater than 1.2, 1.3, 1.4 and even 1.5, and in other embodiments $H(\theta)/f^*\theta$ is approximately 1.

Table 4 generally discloses certain specifications of the example optical assembly that is represented schematically in side view in FIG. 8. Table 4 lists RDY, which is the radius of curvature of the optical surface. Table 4 lists THI which are the thicknesses of the lens elements and airspaces in sequential order. The row 1 thickness described the thickness of the first lens element in this embodiment. The row 2 thickness describes the thickness of the spacing between the first and second lens elements. The spacing may include air, or for example dry air or nitrogen gas or vacuum or a noble gas, or a liquid such as water. The row 3 describes the thickness of the second lens element. The row 4 describes the air spacing between the second and third lens elements in this example. The row 5 describes the thickness of the third lens element. The row 6 describes the thickness of the spacing between the third lens element and the aperture stop. The row STO describes the thickness of the air spacing between the aperture stop and the fourth lens element. The row 8 describes the thickness of the fourth lens element. The row 9 describes the air spacing between the fourth lens element and the fifth lens element. The row 10 describes the thickness of the fifth lens element. The row 11 describes the thickness of the sixth lens element. There is no air thickness between the fifth and sixth lens elements described in the Table 1, because the fifth and sixth lens elements form a doublet in this example, wherein the tenth and eleventh surfaces of the optical assembly are substantially in contact with each other. The row 12 describes the thickness of the spacing between the sixth lens and the seventh lens in this example. The row 13 describes the thickness of the seventh lens. The row 14 describes the spacing between the seventh lens and the IR cut filter. The row 15 describes the thickness of the IR cut filter. The row 16 describes the spacing thickness between the IR cut filter and the cover plate (e.g., glass or polymer) for the image sensor. The row 18 describes the spacing between the cover plate and the image sensor. The row IMG describes the image sensor plane.

Seven lens elements E1-E7(A) make up the optical assembly, while a point action camera includes the IR cut filter, cover glass and image sensor along with the optical assembly. The first two or three lens elements form a first optical group G1, while with either the third lens element forms a second group G2 and the final four lens elements form a third optical group G3 or the final four lens elements form the second optical group G2, respectively.

The radii of curvature are, in the single aspheric surface example, approximately, i.e., within manufacturing tolerances, the same everywhere along the optical surface for each of the first thru twelfth and fourteenth surfaces of the optical assembly of FIG. 8. That is, the coefficients A thru E are each approximately zero for 13 out of 14 surfaces of the embodiment of FIG. 8 in the single aspheric surface example. The departures from spherical of the thirteenth surface are represented in Table 4 as nonzero coefficients A-E, which correspond mathematically to the coefficients indicated in the formula provided between Table 1 and Table 2.

This formula with the non-zero coefficients A-E as indicated in Table 4 represents the aspheric curvature of the surface 13 of the example optical assembly that is illustrated schematically in FIG. 8.

The specification data of Table 4 represent the first order software inputs to complete the optical model. FNO is F number and is approximately 2.7 in this example. DIM is the dimension which is mm. WL are the wavelengths which are in nanometers, and are 650 nm (red), 586 nm (yellow), 486 nm (blue) and 450 nm (violet) in this example. WTF is the spectral wavelength weighting. XAN and YAN are the x and y field angles. VUY and VLY are the vignetting factors for each field. WID indicates that the example of FIG. 8 is for a wide field of view or WFOV.

Table 5 shows aspherical and spherical SAG data for the thirteenth surface of the optical assembly of FIG. 8. These data fit to the formula for SAG for a spherical conic section that is provided between Table 1 and Table 2, or that may be generally or alternatively written as: $z(r)=r^2/[R+(R^2-r^2)^{1/2}]$; wherein for a best sphere of radius 8.330, as in an example embodiment, and a curvature of best sphere, R, corresponding to 0.120047, the different actual radii of curvature, r, for a surface with aspheric departure produce SAG differences compared to values for a true spherical conic section. These aspherical SAGs for an example thirteenth surface are compared with would be true spherical SAGs in Table 4 for different distances Y from the vertex center at Y=0 to Y=3.3 (mm) in steps of 0.132 (mm).

Figure 9:
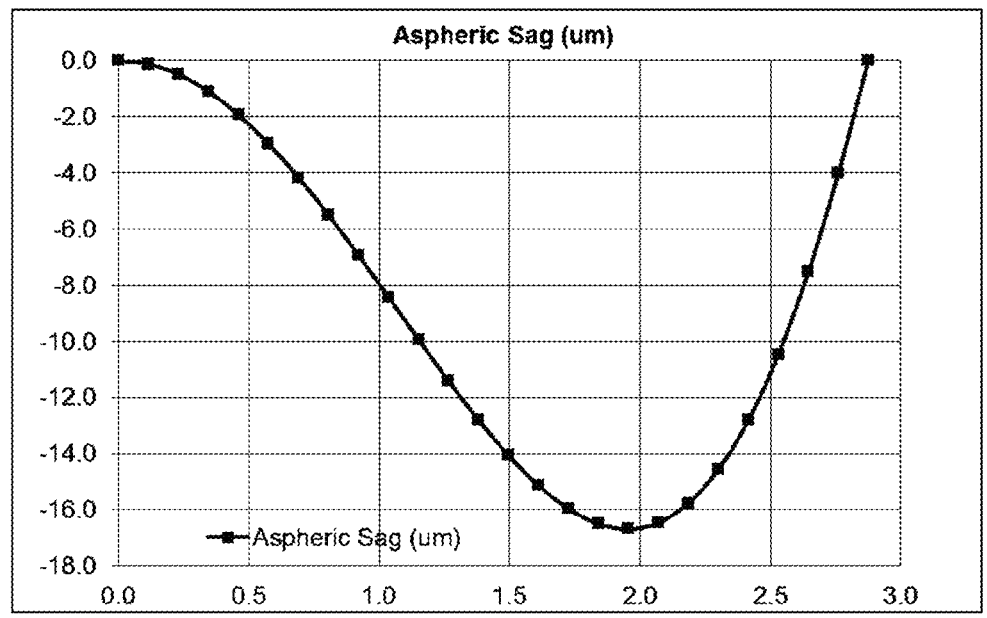
FIG. 9 is a plot of aspheric sag versus radial distance from the center of the asphere for the thirteenth surface from the object, or the object side surface of the seventh lens, in the example optical assembly illustrated schematically in FIG. 8.

The aspheric sags in Table 6 that are plotted in FIG. 9 are the aspheric sag difference numbers shown in Table 5, which are the difference from the best fit sphere sags of the aspheric surface 13. Table 6 also shows values of aspheric slope that are plotted in FIG. 10.

While the asphere may be disposed on other optical surfaces and/or on other lens elements in other embodiments, the 13th surface is selected in the embodiment illustrated by example in FIG. 8 at least in part due to the advantageous ratio of the chief ray and marginal ray heights at that location within the optical assembly. In certain embodiments, one or more of the 1st, 2nd, 3rd, 4th, 12th 13th and/or 14th optical surface is/are selected to have aspheric departure over the 5th-11th surfaces in part due to the ratio of real chief and marginal ray heights, e.g., of about 2.8 or more, and because ratios nearer to one tend to provide reduced or even nominal aberrational correction, e.g., of astigmatism, when aspheric departure is accordingly provided in corresponding locations within the optical assemblies of such embodiments.

An image sensor, e.g., a charge coupled device (CCD) or a complementary metal oxide semiconductor (CMOS) device is disposed at the image plane in embodiments that include an assembled compact, miniature, point action or point of view camera. The optical assembly may be configured for later assembly with an image sensor. In this sense, the first and second optical groups may be manufactured or assembled separately and later combined, and in general, parts of the optical assembly or point action camera may be separately manufactured or assembled and it is possible in certain embodiments to replace, restore or realign optical group G1, optical group G2 and/or certain other groups of one or more of the lenses or other optical components of the optical assembly or point action camera.

FIGS. 11A-11E respectively show plots of tangential ray aberrations respectively at 75°, 55°, 35°, 15° and 0° for the wide field of view objective assembly illustrated in FIG. 8. FIGS. 11A-11E and 12A-12E show five pairs of graphs, where each pair illustrates the tangential and sagittal rays at one of these five field angles. The independent variable (horizontal axis) is the relative coordinate of a ray over the pupil diameter. The vertical axis has a maximum distance measure of +/− approximately three microns or a spread of six microns or less over a 150 degree field (which is clearly advantageous over a conventional system that may have, e.g., a 20 micron spread. The vertical axis therefore represents the transverse ray aberration (ray interception distance from the ideal focal point) of a ray passing through a specific relative pupil position. Graphs 11A-11E (tangential plane) and 12A-12E (sagittal plane) show the transverse ray aberrations for an on-axis ray bundle as the bundle is refracted through the lens elements of the optical assembly of FIG. 8.

In FIGS. 11E and 12E, the performance of the embodiment of FIG. 8 is illustrated for a ray bundle at zero degrees with the optical axis. Graphs 11D and 12D show the performance of the optical assembly of FIG. 8 for a ray bundle when the light source is moved providing an incident angle of 15 degrees with the optical axis. Graphs 11C and 12C show the performance of the optical assembly of FIG. 8 for a ray bundle when the light source is moved providing an incident angle of 35 degrees with the optical axis. Graphs 11B and 12B show the performance of the optical assembly of FIG. 8 for a ray bundle when the light source is moved providing an incident angle of 55 degrees with the optical axis. Graphs 11A and 12A show the performance of the optical assembly of FIG. 8 for a ray bundle when the light source is moved providing an incident angle of 75 degrees with the optical axis.

LCA is demonstrated in FIGS. 11A-11E as the separation of the three rays which correspond to four different colors or wavelengths, which are in this example 650 nm, 550 nm, 486 nm and 450 nm.

Figure 13:
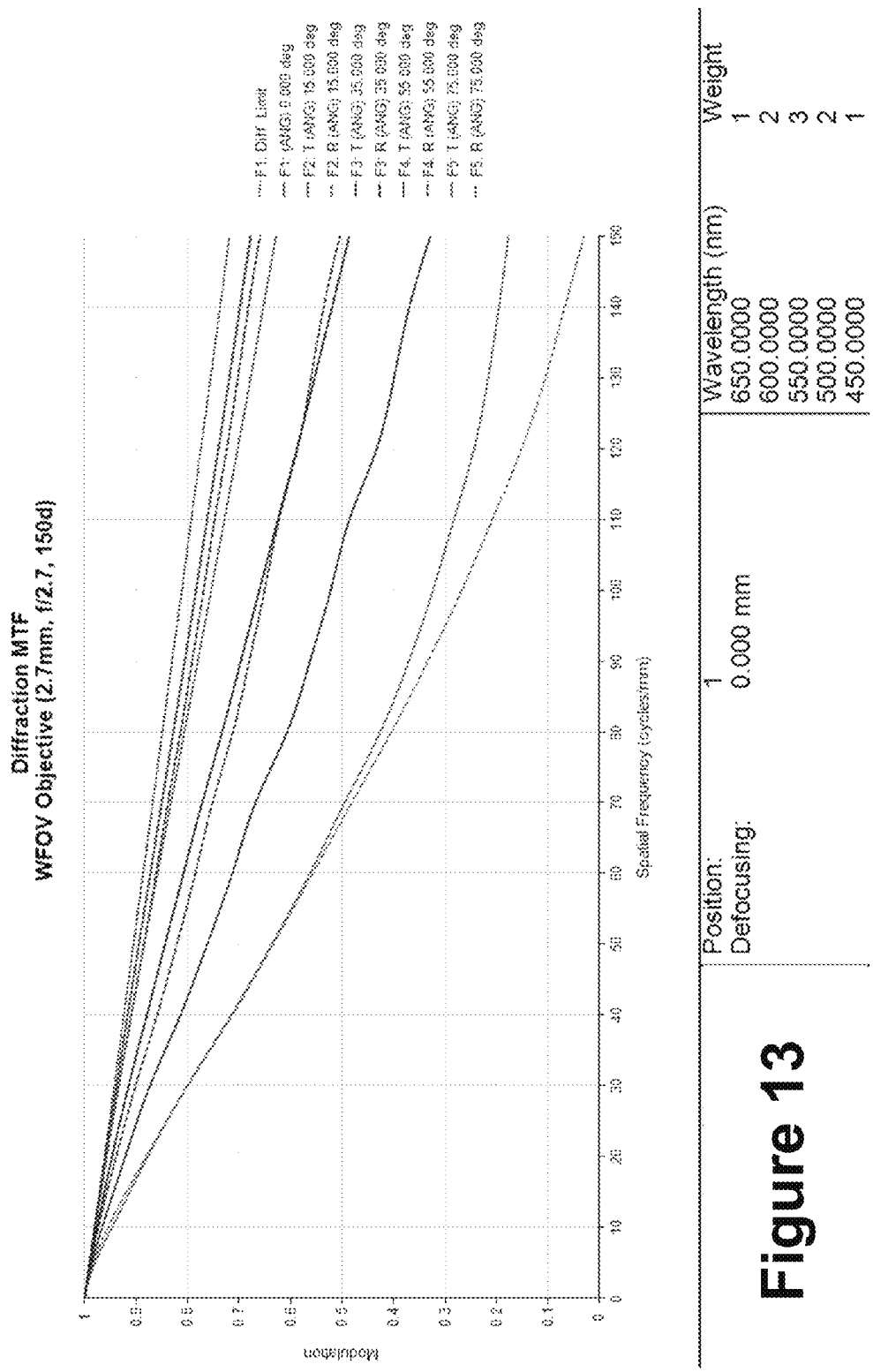
FIG. 13 illustrates diffraction modulation transfer function (MTF) plots of contrast vs. spatial frequency for tangential and sagittal rays impinging upon the optical assembly of FIG. 8 normal to the optical axis (F1), 15 degrees from normal to the optical axis (F2), 35 degrees from normal to the optical axis (F3), 55 degrees from normal to the optical axis (F4), and 75 degrees from normal to the optical axis (F5).

FIG. 13 illustrates the polychromatic diffraction modulation transfer function (MTF) plots of contrast vs. spatial frequency for pixels lying normal to the optical axis (F1), 15 degrees from normal to the optical axis (F2), 35 degrees from normal to the optical axis (F3), 55 degrees from normal to the optical axis (F4), and 75 degrees from normal to the optical axis (F5). Those pixels lying at 75 degrees from normal to the optical axis would be those at the edge of a point action camera assembly having a field of view of 150 degrees. A point action camera is provided herein having a wide field of view of 150 degrees or more. Advantageously high areas under these curves are noticeable in FIG. 13. In accordance with FIGS. 11A-11E, the plots of FIG. 13 demonstrate that the image quality of the embodiment of FIG. 8 is advantageous.

Figure 14:
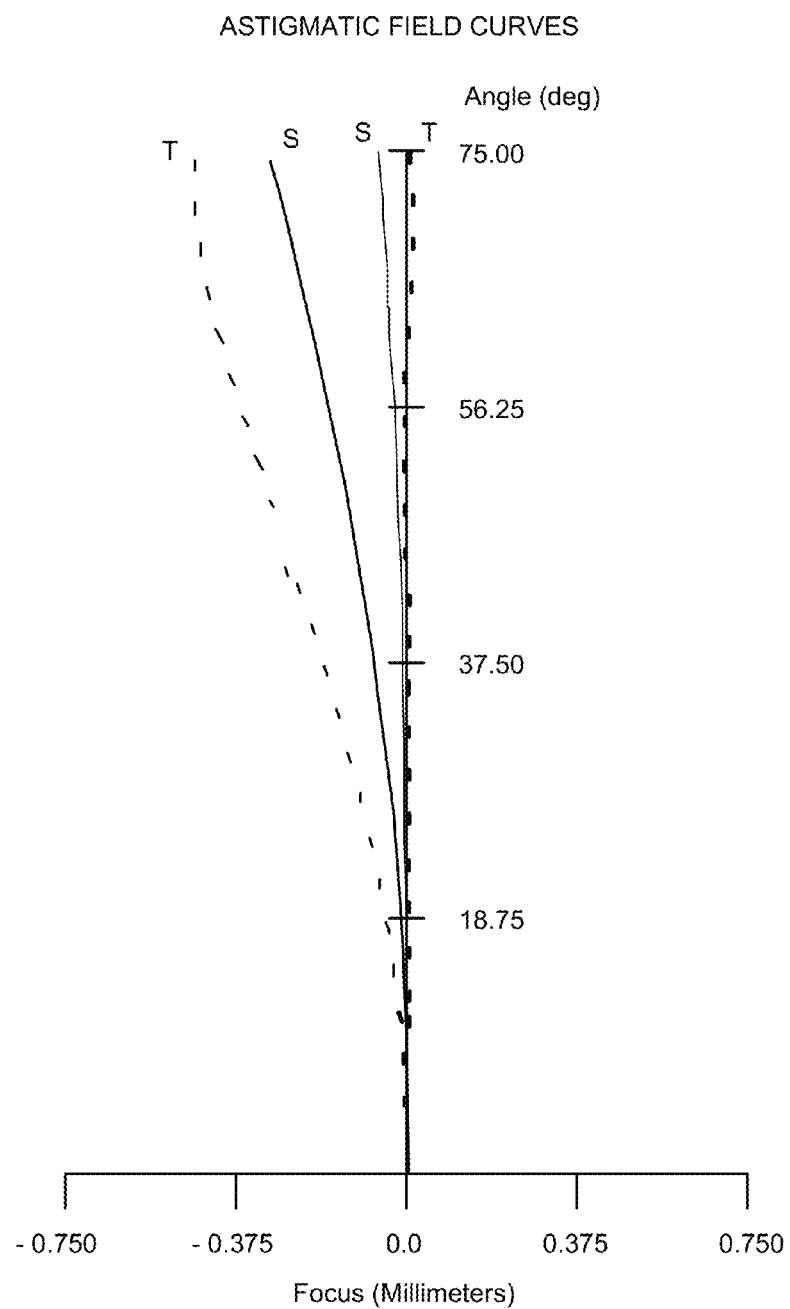
FIG. 14 shows astigmatic field curves for tangential fan (T) and sagittal fan (S) for the optical assembly illustrated schematically at FIG. 9 as well as the tangential fan (T') and sagittal fan (S') for a similar optical assembly except that the thirteenth optical surface has no aspheric departure.

FIG. 14 shows astigmatic field curves for tangential (e.g., vertical) fan (T) and sagittal (e.g., horizontal) fan (S) for the optical assembly illustrated schematically at FIG. 8 as well as the tangential fan (T') and sagittal fan (S') for a similar optical assembly except that the thirteenth optical surface has no aspheric departure. FIG. 14 shows that without the asphere, the longitudinal astigmatism (T'−S')~0.75 mm in this example. With an aspheric departure in accordance with certain embodiments, e.g., on the thirteenth surface, such as has been described and illustrated in the example of FIG. 8, the longitudinal astigmatism reduces to approximately zero. Moreover, the field curvature is approximately flat, e.g., <50 microns, across the sensor format.

Both of the embodiments illustrated at FIGS. 1 and 8 exhibit ratios of TTL/EFL that are less than 8. The embodiment of FIG. 8 has a ratio of TTL/EFL that is less than 7.5, and may be approximately 7 or approximately 7.4 or 7.43. The specific TTL/EFL ratios of 7.8 and 7.4 for the specific non-limiting example embodiments illustrated at FIGS. 1 and 8 are based on total track lengths typically between 18 and 21 and on effective focal lengths typically between 2.5 and 3.0. In certain embodiments, a ratio of TTL to EFL of 7.5 is achieved with a total track length of 20.3 and an effective focal length of 2.7. An effective focal length of the first group G1 that includes the first three lens elements E1, E2 and E3 may be between approximately −120 and −60, or between −110 and −70, or between −100 and −80, or approximately −90, or approximately −92 or −91.6. Among the lens elements of the first group G1, the first two lens elements E1 and E2 may have a combined focal length between −1 and −4, or between −1.5 and −3.5, or between −2 and −3, or around −2.5 or −2 or −2.3, while the third element E3 may have a focal length between approximately +3 and +8, or between +4 and +7, or between +5 and +6, or around +5.5 or +5.3.

In this context, referring again to Table 4, which generally discloses certain specifications of the example optical assembly that is represented schematically in side view in FIG. 8, Table 4 lists radius of curvature (RDY) values for each of the fourteen optical surfaces, i.e., numbered 1-14 in the left hand column of Table 4, of the seven lens elements E1-E7(A) that make up the first and second optical groups G1, G2. Table 4 also lists thickness values (THI) for each of the lens elements and spacings between the lens elements, or of the distances between each adjacent optical surface in the optical assembly illustrated schematically in side view in FIG. 8. The optical assembly of FIG. 8 has a TTL/EFL ratio of about 7.4, for a track length of approximately 20.3 mm and an effective focal length of approximately 2.7 mm. The effective focal length of the lens group G1 is −91.6 mm and that of the lens group G2 in this example is about 6.1 mm. The lens group G1 could be broken down into the first two lenses E1 and E2 which together have an effective (negative) focal length of about −2.3 mm, while the third lens E3 has an effective (positive) focal length of about 5.3 mm.

Table 5 shows aspherical and spherical SAG data for the thirteenth surface of the optical assembly of FIG. 8. These data may fit to a formula for SAG for a spherical conic section, e.g., $z(r)=r^2/[R+(R^2-r^2)^{1/2}]$, wherein for a best sphere of radius 8.330, as in an example embodiment, and a curvature of best sphere, R, corresponding to 0.120047, the different actual radii of curvature, r, for a surface with aspheric departure produce SAG differences compared to values for a true spherical conic section. These aspherical SAGs for an example thirteenth surface are compared with would be true spherical SAGs in Table 5 for different distances Y from the vertex center at Y=0 to Y=3.3 (mm) in steps of 0.132 (mm).

The aspheric sags in Table 6 that are plotted in FIG. 9 are the aspheric sag difference numbers shown in Table 5, which are the differences from the best fit sphere sags of the aspheric surface 13. Table 6 also shows values of aspheric slope that are plotted in FIG. 10.

FIG. 9 is a plot of aspheric sag versus radial distance, or the data provided in the second column from the left in Table 6, for the 13$^{th}$ optical surface from the object in the example optical assembly illustrated schematically in FIG. 8. The aspheric sag for the 13$^{th}$ surface in this example has a sag minimum between approximately −16 μm and −18 μm between 1.5 mm and 2.5 mm from the center of the 13$^{th}$ lens surface. The sag is approximately zero at the center and at the edge about 3 mm from the center. The sag plot has a width of approximately 1.5 mm at −8.0 μm. The sag has points of inflection at approximately 1.0 mm and 2.6 mm from the center of the 13$^{th}$ lens surface.

Figure 10:
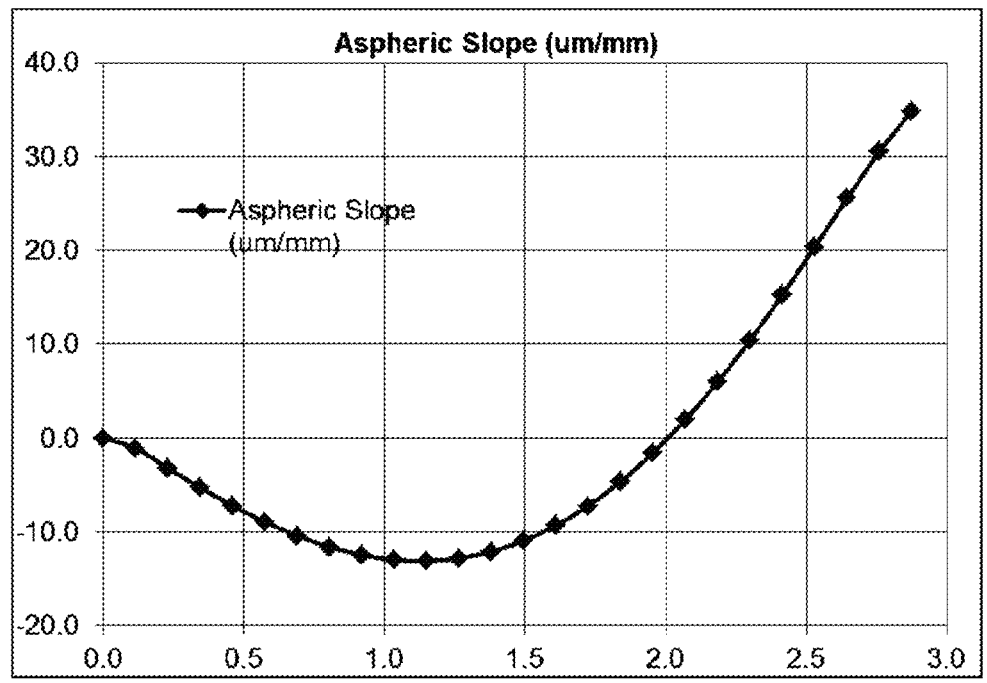
FIG. 10 is a plot of slope of aspheric sag versus radial distance from the center of the asphere for the thirteenth surface from the object, or the object side surface of the seventh lens, in the example optical assembly illustrated schematically in FIG. 8.

FIG. 10 is a plot of slope of aspheric sag versus radial distance, or the data provided in the fourth column from the left (or rightmost column) in Table 6, for the 13$^{th}$ optical surface in the example optical assembly illustrated schematically in FIG. 8. The aspheric slope has a minimum between −10 μm/mm and −15 μm/mm between 0.5 mm and 1.5 mm from the center of the 13$^{th}$ lens surface. The aspheric slope has a largest value at the outer edge of the 13$^{th}$ lens surface of between 30 μm/mm and 40 μm/mm. The aspheric slope has points of inflection at around 0.5 mm and between 2 mm and 2.5 mm from the center of the 13$^{th}$ lens surface.

Certain embodiments include multiple lens elements that have one or both surfaces exhibiting some aspheric departure, including embodiments wherein each of the lens groups G1 and G2 (or G1 and G3 in the three lens group examples) has at least one aspheric lens element. However, an advantage of both of the first and second example embodiments illustrated schematically in FIGS. 1 and 8, respectively, involves ease of manufacturability compared with a design that might alternatively have an aspheric surface within both the first lens group G1 and the second lens group G2. For example, the first lens group G1 can be combined with the second lens group at any selected point in the process, and a versatile number of sources and optical alignment and assembly techniques may be available when only the single lens Group 2 includes one or more aspheric surfaces. If one divides the optical assembly into three lens groups G1 (including E1 and E2), G2 (including E3) and G3 (including E4, E5/E6 and E7(A)) then further versatility in manufacturing, alignment, assembly and optical application become more readily available.

In a three lens group example in accordance with the first or second embodiment, a focal length of group G1 may be negative and in certain embodiments between −1 mm and −5 mm and may be between −2 mm and −3 mm, and may be approximately −2 mm, −2.5 mm or −3 mm, for example, −2.3 mm. A focal length of group G2 (lens E3) may be positive and in certain embodiments between +3 mm and +8 mm, and may be between +4 mm and +7 mm, and may be between +5 mm and +6 mm, and may be approximately +5 mm, for example, +5.3 mm. A focal length of group G3 may be positive and in certain embodiments less than +12 mm, and may be between +3 mm and +10 mm, and may be between +4 and +8, and may be between +5 and +7, and may be approximately 6 mm, e.g., +6.1 mm.

Third Example Embodiment

Figure 15:
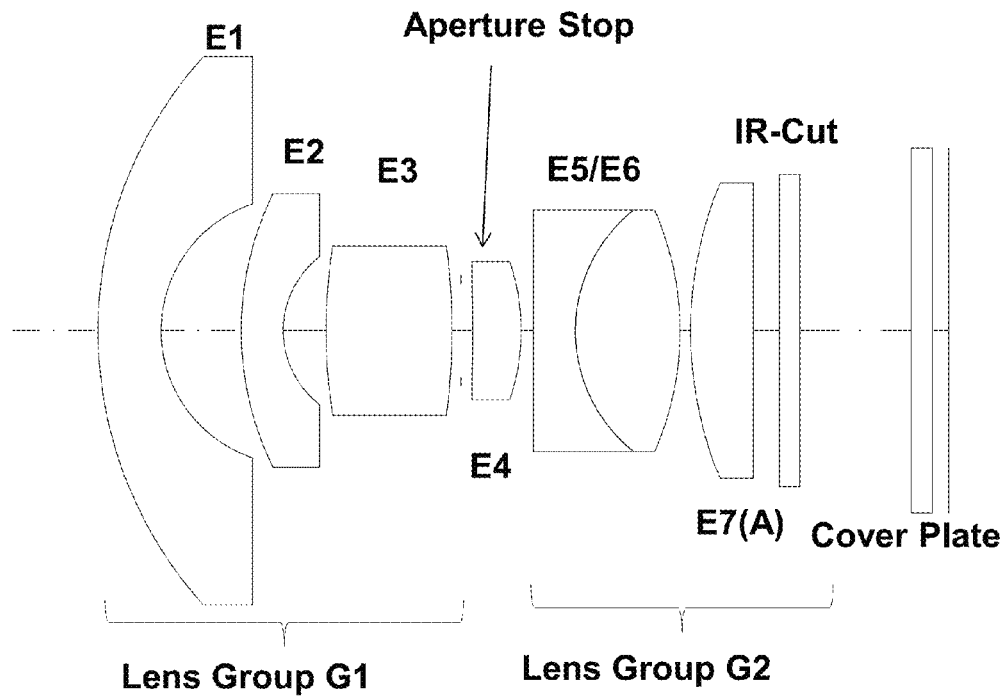
FIG. 15 schematically illustrates another optical assembly for a point action camera in accordance with certain embodiments.

A third example embodiment is illustrated at FIGS. 15-21 and Tables 7-9, respectively, schematically and quantitatively. Like the first two example embodiments, the third example embodiment has a ratio of total track length (TTL) to effective focal length (EFL) that is less than 8. The third example embodiment, like the first example embodiment, actually has a TTL/EFL ratio that is approximately 7, or that is between around 7.0 and 7.8, or between around 7.2 and 7.6, or between around 7.3 and 7.5 or approximately 7.4, or in a specific example, the ratio is around 7.43. The third embodiment utilizes a different mix of optical materials than either of the first and second embodiments. The basic layout of the first and second optical groups G1 and G2 which are separated by an aperture stop in FIG. 15 is configured to provide an advantageously low distortion. The seventh lens element (from object to image) E7 has at least one surface, e.g., the object facing surface or thirteenth surface of the optical system, that has an aspheric departure that is configured to provide an advantageously low astigmatism error across the wide field of view of the optical assembly of the third example embodiment illustrated schematically at FIG. 15.

In the third example embodiment, the lens element E7 may have a convexo-planar or convexo-quasi-planar design as in the illustration of FIG. 15. The 14$^{th}$ optical surface of the lens assembly of FIG. 15 has a flatter shape than the 14$^{th}$ surface of the second embodiment. In other embodiments, E7 may have a plano-convex or quasi-plano-convex design, wherein the fourteenth surface of the third example optical assembly has an aspheric departure while the thirteenth surface does not. In certain embodiments, both the thirteenth and fourteenth surfaces have aspheric departure.

In another embodiment, the 12$^{th}$ surface or image facing surface of the lens element E6 has aspheric departure, while the 13$^{th}$ and 14$^{th}$ surfaces may both be spherical without aspheric departure, or may include one spherical surface and one planar or quasi-planar surface as in the illustration of FIG. 15, or may include one aspheric surface, or may both have significant aspheric departure. In other embodiments, the 1$^{st}$, 2$^{nd}$, 3$^{rd}$ or 4$^{th}$ lens surfaces of the optical assembly may have aspheric departure such that the optical assembly exhibits a wide field of view and both low distortion and low astigmatism, while the 13th and 14th surfaces may both be spherical without aspheric departure, or may include one spherical surface and one planar or quasi-planar surface as in the illustration of FIG. 15, or may include one aspheric surface, or may both have significant aspheric departure. In certain embodiments, only a single lens element of the optical assembly has aspheric departure. One or both surfaces of the single aspheric lens element may have aspheric departure. The example of FIG. 15 includes only a single aspheric lens surface, e.g., the 13$^{th}$ surface or object facing surface of the seventh lens element E7(A). In certain embodiments, only a single lens surface, e.g., the 1$^{st}$, 2$^{nd}$, 3$^{rd}$, 4$^{th}$, 12$^{th}$, 13$^{th}$, or 14th has aspheric departure. While any or all of the optical surfaces may have aspheric departure in alternative embodiments, those lens surfaces that are nearest the image or object tend to provide the most significant corrective capacities due to the greater differences between the chief and marginal ray heights at those positions within the wide field of view optical assembly of the third example embodiment.

A notable difference between the second and third example embodiments illustrated schematically in side view at FIGS. 8 and 15, respectively, with regard to the shapes of the lenses and/or lens surfaces, has to with the third and fourth lens elements E3 and E4. The lens element E3 of FIG. 16 has a thicker biconvex shape than that illustrated schematically in FIG. 8. The lens element E4 of FIG. 15 has a meniscus shape that is concavo-convex or quasi-planar (slightly concave)-convex compared with the biconvex or quasi-planar (slightly convex)-convex design of the fourth lens element E4 of the example illustrated at FIG. 8.

The first lens group G1 of the third example embodiment of FIG. 15 includes two convexo-concave meniscus collecting lenses E1 and E2 and the third biconvex converging lens E3. The lens elements E4 through E7 of the second lens group G2 include, from nearest to aperture stop to nearest to image plane, the quasi-plano-convex meniscus lens E4, the doublet E5/E6 including a plano-concave lens E5 and a biconvex lens E6 that are substantially in contact at the 10$^{th}$ and 11$^{th}$ surfaces of the optical assembly of FIG. 15, and the aspheric lens element E7(A). The aspheric lens element E7(A) has a convexo-planar or convexo-quasi-planar shape in this third example embodiment, while in the second example embodiment illustrated schematically in side view at FIG. 8 the lens element E7(A) has a biconvex design, or a convexo-quasi-planar shape wherein the 14$^{th}$ lens surface is flatter in the third example of FIG. 15 than in the second example of FIG. 8 even when in certain embodiments both can be termed convexo-quasi-planar.

There is a significant advantage to the location of the doublet E5/E6 between the lenses E4 and E7. Specifically, this location facilitates the correction of oblique aberrations. In alternative embodiments, the doublet is disposed on the image side of the aperture stop between E3 and E4, or in other embodiments on the object side of the aperture stop. In this embodiment, the lens element E7(A) is a plano-convex asphere, wherein S1 is aspheric and S2 is plano (wherein S1 and S2 are in this example the 13$^{th}$ and 14$^{th}$ optical surfaces of the lens assembly illustrated in FIG. 15).

The first two lenses E1 and E2 together have a negative focal length that may be between around −1 and −5, or between approximately −1.5 and −3.5 or −4, or between around −2 and −3, or about −2.5 or −2.6. the third lens E3 may have a positive focal length between +5 and +15, or between around +7 and +12, or between around +8 and +11, or about +9, or +9.2 or +9.3. The final four lenses, or the lens group G2, may have a combined positive focal length between +1 and +10, or between around +2 and +7, or between around +3 and +6, or between around +4 and +5, or approximately +4.5, or +4.7. The optical assembly illustrated schematically in FIG. 15 may have a ratio of total track length (TTL) to effective focal length (EFL) that is less than 8, or between 5 and 10, or between approximately 6 or 7 and 8 or 9, or between 7.2 and 7.7, or between 7.3 and 7.6, or between 7.4 and 7.5, or around 7.4 or 7.43. The TTL may be between 15 mm and 25 mm, or between 17 mm and 23 mm, or between 18 mm and 22 mm, or between 19 mm and 21 mm, or around 20 mm or 20.3 mm. The EFL may be between approximately 1.5 mm and 5 mm, or between about 2 m and 3.5 mm or 4 mm, or between around 2.5 mm and 3 mm, or between around 2.7 mm and 2.8 mm, or around 2.73 mm.

Table 7 provides quantitative data for the third example embodiment. FIGS. 17-22 illustrate advantageous features of the optical assembly shown in schematic side view representation at FIG. 15. Table 8 shows aspherical and spherical SAG data for the thirteenth surface of the optical assembly of FIG. 15. These data may fit to a formula for SAG for a spherical conic section, e.g., $z(r)=r^2/[R+(R^2-r^2)^{1/2}]$, wherein for a best sphere of radius 8.330, as in an example embodiment, and a curvature of best sphere, R, corresponding to 0.120047, the different actual radii of curvature, r, for a surface with aspheric departure produce SAG differences compared to values for a true spherical conic section. These aspherical SAGs for an example thirteenth surface are compared with would be true spherical SAGs in Table 8 for different distances Y from the vertex center at Y=0 to Y=3.3 (mm) in steps of 0.132 (mm).

Figure 16:
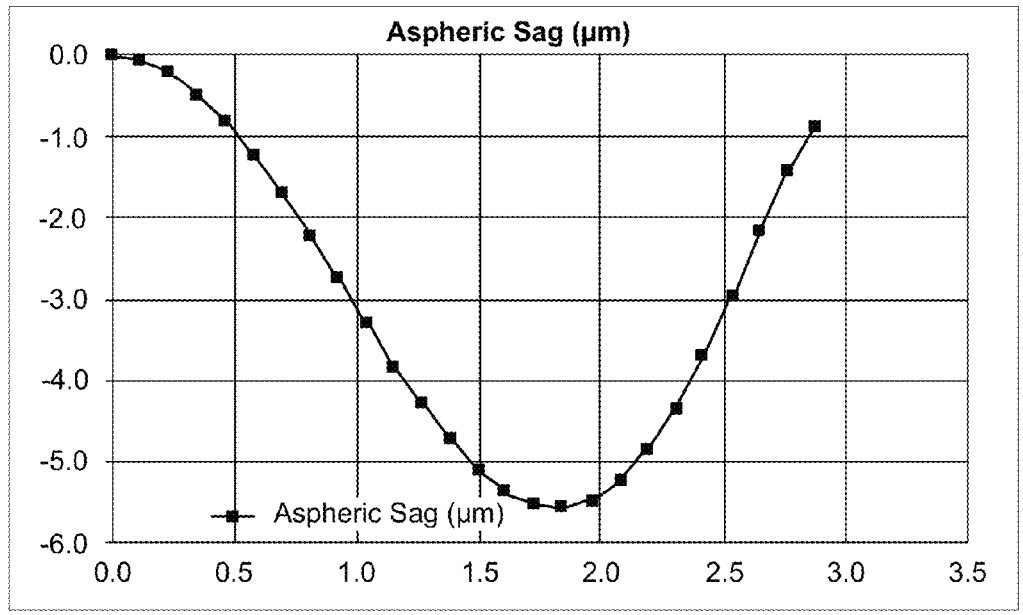
FIG. 16 is a plot of aspheric sag versus radial distance from the center of the asphere for the thirteenth surface from the object, or the object side surface of the seventh lens, in the example optical assembly illustrated schematically in FIG. 15.

The aspheric sags in Table 9 that are plotted in FIG. 16 are the aspheric sag difference numbers shown in Table 8, which are the differences from the best fit sphere sags of the aspheric surface 13. Table 9 also shows values of aspheric slope that are plotted in FIG. 17.

FIG. 16 is a plot of aspheric sag versus radial distance, or the data provided in the second column from the left in Table 9, for the 13$^{th}$ optical surface from the object in the example optical assembly illustrated schematically in FIG. 15. The aspheric sag for the 13$^{th}$ surface in this example has a sag minimum between approximately −5 µm and −6 µm between 1.5 mm and 2 mm from the center of the 13$^{th}$ lens surface. The sag is approximately zero at the center and is about −1 µm at the edge about 3 mm from the center. The sag plot has a width of approximately 1.5 mm at −3.0 µm. The sag has points of inflection at approximately 1.0 mm and 2.5 mm from the center of the 13$^{th}$ lens surface.

Figure 17:
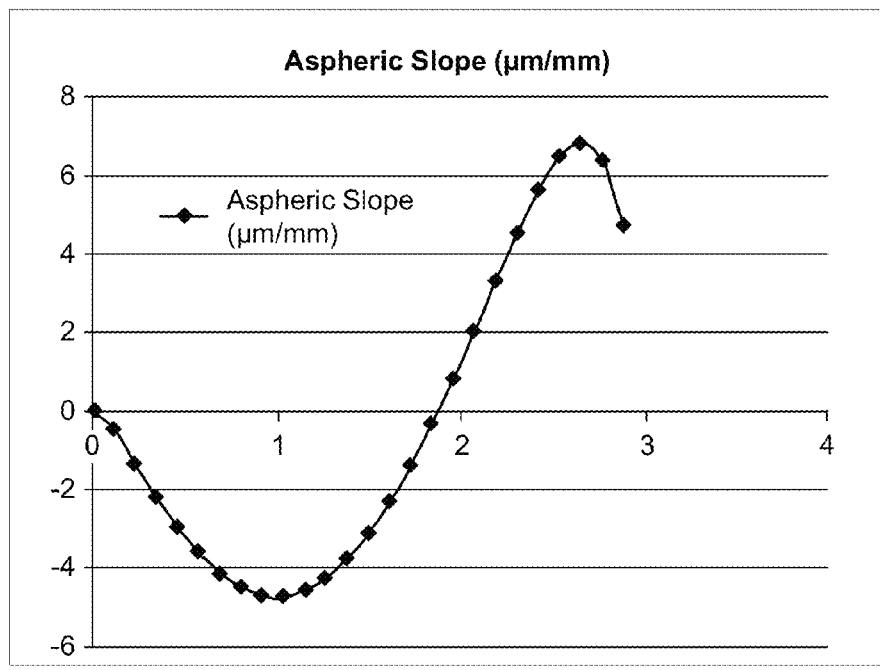
FIG. 17 is a plot of slope of aspheric sag versus radial distance from the center of the asphere for the thirteenth surface from the object, or the object side surface of the seventh lens, in the example optical assembly illustrated schematically in FIG. 15.
Figure 19A:
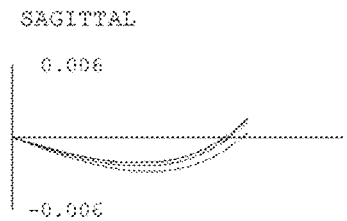
Figure 19B:
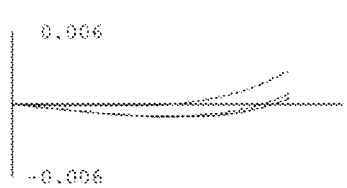
Figure 19C:
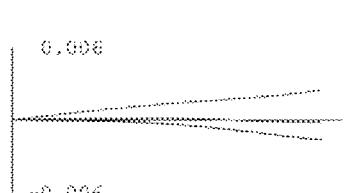
Figure 19D:
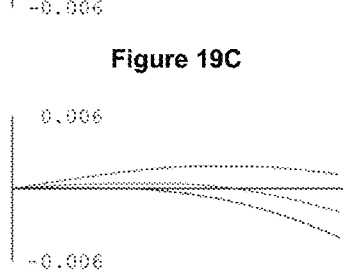

FIG. 17 is a plot of slope of aspheric sag versus radial distance, or the data provided in the fourth column from the left (or rightmost column) in Table 9, for the 13$^{th}$ optical surface in the example optical assembly illustrated schematically in FIG. 15. The aspheric slope has a minimum between −4 µm/mm and −6 µm/mm at about 1 mm from the center of the 13$^{th}$ lens surface. The aspheric slope has a maximum near the outer edge of the 13$^{th}$ lens surface around 2.5 mm from the center of between 6 µm/mm and 8 µm/mm. The aspheric slope has points of inflection at around 0.5 mm and 2 mm from the center of the 13$^{th}$ lens surface.

FIGS. 18A-18E respectively show plots of tangential ray aberrations respectively at 75°, 55°, 35°, 15° and 0° for the wide field of view objective assembly illustrated in FIG. 15. FIGS. 18A-18E and 19A-19E show five pairs of graphs, where each pair illustrates the tangential and sagittal rays at one of these five field angles. The independent variable (horizontal axis) is the relative coordinate of a ray over the pupil diameter. The vertical axis has a maximum distance measure of +/− approximately three microns or a spread of six microns or less over a 150 degree field (which is clearly advantageous over a conventional system that may have, e.g., a 20 micron spread. The vertical axis therefore represents the transverse ray aberration (ray interception distance from the ideal focal point) of a ray passing through a specific relative pupil position. Graphs 18A-18E (tangential plane) and 19A-19E (sagittal plane) show the transverse ray aberrations for an on-axis ray bundle as the bundle is refracted through the lens elements of the optical assembly of FIG. 15.

Figure 18A:
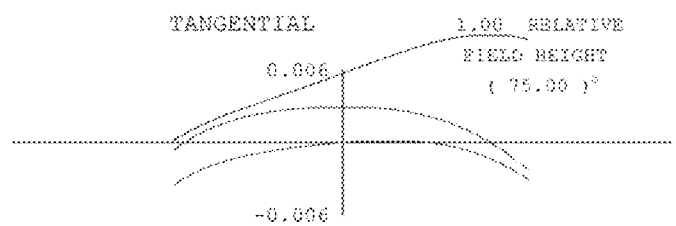
FIGS. 18A-18E and 19A-19E respectively show plots of tangential and sagittal ray aberrations for the wide field of view objective assembly illustrated in FIG. 15.
Figure 18B:
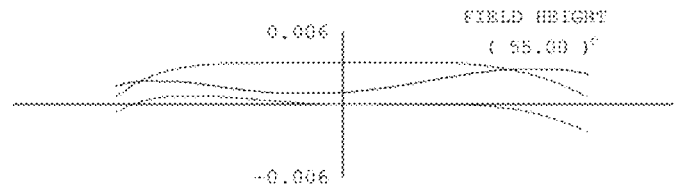
Figure 18C:
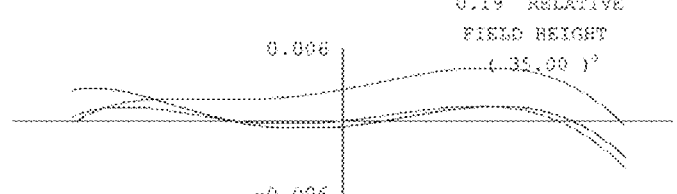
Figure 18D:
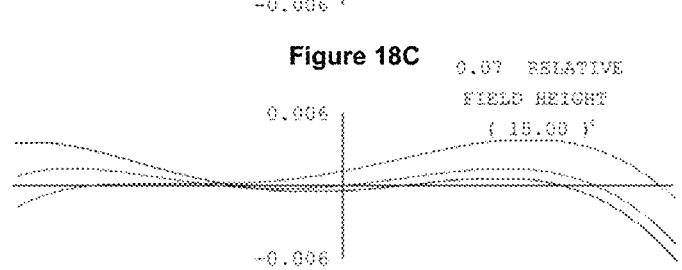
Figure 18E:
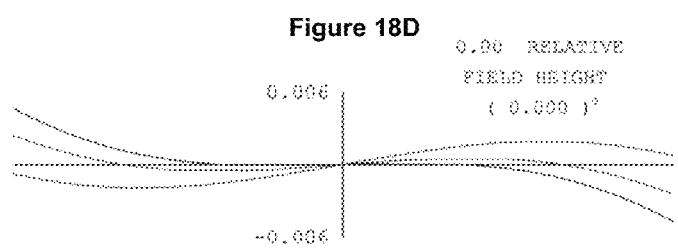
Figure 19E:
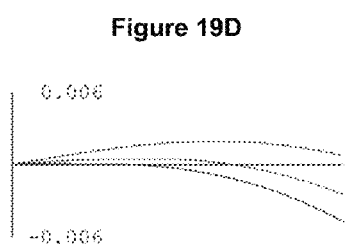

In FIGS. 18E and 19E, the performance of the embodiment of FIG. 15 is illustrated for a ray bundle at zero degrees with the optical axis. Graphs 18D and 19D show the performance of the optical assembly of FIG. 15 for a ray bundle when the light source is moved providing an incident angle of 15 degrees with the optical axis. Graphs 18C and 19C show the performance of the optical assembly of FIG. 1 for a ray bundle when the light source is moved providing an incident angle of 35 degrees with the optical axis. Graphs 18B and 19B show the performance of the optical assembly of FIG. 15 for a ray bundle when the light source is moved providing an incident angle of 55 degrees with the optical axis. Graphs 18A and 19A show the performance of the optical assembly of FIG. 15 for a ray bundle when the light source is moved providing an incident angle of 75 degrees with the optical axis.

LCA is demonstrated in FIGS. 18A-18E as the separation of the three rays which correspond to four different colors or wavelengths, which are in this example 650 nm, 550 nm, 486 nm and 450 nm.

Figure 20:
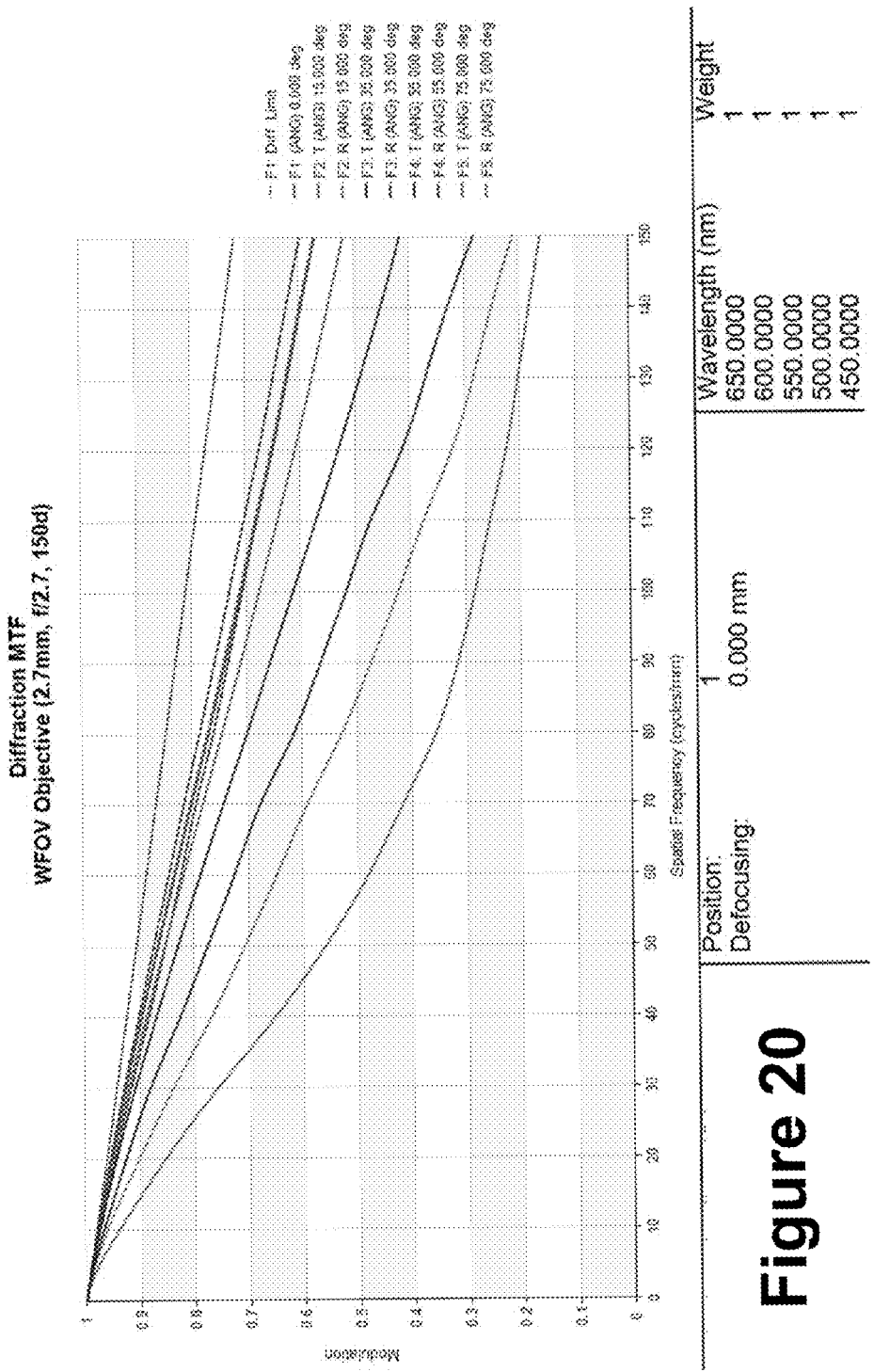
FIG. 20 illustrates diffraction modulation transfer function (MTF) plots of contrast vs. spatial frequency for tangential and sagittal rays impinging upon the optical assembly of FIG. 15 normal to the optical axis (F1), 15 degrees from normal to the optical axis (F2), 35 degrees from normal to the optical axis (F3), 55 degrees from normal to the optical axis (F4), and 75 degrees from normal to the optical axis (F5).

FIG. 20 illustrates the polychromatic diffraction modulation transfer function (MTF) plots of contrast vs. spatial frequency for pixels lying normal to the optical axis (F1), 15 degrees from normal to the optical axis (F2), 35 degrees from normal to the optical axis (F3), 55 degrees from normal to the optical axis (F4), and 75 degrees from normal to the optical axis (F5). Those pixels lying at 75 degrees from normal to the optical axis would be those at the edge of a point action camera assembly having a field of view of 150 degrees. A point action camera is provided herein having a wide field of view of 150 degrees or more. Advantageously high areas under these curves are noticeable in FIG. 20. In accordance with FIGS. 18A-18E, the plots of FIG. 20 demonstrate that the image quality of the embodiment of FIG. 15 is advantageous.

Figure 21:
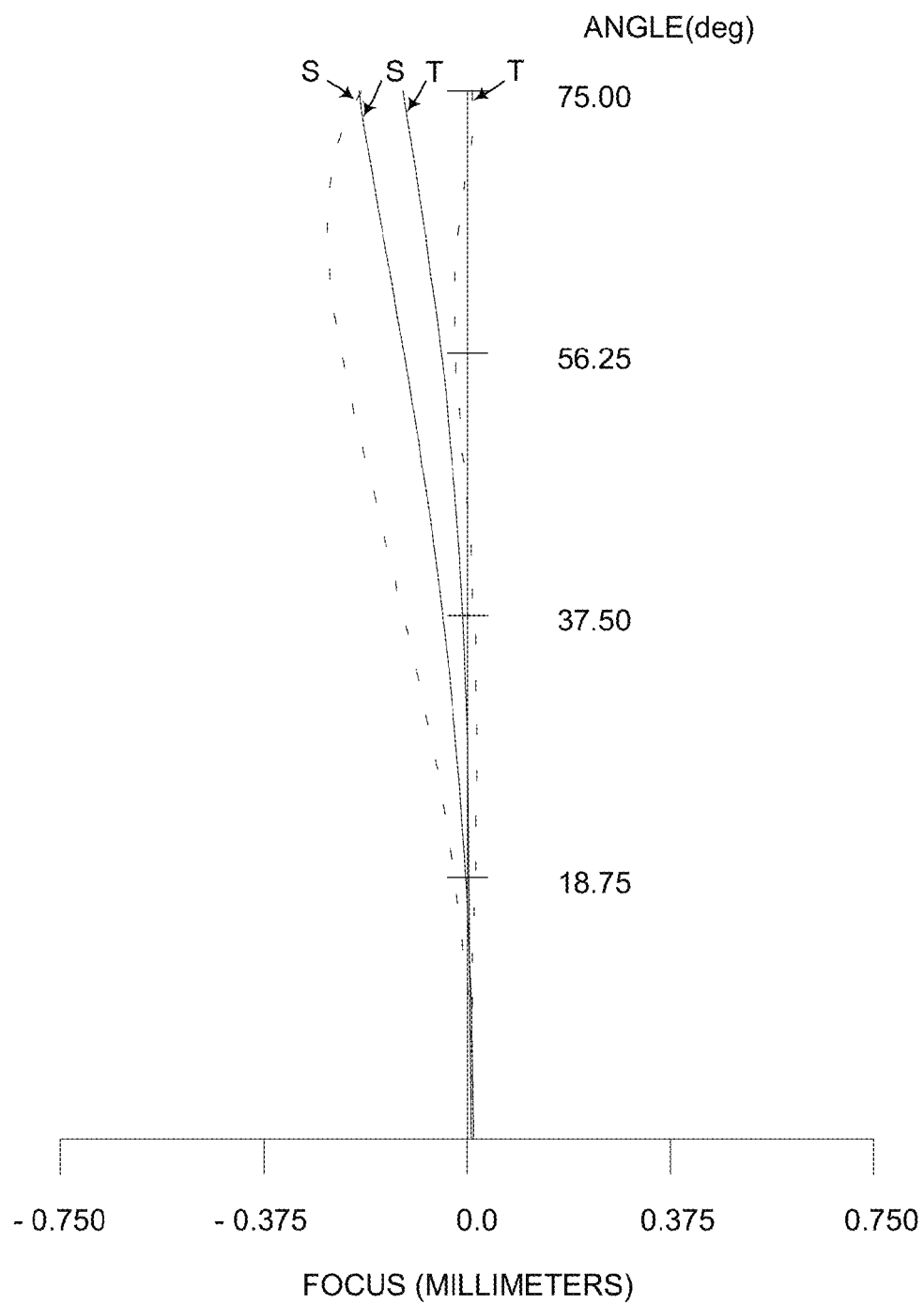
FIG. 21 shows astigmatic field curves for tangential fan (T) and sagittal fan (S) for the optical assembly illustrated schematically at FIG. 16 as well as the tangential fan (T') and sagittal fan (S') for a similar optical assembly except that the thirteenth optical surface has no aspheric departure.

FIG. 21 shows astigmatic field curves for tangential (e.g., vertical) fan (T) and sagittal (e.g., horizontal) fan (S) for the optical assembly illustrated schematically at FIG. 15 as well as the tangential fan (T') and sagittal fan (S') for a similar optical assembly except that the thirteenth optical surface has no aspheric departure. FIG. 21 shows that without the asphere, the residual field curvature ~0.25 mm in this example. With an aspheric departure in accordance with certain embodiments, e.g., on the thirteenth surface, such as has been described and illustrated in the example of FIG. 15, the longitudinal astigmatism reduces to less than 0.05 mm. That is, the field curvature is approximately flat, e.g., <50 microns, across the sensor format.

Fourth Example Embodiment

Figure 22:
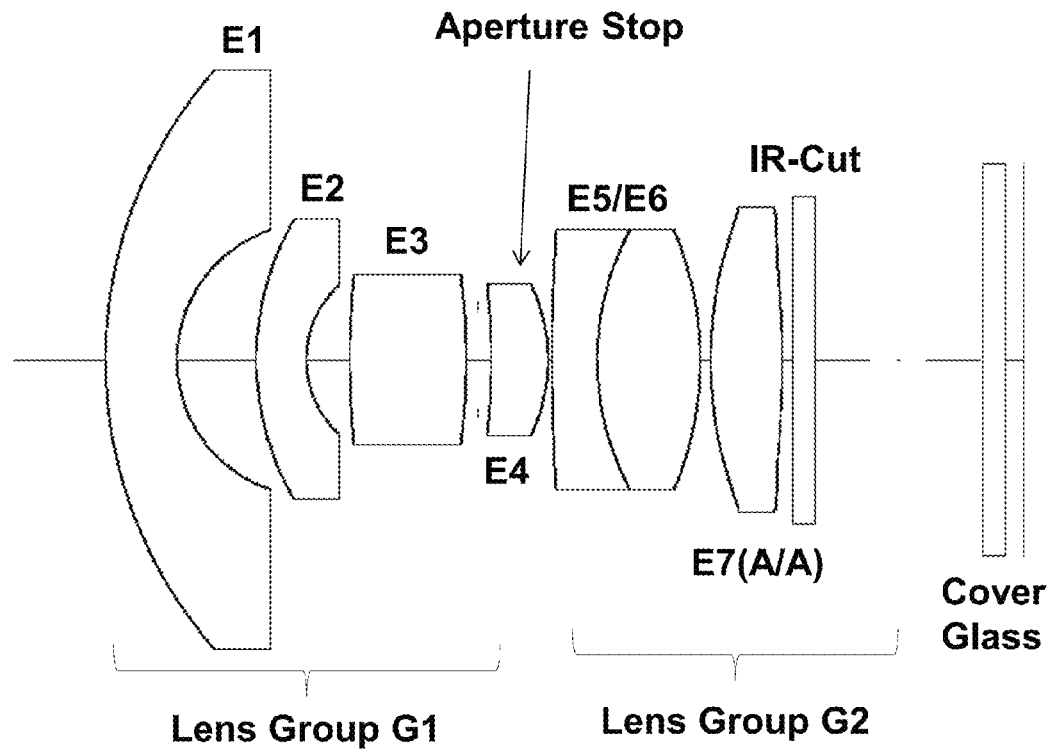
FIG. 22 schematically illustrates another optical assembly for a point action camera in accordance with certain embodiments.

FIG. 22 schematically illustrates another optical assembly for a point action camera in accordance with certain embodiments. The optical assembly of FIG. 22 includes a first optical group G1 and a second optical group G2 that are configured to provide a wide field of view with low distortion compared with conventional wide field of view systems. An advantageous bi-aspheric lens element is provided to correct astigmatism across the wide field of view, e.g., >150°. Certain embodiments of the optical assembly according to the example illustrated at FIG. 22 include a single bi-aspheric lens element. In certain embodiments, the single bi-aspheric lens element is the only lens element of the lens elements of the optical assembly that has a non-negligible aspheric departure on either surface.

In certain embodiments of the optical assembly having a single bi-aspheric lens element, the field curvature is less than 75 microns, and a subset of these embodiments provides field curvatures that are less than 60 microns, and another subset provides images that exhibit field curvatures that are less than 50 microns. Certain subsets of embodiments have astigmatism across the wide field of view that is less than 7 mm, 5 mm, 3 mm, 2 mm and 1 mm. In certain embodiments, the ratio of total track length to effective focal length is less than 8.

Referring now to FIG. 22, The signs of the curvatures of the lens elements in the illustrative example are similar to those described above with reference to any of FIG. 1, 8 or 15, or combinations thereof, such that the above discussions are incorporated rather than repeated here. The position of the single bi-aspheric lens element may be as the ultimate or penultimate lens element on the image side or on the object side of the optical assembly, e.g., at E1, E2, E6 or E7, as the enhanced chief ray to marginal ray distances improve the versatility in astigmatism compensation performance of the bi-aspheric lens element. In single-aspheric lens element is selected in the example illustrated at FIG. 22 as the seventh and ultimate lens element labeled E7(A)(A) from object to image of the wide field of view optical assembly.

The lens assembly illustrated at FIG. 22 includes a doublet, whereby in this example, the $10^{th}$ and $11^{th}$ surfaces are not spaced apart but are instead combined together. The doublet E5/E6 advantageously facilitates the correction of oblique aberrations that may otherwise be present without the doublet E5/E6.

An aperture stop is provided between the lens groups G1 and G2, or between the third biconvex, or quasi-plano-convex or convexo-quasi-plano lens element E3 and the concavo-convex meniscus, biconvex, plano or quasi-plano convex lens element E4. One or more further apertures may be included in certain alternative embodiments.

The first two convexo-concave collecting lens elements E1 and E2 may have an effective focal length between around −1 mm and −4 mm, or between around −1.5 mm and −3.5 mm, or between around −2 mm and −3 mm, or approximately −2.4 mm or −2.5 mm or −2.46 mm. The effective focal length of the lens element E3 may be between 4 mm and 12 mm, or between 5 mm and 11 mm, or between 6 mm and 10 mm, or between 7 mm and 9 mm, or approximately 8.1 mm. The overall effective focal length o the group G1 including lens elements E1, E2 and E3 may be between 1 mm and 5 mm, or between 1 mm and 4 mm, or between 1.5 mm nd 3.5 mm, or between 2 mm and 3 mm, or between around 2.7 mm and 2.8 mm, or approximately 2.73 mm. the effective focal length of the second lend group G2 including lens elements E4, E5/E6 and E7(A)(A) in the example illustrated schematically in side view at FIG. 22 may be between 2 mm and 7 mm, or between 3 mm and 6 mm, or between 4 mm and 5 mm, or between 4.5 mm and 4.8 mm, or between 4.6 mm and 4.7 mm, or approximately 4.64 mm.

The ratio of total track length to effective focal length in this example may be less than 8, or approximately 7 or 7.5, or between 7 and 8, or less than about 7.8, 7.7, 7.6 or 7.5. The total track length may be approximately 20.5 mm and the effective focal length approximately 2.7 mm.

Table 10 provides a quantitative optical prescription of the surfaces of the optical elements of an optical assembly in accordance with one example of the system that is illustrated schematically at FIG. 22. The left most column indicates the number of the surface from the object to the image. The second column from the left indicates the radius of curvature of the surface. The third column from the left indicates the thickness or distance from the surface to the next surface travelling in a direction from object to image. The rightmost column indicates the index of refraction and the dispersion of the material selected for each optical element in this example.

The indices of refraction for the lens elements E1-E7(A)(A) are indicated in Table 10 as 1.73, 1.73, 1.92, 1.62, 1.92, 1.62, and 1.5, respectively, while the indices of refraction of the IR cut filter and the cover glass for the image sensor are each indicated as 1.52. The dispersion of the lens elements E1-E7(A)(A) are indicated in Table 10 as 55, 55, 19, 63, 19, 63 and 82, respectively, while the dispersion of the IR cut filter and cover glass are each indicated as 64.

The aspheric constants or coefficients A, B, C and D for the $13^{th}$ and $14^{th}$ surfaces, respectively, may be inserted into the aspheric equation provided at the top of each of Tables 11 and 12 to obtain a formula that describes the aspheric curvatures of these $13^{th}$ and $14^{th}$ surfaces in this example.

In a fourth example embodiment, another optical assembly for a point action camera is configured for capturing images with a wide field of view and includes a single aspheric lens element, wherein the single aspheric lens element may be a bi-aspheric lens element, i.e., having two aspheric surfaces. In the fourth example embodiment, the optical assembly includes two or three optical groups as described with respect to the first, second and third example embodiments, e.g., including four, five, six or seven or more lens elements. In a seven lens element example, the seventh lens element is the only lens element having a significant aspheric departure. Each of the first through sixth lens elements in this example, from object to image, include approximately spherical surfaces within optical tolerances, while the seventh lens element has both an aspheric object facing surface and an aspheric image facing surface. The overall design is configured to capture wide field of view images, e.g., exceeding 90 degrees, 120 degrees, 135 degrees, 150 degrees and in certain embodiment even 180 degrees or more with tolerable distortion characteristics. The aspheric departures of the $13^{th}$ and $14^{th}$ lens surfaces are configured to correct astigmatism error that would otherwise be present in the design.

Tables 11-12 and 13-14, respectively, show data for example aspheric departures for the $13^{th}$ and $14^{th}$ lens surfaces of a seventh lens element of a wide field of view optical assembly in accordance with certain embodiments that includes a single aspheric lens element. In this example, the radius of the seventh lens element is approximately just below 3 mm, and aspheric sags and sag slopes are indicated at radii from the center Y=0 in the Tables 11-14 in steps of 115 microns out to Y=2.875.

The second and third columns from the left in each of Tables 11-12 show the data for aspherical and spherical sags, respectively, for the $13^{th}$ and $14^{th}$ surfaces, respectively. The fourth column from left in Tables 11-12 show the data for aspheric sag of the $13^{th}$ and $14^{th}$ surfaces, respectively, as a distance between a plane normal to the optical axis that would include a point along the optical surface at the radius provided in the left-most column and a parallel plane that actually includes the point along the optical surface at that radius. The sag differences indicated in the fourth column from the left in Tables 11-12 manifest the aspheric departures of the $13^{th}$ and $14^{th}$ surfaces, respectively, from a best fit sphere. The data for the slope of the sags provided in the fourth column, or the derivative of the sag slope with respect to radius or height Y for the $13^{th}$ and $14^{th}$ surfaces in this example, are respectively provided in the Table 13-14.

Figure 23:
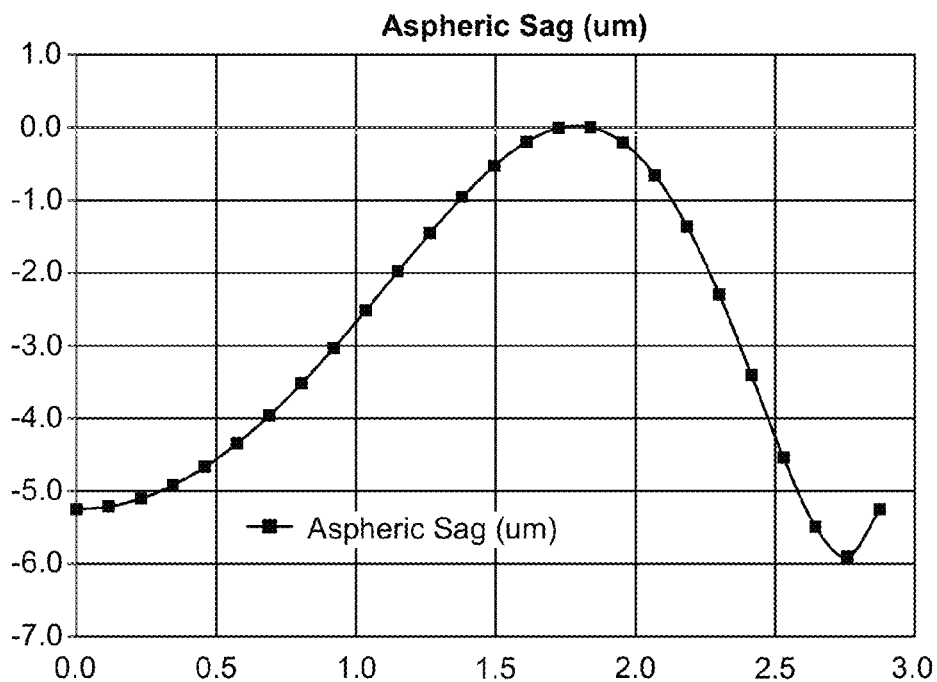
FIG. 23 is a plot of aspheric sag versus radial distance from the center of the asphere for the thirteenth surface from the object, or the object side surface of the seventh lens, in the example optical assembly illustrated schematically in FIG. 22.

FIG. 23 is a plot of aspheric sag versus radial distance, or the data provided in the fourth column from the left in Table 10, for the $13^{th}$ optical surface from the object in the example optical assembly illustrated schematically in FIG. 22. The aspheric sag for the $13^{th}$ surface in this example has a sag between approximately −5 μm and −6 μm at the center and at its outermost edge around 3 mm from the center of the $13^{th}$ lens surface. The sag is less than −5 everywhere between 0.5 mm and 2.5 mm from the center. The sag plot has a width of approximately 1.5 mm at −3.0 μm. The sag has a maximum of 0 μm between 1.5 mm and 2.0 mm from the center. In one embodiment, the maximum sag is at 1.8 mm. A sag minimum is shown in FIG. 23 between 2.5 mm and 3.0 mm of approximately −6 μm. In one embodiment, the minimum sag is at a radial distance of about 2.8 mm from the center of the $13^{th}$ lens surface. The sag has points of inflection at approximately 1.0 mm and 2.3 mm from the center of the $13^{th}$ lens surface.

Figure 24:
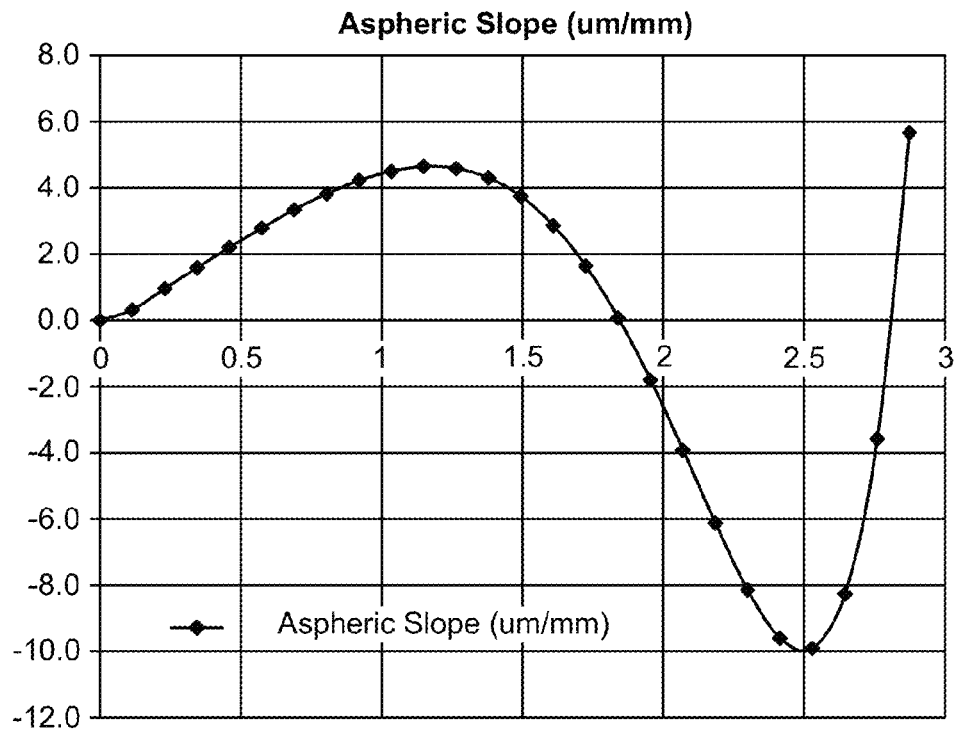
FIG. 24 is a plot of slope of aspheric sag versus radial distance from the center of the asphere for the thirteenth surface from the object, or the object side surface of the seventh lens, in the example optical assembly illustrated schematically in FIG. 22.

FIG. 24 is a plot of slope of aspheric sag versus radial distance, or the data provided in the fifth column from the left in Table 10, for the $13^{th}$ optical surface in the example optical assembly illustrated schematically in FIG. 22. The aspheric slope has a maximum between 4 μm/mm and 5 μm/mm between 1.0 mm and 1.5 mm from the center of the $13^{th}$ lens surface. The aspheric slope has a minimum of −10 μm/mm at 2.5 mm from the center of the $13^{th}$ lens surface. The aspheric slope rises to about 6 μm/mm from 2.5 mm to the outer edge. The aspheric slope has points of inflection at around 0.5 mm and 2 mm from the center of the $13^{th}$ lens surface.

The second and third columns from the left in Table 11 show the data for aspherical and spherical sags, respectively, for the $14^{th}$ surface. The fourth column from left shows the data for aspheric sag of the $14^{th}$ surface as a distance between a plane normal to the optical axis that would include a point along the $14^{th}$ optical surface at the radius provided in the left-most column and a parallel plane that actually includes the point along the $14^{th}$ surface at that radius. The sag differences indicated in the fourth column from the left in Table 11 manifest the aspheric departure of the $14^{th}$ surface from a best fit sphere. The data for the slope of the sags provided in the fourth column, or the derivative of the sag slope with respect to radius or height Y for the 14th surface in this example, are provided in the fifth column from the left in Table 11.

Figure 25:
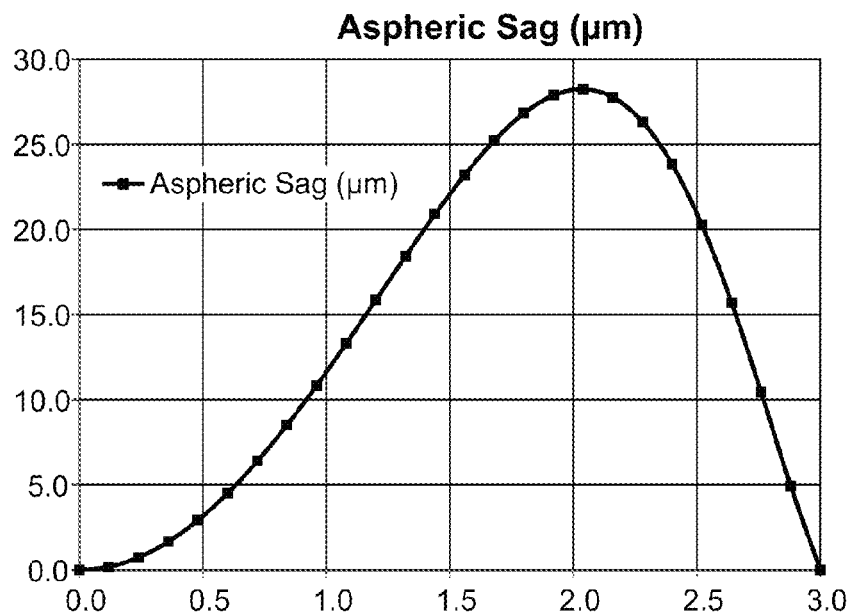
FIG. 25 is a plot of aspheric sag versus radial distance from the center of the asphere for the fourteenth surface from the object, or the image side surface of the seventh lens, in the example optical assembly illustrated schematically in FIG. 22.

FIG. 25 is a plot of aspheric sag versus radial distance, or the data provided in the fourth column from the left in Table 11, for the $14^{th}$ optical surface from the object, in the example optical assembly illustrated schematically in FIG. 22. The aspheric sag for the $14^{th}$ surface in this example has a sag of approximately 0 μm at the center and at its outermost edge around 3 mm from the center of the $14^{th}$ lens surface. The sag is positive everywhere between the center and the edge. The sag plot has a width of approximately 1.5 mm at 14 μm. The sag has a maximum of 28 μm at approximately 2 mm from the center. The sag has points of inflection between approximately 1.0 mm and 1.5 mm and between approximately 2.5 mm and 3 mm from the center of the 14$^{th}$ lens surface.

Figure 26:
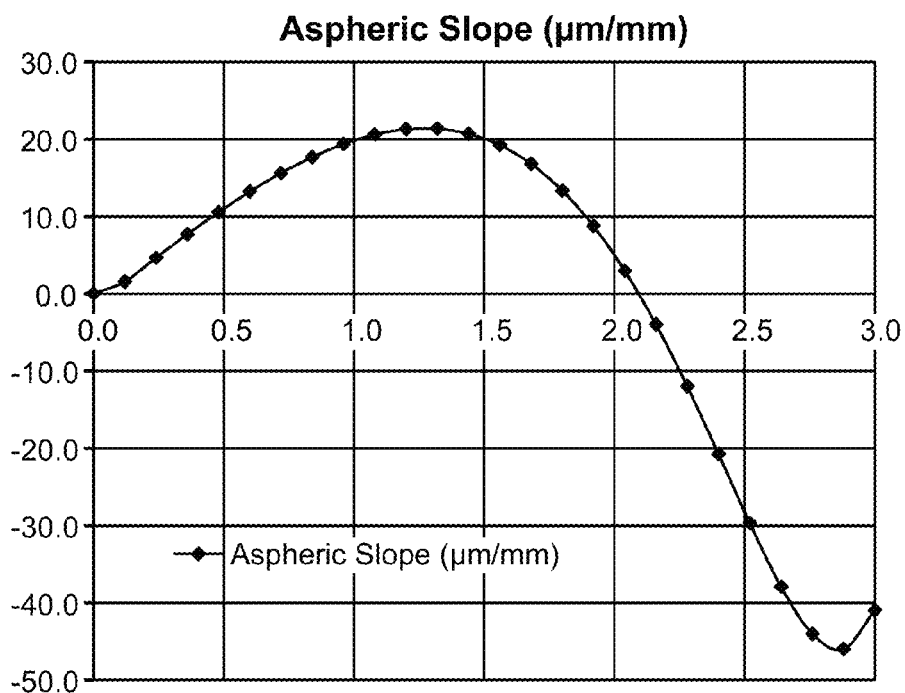
FIG. 26 is a plot of slope of aspheric sag versus radial distance from the center of the asphere for the fourteenth surface from the object, or the image side surface of the seventh lens, in the example optical assembly illustrated schematically in FIG. 22.

FIG. 26 is a plot of slope of aspheric sag versus radial distance, or the data provided in the fifth column from the left in Table 11, for the 14$^{th}$ optical surface from the object, in the example optical assembly illustrated schematically in FIG. 22. The aspheric slope has a maximum just above 20 µm/mm between 1.0 mm and 1.5 mm from the center of the 14$^{th}$ lens surface. The aspheric slope has a minimum between −40 µm/mm and −50 µm/mm near the outermost edge of the 14$^{th}$ lens surface. The aspheric slope has points of inflection between around 0.5 mm and 1 mm and between 2 mm and 2.5 mm from the center of the 14$^{th}$ lens surface.

FIGS. 27A-27E and 28A-28E respectively show plots of tangential and sagittal ray aberrations for the wide field of view objective assembly illustrated in FIG. 22.

Figure 29:
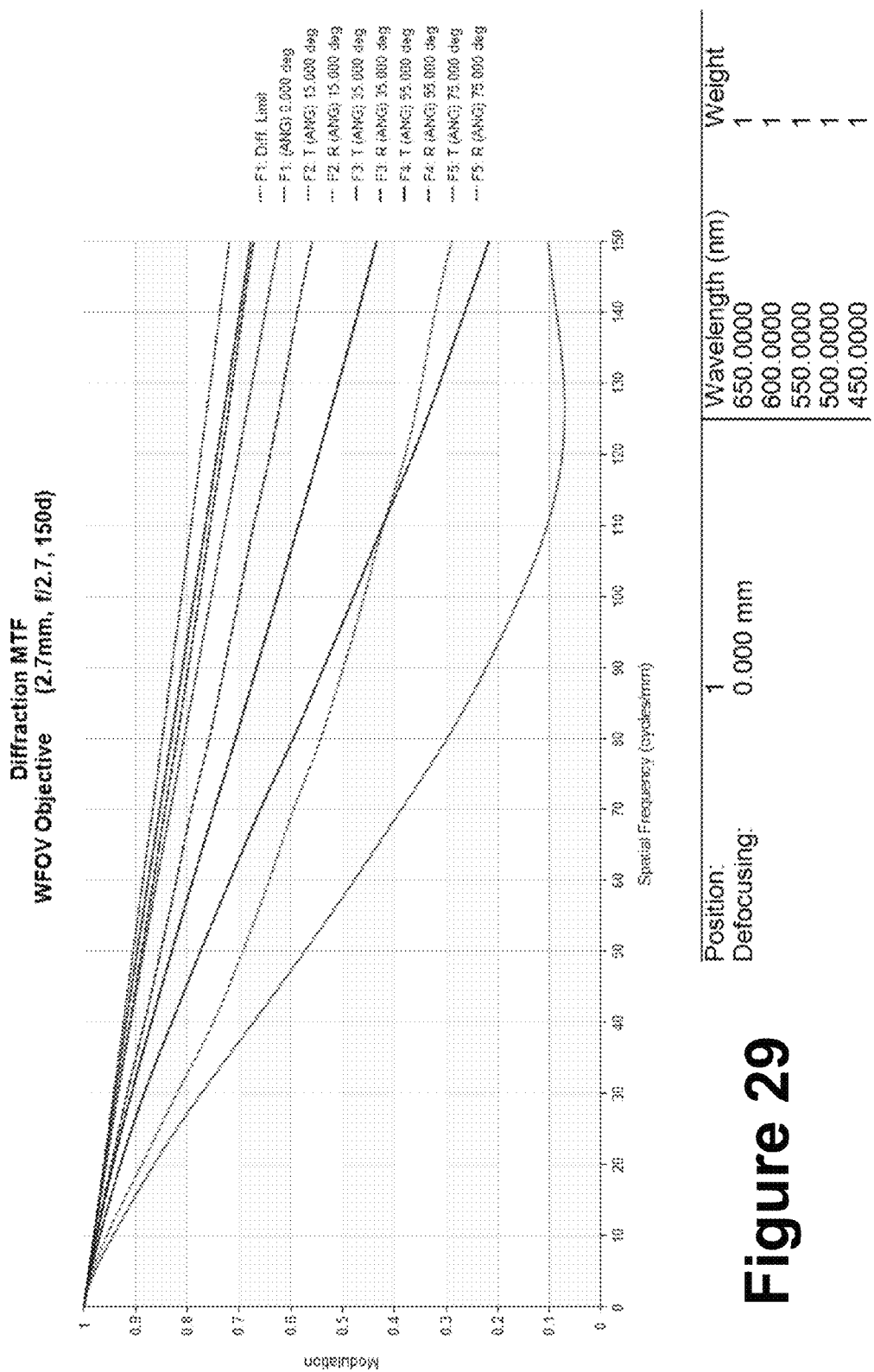
FIG. 29 illustrates diffraction modulation transfer function (MTF) plots of contrast vs. spatial frequency for tangential and sagittal rays impinging upon the optical assembly of FIG. 22 normal to the optical axis (F1), 15 degrees from normal to the optical axis (F2), 35 degrees from normal to the optical axis (F3), 55 degrees from normal to the optical axis (F4), and 75 degrees from normal to the optical axis (F5).

FIG. 29 illustrates diffraction modulation transfer function (MTF) plots of contrast vs. spatial frequency for tangential and sagittal rays impinging upon the optical assembly of FIG. 22 normal to the optical axis (F1), 15 degrees from normal to the optical axis (F2), 35 degrees from normal to the optical axis (F3), 55 degrees from normal to the optical axis (F4), and 75 degrees from normal to the optical axis (F5).

Figure 30:
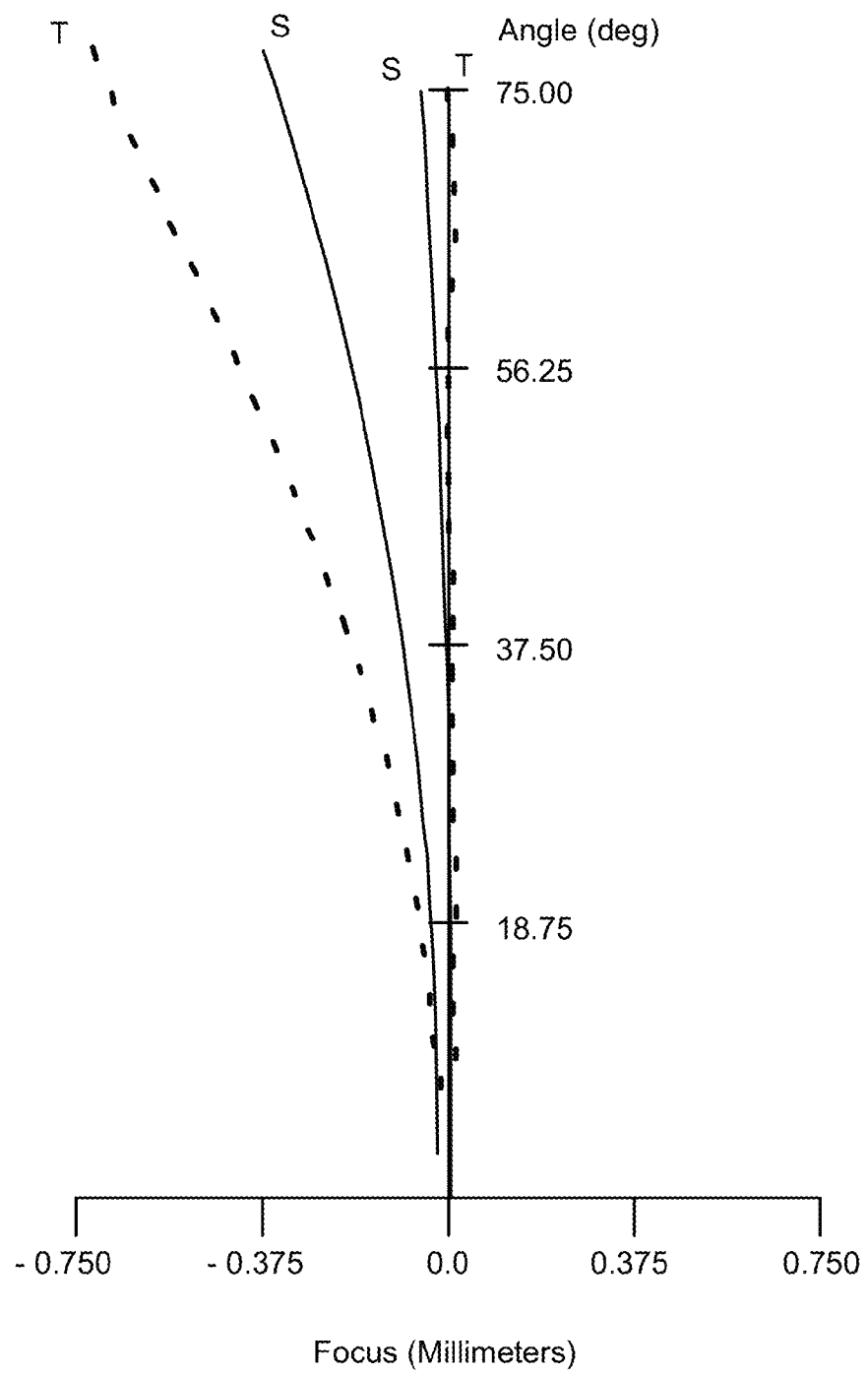
FIG. 30 shows astigmatic field curves for tangential fan (T) and sagittal fan (S) for the optical assembly illustrated schematically at FIG. 22 as well as the tangential fan (T') and sagittal fan (S') for a similar optical assembly except that the thirteenth optical surface has no aspheric departure.

FIG. 30 shows astigmatic field curves for tangential fan (T) and sagittal fan (S) for the optical assembly illustrated schematically at FIG. 22 as well as the tangential fan (T') and sagittal fan (S') for a similar optical assembly except that the thirteenth optical surface has no aspheric departure.

General Discussion

Yet greater dynamic capacities in the process of building a point action camera with both wide field of view and heretofore unknown reduction in distortion, astigmatism and combinations of these optical aberrations that have been otherwise problematic in conventional wide field of view systems is provided herein with optical assemblies in accordance with multiple embodiments that contain only one aspheric lens element, e.g, lens element E1 or E2 of the first lens group G1 or lens element E5/E6, E6 or E7 of the lens group G2 in combination with five or six lens elements that have spherical curvatures to understood tolerances. One or both surfaces of the single aspheric lens element of these embodiments may have significant calculated aspheric departure, while the other lens elements are spheres (or in other embodiments cylinders or a combination of cylinders and spheres).

Example embodiments have been provided above wherein only one optical surface within the optical assembly has a specifically-intended and advantageous aspheric departure. In the embodiments illustrated schematically in side view in FIGS. 1 and 9, five or six lens elements, depending on how the E5/E6 doublet is characterized, do not have departures from spherical (i.e., at least none that exceed specified optical tolerances).

In another set of embodiments, one or more aspheric lens element is/are provided in the first lens Group G1. For example, lens element E1 and/or E2 may have one or more surfaces with aspheric departures that serve to reduce astigmatism in a wide field of view point action camera system that is also or already configured with significantly reduced distortion characteristics, particularly at the edges of the field of view (e.g., 50°, 55°, 60°, 65°, 70°, or 75° or more from normal to the optical axis), where conventional uncorrected wide field of view systems tend to exhibit unacceptably high combinations of either or both of distortional and astigmatic aberrations. In certain embodiments, only lens element E1 or lens element E2 has one or both surfaces that exhibit calculably advantageous aspheric departures.

In specific embodiments, only a single surface, e.g., the 1$^{st}$, 2$^{nd}$, 3$^{rd}$ or 4$^{th}$ surface, of the optical assembly has aspheric departure that provides a point action camera with a wide field of view along with unprecedented reductions in distortional, astigmatic or combinational aberrations that would be otherwise inherent in less thorough designs, in designs without any aspheric surface or surfaces and/or in designs without the specific optical design shape and/or aberrational error correctional characteristics provided herein. In a specific alternative embodiment, only the first lens surface of the optical assembly, or the surface of lens E1 that faces the object, includes demonstratedly and advantageously significant aspheric departure. In another embodiment, the image facing surface of lens E1 has a uniquely aspherical attributional curvature characteristic within the optical assembly of a wide field of view point action camera.

Alternative embodiments have a single aspheric surface within the lens group G2 at the twelfth lens surface or image facing surface of the lens E6 (or E6(A) in this alternative embodiment) which is the image-side lens of the doublet E5/E6. Another alternative to having aspheric departure on the thirteenth surface (as in the above illustrated examples) is to instead provide aspheric curvature on the fourteenth lens surface, which is the image facing surface of the lens E7(A). Other surfaces of the lens group G2 such as the seventh through eleventh surfaces of the optical assemblies illustrated in FIGS. 1 and 9 could also have aspheric departures that could benefit, albeit to a lesser extent than the aforementioned 12$^{th}$, 13$^{th}$ and/or 14$^{th}$ optical surfaces of lens group G2, the versatility and optical design characteristics of an optical assembly of a point action camera.

While an exemplary drawings and specific embodiments of the present invention have been described and illustrated, it is to be understood that that the scope of the present invention is not to be limited to the particular embodiments discussed. Thus, the embodiments shall be regarded as illustrative rather than restrictive, and it should be understood that variations may be made in those embodiments by workers skilled in the arts without departing from the scope of the present invention.

In addition, in methods that may be performed according to preferred embodiments herein and that may have been described above, the operations have been described in selected typographical sequences. However, the sequences have been selected and so ordered for typographical convenience and are not intended to imply any particular order for performing the operations, except for those where a particular order may be expressly set forth or where those of ordinary skill in the art may deem a particular order to be necessary.

A group of items linked with the conjunction "and" in the above specification should not be read as requiring that each and every one of those items be present in the grouping in accordance with all embodiments of that grouping, as various embodiments will have one or more of those elements replaced with one or more others. Furthermore, although items, elements or components of the invention may be described or claimed in the singular, the plural is contemplated to be within the scope thereof unless limitation to the singular is explicitly stated or clearly understood as necessary by those of ordinary skill in the art.

The presence of broadening words and phrases such as "one or more," "at least," "but not limited to" or other such as phrases in some instances shall not be read to mean that the narrower case is intended or required in instances where such broadening phrases may be absent. The use of the term "assembly" does not imply that the components or functionality described or claimed as part of the assembly are all configured in a common package. Indeed, any or all of the various components of a assembly, e.g., optical group 1 and optical group 2, may be combined in a single package or separately maintained and may further be manufactured, assembled or distributed at or through multiple locations.

Different materials may be used to form the lenses of the optical assemblies of the several embodiments. For example, various kinds of glass and/or transparent plastic or polymeric materials may be used. Examples include polyimides. Among the polymeric materials are high refractive index polymers, or HRIPs, with refractive indices typically above 1.5 (see, e.g., Hung-Ju Yen and Guey-Sheng Liou (2010). "A facile approach towards optically isotropic, colorless, and thermoplastic polyimidothioethers with high refractive index". J. Mater. Chem. 20 (20): 4080; H. Althues, J. Henle and S. Kaskel (2007). "Functional inorganic nanofillers for transparent polymers". Chem. Soc. Rev. 9 (49): 1454-65; Akhmad Herman Yuwono, Binghai Liu, Junmin Xue, John Wang, Hendry Izaac Elim, Wei Ji, Ying Li and Timothy John White (2004). "Controlling the crystallinity and nonlinear optical properties of transparent TiO2-PMMA nanohybrids". J. Mater. Chem. 14 (20): 2978; Naoaki Suzuki, Yasuo Tomita, Kentaroh Ohmori, Motohiko Hidaka and Katsumi Chikama (2006). "Highly transparent ZrO2 nanoparticle-dispersed acrylate photopolymers for volume holographic recording". Opt. Express 14 (26): 012712, which are incorporated by reference).

Optical image stabilization techniques may be included in a point action camera in accordance with certain embodiments. For examples, techniques described at U.S. Pat. Nos. 8,649,628, 8,649,627, 8,417,055, 8,351,726, 8,264,576, 8,212,882, 8,593,542, 8,509,496, 8,363,085, 8,330,831, 8,648,959, 8,637,961, 8,587,666, 8,604,663, 8,521,017, 8,508,652, 8,358,925, 8,264,576, 8,199,222, 8,135,184 and 8,184,967, and US published patent applications nos. 2012/0121243, 2012/0207347, 2012/0206618, 2013/0258140, 2013/0201392, 2013/0077945, 2013/0076919, 2013/0070126, 2012/0019613, 2012/0120283, and 2013/0075237 which are hereby incorporated by reference, may be used.

Additionally, the various embodiments set forth herein are described in terms of exemplary schematic diagrams and other illustrations. As will be apparent to one of ordinary skill in the art after reading this document, the illustrated embodiments and their various alternatives may be implemented without confinement to the illustrated examples. For example, schematic diagrams and their accompanying description should not be construed as mandating a particular architecture or configuration.

Point action cameras in accordance with several further embodiments are described herein. Several examples of point action cameras that can be efficiently manufactured are illustrated in the text with reference to accompanying drawings. Certain optical parts of the point action camera such as one or more lenses, mirrors and/or apertures, a shutter, a housing or barrel for holding certain optics, a lens or a lens barrel, or other optic such as a mirror, light source, secondary sensor, accelerometer, gyroscope, power connection, a data storage chip, a microprocessor, a wired or wireless transmission/reception connection and/or receiver/transmitter, or housing alignment and/or coupling pins or recesses or other such structures may be included in certain embodiments even if they have not been specifically described or illustrated herein. It is noted that in certain embodiments, a shutter is included, while in other embodiments, the point action camera does not have a shutter. A flash may or may not be included in any of these camera embodiments.

In certain embodiments, a wide field of view is desired in only a single dimension. In such cases, the principles described herein can be reduced to cylindrical applications of any of the spherical examples provided.

In addition, all references cited above and below herein, as well as the background, invention summary, abstract and brief description of the drawings, are all incorporated by reference into the detailed description of the preferred embodiments as disclosing alternative embodiments. Several embodiments of point action cameras have been described herein and schematically illustrated by way of example physical, electronic and optical architectures. Other point action camera embodiments and embodiments of features and components of point action cameras that may be included within alternative embodiments, may be described at one or a combination of U.S. Pat. Nos. 7,224,056, 7,683,468, 7,936,062, 7,935,568, 7,927,070, 7,858,445, 7,807,508, 7,569,424, 7,449,779, 7,443,597, 7,449,779, 7,768,574, 7,593,636, 7,566,853, 7,858,445, 7,936,062, 8,005,268, 8,014,662, 8,090,252, 8,004,780, 8,119,516, 7,920,163, 7,747,155, 7,368,695, 7,095,054, 6,888,168, 6,844,991, 6,583,444, and/or 5,882,221, and/or US published patent applications nos. 2013/0270419, 2013/0258140, 2014/0028887, 2014/0043525, 2012/0063761, 2011/0317013, 2011/0255182, 2011/0274423, 2010/0053407, 2009/0212381, 2009/0023249, 2008/0296717, 2008/0099907, 2008/0099900, 2008/0029879, 2007/0190747, 2007/0190691, 2007/0145564, 2007/0138644, 2007/0096312, 2007/0096311, 2007/0096295, 2005/0095835, 2005/0087861, 2005/0085016, 2005/0082654, 2005/0082653, and/or 2005/0067688. All of these patents and published patent applications are incorporated by reference.

U.S. Pat. Nos. 7,593,636, 7,768,574, 7,807,508 and 7,244,056 which are incorporated by reference describe examples of structures where the electrical height of a camera device is nested within the optical height to decrease the physical height. An advantageously compact point action camera is provided herein in alternative embodiments. Point action cameras that have an advantageously low ratio of optical length (or physical size or height) to effective focal length, or TTL/EFL, are provided herein. In specifically described examples, optical assemblies with TTL/EFL ratios below 8.0 are provided.

US2013/0242080 which is also incorporated by reference describes examples of point action cameras or camera modules disposed within watertight compartments. A mechanism may be provided for optical and/or electrical communication of image data that does not involve breaking the watertight seal of the housing within which the point action camera resides.

What is claimed is:

1. An optical assembly for a point action camera having a wide field of view, comprising multiple lens elements, including an aspheric surface, configured to provide a field of view in excess of 150 degrees that comprises a longitudinal astigmatism of 0.3 mm or less, wherein the optical assembly comprises from object end to image end a first optical group and a second optical group, wherein the first optical group is configured to collect light at said wide field of view and said second optical group is configured to correct distortion error, and wherein at least one of said multiple lens elements is configured with an aspheric departure to correct astigmatism error, and wherein said longitudinal astigmatism comprises multiple orders including fifth order astigmatism.

2. The optical assembly of claim 1, wherein the longitudinal astigmatism comprises approximately 0.2 mm or less.

3. The optical assembly of claim 1, wherein the longitudinal astigmatism comprises approximately 0.1 mm or less.

4. The optical assembly of claim 3, wherein said second optical group comprises an aspheric lens element.

5. The optical assembly of claim 4, comprising an aperture stop between said first and second optical groups.

6. The optical assembly of claim 4, wherein one or both of an ultimate or penultimate lens element of the second optical group comprises an aspheric lens element.

7. The optical assembly of claim 6, wherein said ultimate lens element comprises an aspheric lens element.

8. The optical assembly of claim 7, wherein said ultimate lens element comprises an object facing side and an image facing side, and wherein said object facing side comprises an aspheric lens surface.

9. A digital camera, comprising
an optical assembly as in claim 1; and
an image sensor disposed approximately at a focal plane of the optical assembly; and
a digital camera housing including electronics and a user interface, and containing said optical assembly and said image sensor in optically effective relative disposition.

10. The digital camera of claim 9, wherein the optical assembly comprises a longitudinal astigmatism of approximately 0.2 mm or less.

11. The digital camera of claim 9, wherein the optical assembly comprises a longitudinal astigmatism of approximately 0.1 mm or less.

12. The digital camera of claim 11, wherein said second optical group comprises an aspheric lens element.

13. The digital camera of claim 12, wherein the optical assembly comprises an aperture stop between said first and second optical groups.

14. The digital camera of claim 12, wherein one or both of an ultimate or penultimate lens element of the second optical group comprises an aspheric lens element.

15. The digital camera of claim 14, wherein said ultimate lens element comprises an aspheric lens element.

16. The digital camera of claim 15, wherein said ultimate lens element comprises an object facing side and an image facing side, and wherein said object facing side comprises an aspheric lens surface.

17. An optical assembly for a point action camera having a wide field of view, comprising multiple lens elements, including an aspheric surface, configured to provide a field of view in excess of 150 degrees that comprises a longitudinal astigmatism of 0.3 mm or less, wherein the optical assembly comprises from object end to image end a first optical group and a second optical group, wherein the first optical group is configured to collect light at said wide field of view and said second optical group is configured to correct distortion error, and wherein at least one of said multiple lens elements is configured with an aspheric departure to correct astigmatism error, and wherein said optical assembly comprises seven lens elements.

18. A digital camera, comprising
an optical assembly as in claim 17; and
an image sensor disposed approximately at a focal plane of the optical assembly; and
a digital camera housing including electronics and a user interface, and containing said optical assembly and said image sensor in optically effective relative disposition.

19. An optical assembly for a point action camera having a wide field of view, comprising multiple lens elements, including an aspheric surface, configured to provide a field of view in excess of 150 degrees that comprises a longitudinal astigmatism of 0.3 mm or less, wherein the optical assembly comprises from object end to image end a first optical group and a second optical group, wherein the first optical group is configured to collect light at said wide field of view and said second optical group is configured to correct distortion error, and wherein at least one of said multiple lens elements is configured with an aspheric departure to correct astigmatism error, and wherein said second optical group comprises four lens elements.

20. A digital camera, comprising
an optical assembly as in claim 19; and
an image sensor disposed approximately at a focal plane of the optical assembly; and
a digital camera housing including electronics and a user interface, and containing said optical assembly and said image sensor in optically effective relative disposition.

21. An optical assembly for a point action camera having a wide field of view, comprising multiple lens elements, including an aspheric surface, configured to provide a field of view in excess of 150 degrees that comprises a longitudinal astigmatism of 0.3 mm or less, wherein the optical assembly comprises from object end to image end a first optical group and a second optical group, wherein the first optical group is configured to collect light at said wide field of view and said second optical group is configured to correct distortion error, and wherein at least one of said multiple lens elements is configured with an aspheric departure to correct astigmatism error, and wherein said second optical group comprises from object side to image side, a first singlet, a doublet and a second singlet.

22. The optical assembly of claim 21, wherein said first singlet comprises a biconvex or plano-convex or quasi-plano-convex lens.

23. The optical assembly of claim 22, wherein said second singlet comprises a biconvex, or convexo-plano or convexo-quasi-plano lens.

24. The optical assembly of claim 23, wherein said first optical group comprises two or more convexo-concave or meniscus lenses.

25. The optical assembly of claim 24, wherein said first optical group further comprises a biconvex lens.

26. The optical assembly of claim 21, wherein said doublet comprises, from object side to image side, a biconcave lens and a biconvex lens.

27. A digital camera, comprising
an optical assembly as in claim 21; and
an image sensor disposed approximately at a focal plane of the optical assembly; and a digital camera housing including electronics and a user interface, and containing said optical assembly and said image sensor in optically effective relative disposition.

28. The digital camera of claim 27, wherein said first singlet comprises a biconvex or plano-convex or quasi-plano-convex lens.

29. The digital camera of claim 28, wherein said second singlet comprises a biconvex, or convexo-plano or convexo-quasi-plano lens.

30. The digital camera of claim 29, wherein said first optical group comprises two or more convexo-concave or meniscus lenses.

31. The digital camera of claim 30, wherein said first optical group further comprises a biconvex lens.

32. The digital camera of claim 27, wherein said doublet comprises, from object side to image side, a biconcave lens and a biconvex lens.

33. An optical assembly for a point action camera having a wide field of view, comprising multiple lens elements, including an aspheric surface, configured to provide a field of view in excess of 150 degrees that comprises a longitudinal astigmatism of 0.3 mm or less,
wherein the optical assembly comprises from object end to image end a first optical group and a second optical group, wherein the first optical group is configured to collect light at said wide field of view and said second optical group is configured to correct distortion error, and
wherein at least one of said multiple lens elements is configured with an aspheric departure to correct astigmatism error, and
wherein the optical assembly further comprises a third optical group disposed between the first and second optical groups.

34. The optical assembly of claim 33, wherein the third optical group comprises a biconvex lens.

35. The optical assembly of claim 33, wherein the lateral chromatic aberration is less than approximately three pixels.

36. The optical assembly of claim 35, wherein the lateral chromatic aberration is less than approximately two pixels.

37. The optical assembly of claim 33, wherein the lateral chromatic aberration is less than approximately five microns.

38. The optical assembly of claim 37, wherein the lateral chromatic aberration is less than approximately three microns.

39. The optical assembly of claim 33, comprising a single aspheric lens element, which is the only aspheric lens element within the optical assembly.

40. The optical assembly of claim 39, wherein lens elements other than the single aspheric lens element comprise spherical or planar lens surfaces, or both, each without significant aspheric departures.

41. The optical assembly of claim 39, wherein the single aspheric lens element comprises a single aspheric lens surface, which is the only aspheric lens surface within the optical assembly.

42. A digital camera, comprising
an optical assembly as in claim 33; and
an image sensor disposed approximately at a focal plane of the optical assembly; and
a digital camera housing including electronics and a user interface, and containing said optical assembly and said image sensor in optically effective relative disposition.

43. The digital camera of claim 42, wherein the third optical group comprises a biconvex lens.

44. The digital camera of claim 42, wherein the lateral chromatic aberration of the optical assembly is less than approximately three pixels.

45. The digital camera of claim 44, wherein the lateral chromatic aberration is less than approximately two pixels.

46. The digital camera of claim 42, wherein the lateral chromatic aberration of the optical assembly is less than approximately five microns.

47. The digital camera of claim 46, wherein the lateral chromatic aberration is less than approximately three microns.

48. The digital camera of claim 42, wherein the optical assembly comprises a single aspheric lens element, which is the only aspheric lens element within the optical assembly.

49. The digital camera of claim 48, wherein lens elements other than the single aspheric lens element comprise spherical or planar lens surfaces, or both, each without significant aspheric departures.

50. The digital camera of claim 48, wherein the single aspheric lens element comprises a single aspheric lens surface, which is the only aspheric lens surface within the optical assembly.

51. The digital camera of claim 50, wherein the longitudinal astigmatism of the optical assembly comprises approximately 0.2 mm or less.

52. The digital camera of claim 51, wherein the longitudinal astigmatism comprises approximately 0.1 mm or less.

* * * * *